United States Patent
Voit et al.

(10) Patent No.: US 6,295,292 B1
(45) Date of Patent: Sep. 25, 2001

(54) INBOUND GATEWAY AUTHORIZATION PROCESSING FOR INTER-CARRIER INTERNET TELEPHONY

(75) Inventors: Eric A. Voit, Baltimore; Edward E. Balkovich, Potomac, both of MD (US); Robert D. Farris, Sterling, VA (US); William D. Goodman, Collegeville, PA (US); Jayant G. Gadre, Oakton; Patrick E. White, Vienna, both of VA (US); David E. Young, Silver Spring, MD (US)

(73) Assignee: Bell Atlantic Network Services, Inc., Arlington, VA (US)

( * ) Notice: Subject to any disclaimer, the term of this patent is extended or adjusted under 35 U.S.C. 154(b) by 0 days.

(21) Appl. No.: 08/998,274

(22) Filed: Dec. 24, 1997

Related U.S. Application Data

(63) Continuation-in-part of application No. 08/931,159, filed on Sep. 16, 1997, now Pat. No. 6,137,869, and a continuation-in-part of application No. 08/931,480, filed on Sep. 16, 1997, and a continuation-in-part of application No. 08/931,268, filed on Sep. 16, 1997, now Pat. No. 6,157,636, and a continuation-in-part of application No. 08/931,477, filed on Sep. 16, 1997, now Pat. No. 6,157,648, and a continuation-in-part of application No. 08/931,267, filed on Sep. 16, 1997, and a continuation-in-part of application No. 08/812,075, filed on Mar. 6, 1997, now Pat. No. 6,104,711.

(51) Int. Cl.$^7$ .................................................. H04L 12/64

(52) U.S. Cl. ........................................... 370/352; 370/401

(58) Field of Search .................................. 370/352, 353, 370/354, 355, 356, 400, 401, 402, 462, 463

(56) References Cited

U.S. PATENT DOCUMENTS 5,247,571   9/1993   Kay et al. ............................. 379/207

5,608,786   3/1997   Gordon ................................. 370/352

(List continued on next page.)

OTHER PUBLICATIONS

Yang, C. "INETPhone: Telephone Services and Servers on the Internet," http://ds.internic.net/rfc/rfc1789.txt (Feb. 12, 1997).

Primary Examiner—Min Jung
(74) Attorney, Agent, or Firm—McDermott, Will & Emery

(57) ABSTRACT

A communication system providing telephony communication across combined circuit switched and packet switched networks, such as a telephone network and the Internet, which are connectable to terminals, such as telephones and computers, for selective communication therebetween. The communication system provides an architecture and methodology for implementing initiation of establishment of a communication path between called and called terminals from a telephone terminal. The architecture and methodology facilitates communication across carriers or service providers, settlements between carriers and service providers, usage accounting across carriers and service providers, and usage allocation among carriers or service providers. Upon a terminal requesting connection to a gateway to establish a communication path between that terminal and a designated destination terminal, there occurs within the circuit switched network and a gateway to the packet network a transfer of an information package which identifies the calling station, the called station, and the identity of the responsible origination carrier or service provider. An authentication database of this carrier is accessed and authorization of the requested communication is secured. The second carrier or service provider is requested to complete the communication path. The second carrier or service provider consults a database of carriers or service providers, determines whether to authorize the communication, and upon arriving at an affirmative conclusion establishes the communication path, completes the communication, and compiles a charge to the first service provider and a statement of usage and presents the same to the first service provider.

46 Claims, 31 Drawing Sheets

U.S. PATENT DOCUMENTS

| | | | |
|---|---|---|---|
| 5,625,675 | * | 4/1997 | Katsumaru et al. .................... 379/67 |
| 5,724,355 | | 3/1998 | Bruno et al. .......................... 370/401 |
| 5,726,984 | | 3/1998 | Kubler et al. ......................... 370/349 |
| 5,793,762 | * | 8/1998 | Penners et al. ....................... 370/389 |
| 5,970,065 | * | 10/1999 | Miloslavsky ......................... 370/352 |
| 5,978,840 | * | 11/1999 | Nguyen et al. ...................... 709/217 |
| 6,078,582 | * | 6/2000 | Curry et al. .......................... 370/356 |
| 6,088,431 | * | 7/2000 | LaDue .................................. 379/114 |

\* cited by examiner

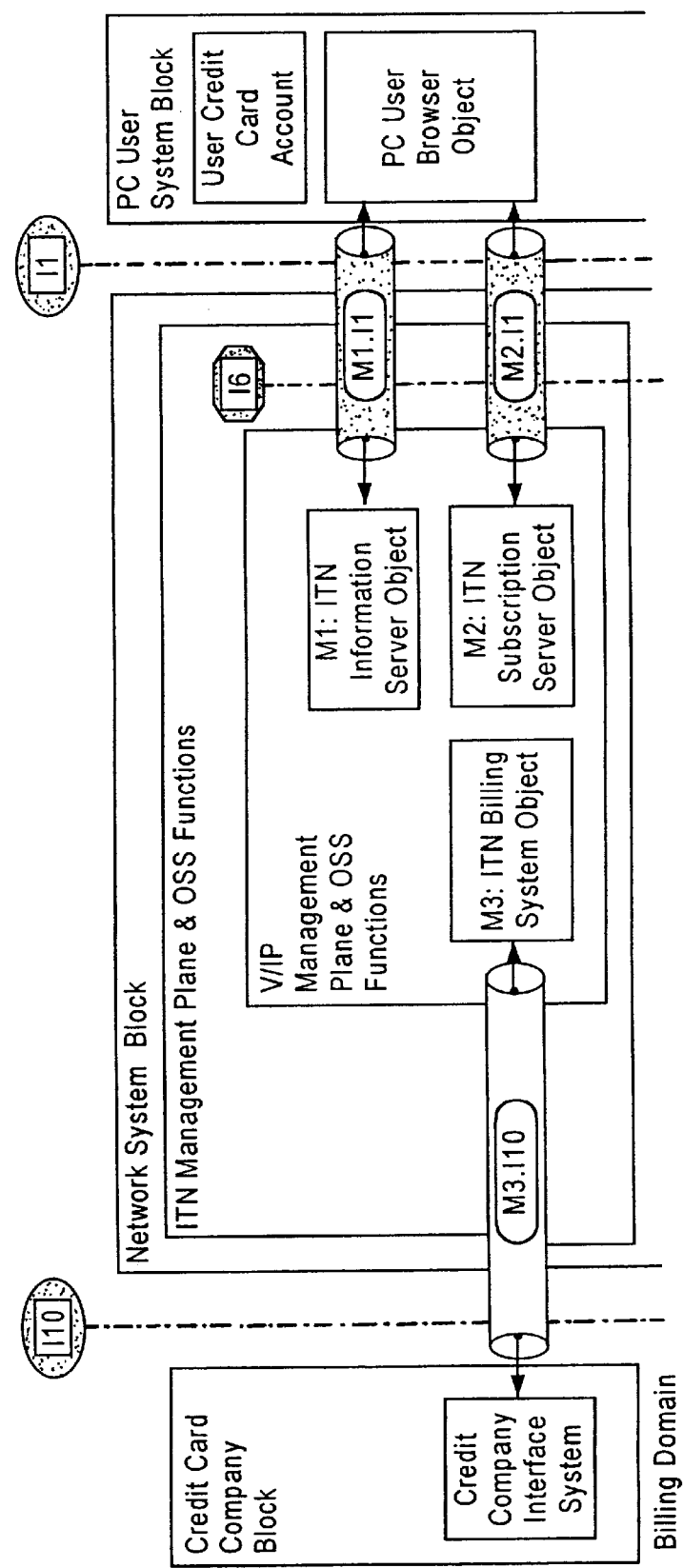

| Destination | Destination Node | Source | Source Node | Reserved Bandwidth |
|---|---|---|---|---|
| ITG 210 | R-1 | PC 628 | R-10 | OC-1 |
| ITG 624 | R-12 | PC 628 | R-10 | OC-1 |
| ITG 620 | r-11 | PC 628 | R-10 | OC-1 |
| Directory | R-5 | ITG 620 | R-11 | OC-3 |
| Directory | R-5 | ITG 210 | R-1 | OC-3 |
| Directory | R-5 | ITG 624 | R-12 | OC-3 |
| | | | | |
| | | | | |

FIG. 19

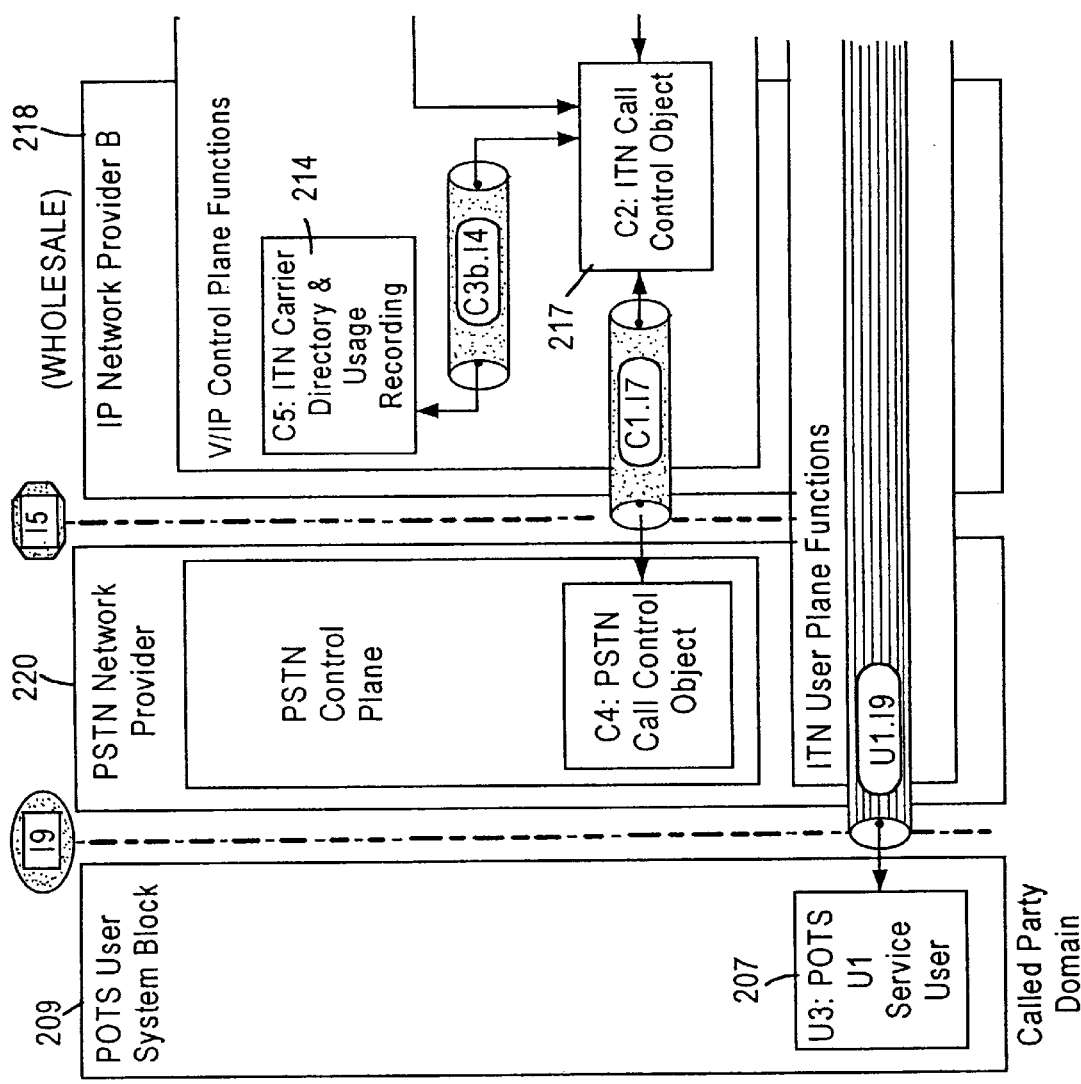

INBOUND GATEWAY AUTHORIZATION PROCESSING FOR INTER-CARRIER INTERNET TELEPHONY

RELATED APPLICATIONS

This application is a continuation-in-part of Eric A. Voit et al applications Ser. No. 08/931,159, now U.S. Pat. No. 6,157,869, Ser. Nos. 08/931,480, and 08/931,268, now U.S. Pat. No. 6,157,636 and Ser. No. 08/931,477, now U.S. Pat. No. 6,157,648 entitled NETWORK SESSION MANAGEMENT, filed respectively, Sep. 16, 1997, and Ser. No. 08/931,267, entitled INTER-CARRIER SIGNALING AND USAGE ACCOUNTING ARCHITECTURE FOR INERNET TELEPHONY, filed Sep. 16, 1997, assigned to the assignee of the instant application. This application is also a continuation-in-part of Eric A. Voit application Ser. No. 08/812,075, entitled Enhanced Internet Domain Name Server, filed Mar. 6, 1997 now U.S. Pat. No. 6,104,711, and assigned to the assignee of the instant application. This application is related to Currey, et al. application Ser. No. 08/768,460, entitled Internet Long Distance Telephone Service, filed Dec. 12, 1996, and assigned to the assignee of the instant application. Those applications are incorporated herein by reference in their entirety.

FIELD OF THE INVENTION

This invention relates to methods and systems for managing signaling and communication sessions across networks, and to a scalable methodology and system for managing telephony over hybrid networks such as combined switched telephone networks and packet switched internetworks, such as the Internet. More particularly the invention relates to authorization processing on the inbound gateway side of such networks.

BACKGROUND OF THE INVENTION

There is disclosed in the above identified parent applications, and hereinafter herein, a comprehensive architecture and methodology for providing telephony services over hybrid systems of circuit switched and packet switched networks, such as combinations of telephone networks and data networks typified by public switched telephone networks (PSTNs) and the Internet. In order to provide maximum flexibility and usability of such combinations it is desirable to enable and facilitate cooperative usage of the architecture and methodology by multiple service provider entities which supplement one another and which, in many instances, are competitors. This requires that it be possible to provide among such entities an acceptable and efficient resource allocation, usage allocation, usage accounting, and billing and settlement arrangement.

DISCLOSURE OF THE INVENTION

It is a primary objective of the present invention to respond to these needs.

It is another objective of the invention to provide an architectural environment and methodology which would permit an entity to be able to economically locate a terminating Internet telephony gateway anywhere in the world and rely on intercarrier agreements for partnering to complete calls in widely different geographic areas. The invention comprehends an arrangement that permits retail companies dealing with end users to manage their customers in real time without disclosing the customer identity or database contents to the terminating Internet telephony gateway supplier. In this arrangement the gateway operator may be considered to be a wholesaler dealing with a retailer who actually sells the service to the billed party. The retailer is selling services to the caller or customer and the wholesaler is providing the gateway, and perhaps other facilities, that the retailer uses for specific calls. The user benefits from the value of being able to complete calls anywhere instead of being restricted to the network of the retail supplier. Both the wholesaler and the retailer benefit in that the wholesaler deals with known retailer customers and the retailer deals with and collects from known retail customers. The confidentiality of the account databases of all parties are safeguarded.

The system operates without the retail customer necessarily knowing that the wholesale entity is terminating the call. The service therefore may have the brand of the retail company. The service is transparent to the customer as to the identity of the entity which is actually terminating the call. This facilitates handling of advertising and set up costs and enables the wholesale operation to achieve improved efficiency.

Existing databases and vertical services are supported without requiring architectural changes. Thus, as described in regards to the system disclosed in the parent applications, the retail entity may employ real time account management and provide the customer with real time call pricing and display or report of that price as a call progresses. It becomes possible to manage a customer account database uniquely, even though that customer account database is being queried by carriers other than the database owner. The retail carrier, who constitutes a customer to the wholesale carrier, has a predefined set of secure retail customer databases. At the same time, the wholesaler has a secure database of trusted retailers. The wholesale company with the wholesale terminating resource is in possession of a predefined list of trusted retailers and can use a secure link to that retailer to validate an individual transaction. As a result, it is not forced to trust information incoming from an unknown retail caller. The wholesaler has real time validation and authentication from the retailer.

It is another objective of the invention that the foregoing described objectives and advantages of the invention be made available with minimal limitations on the type of terminal equipment which may be employed by the users. Thus it is an object to provide a system and method which is capable of implementing convenient cross-network telephone communication regardless of whether the originator of a communication utilizes a computer or a plain old telephone (POT), and regardless of whether the destination of the telephone call is directed to a POTS terminal or a telephony equipped computer.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF DRAWINGS

FIG. 19 is a diagram illustrating typical stored virtual paths in the directory object of FIG. 18.

BEST MODE FOR CARRYING OUT THE INVENTION

Figure 1A:
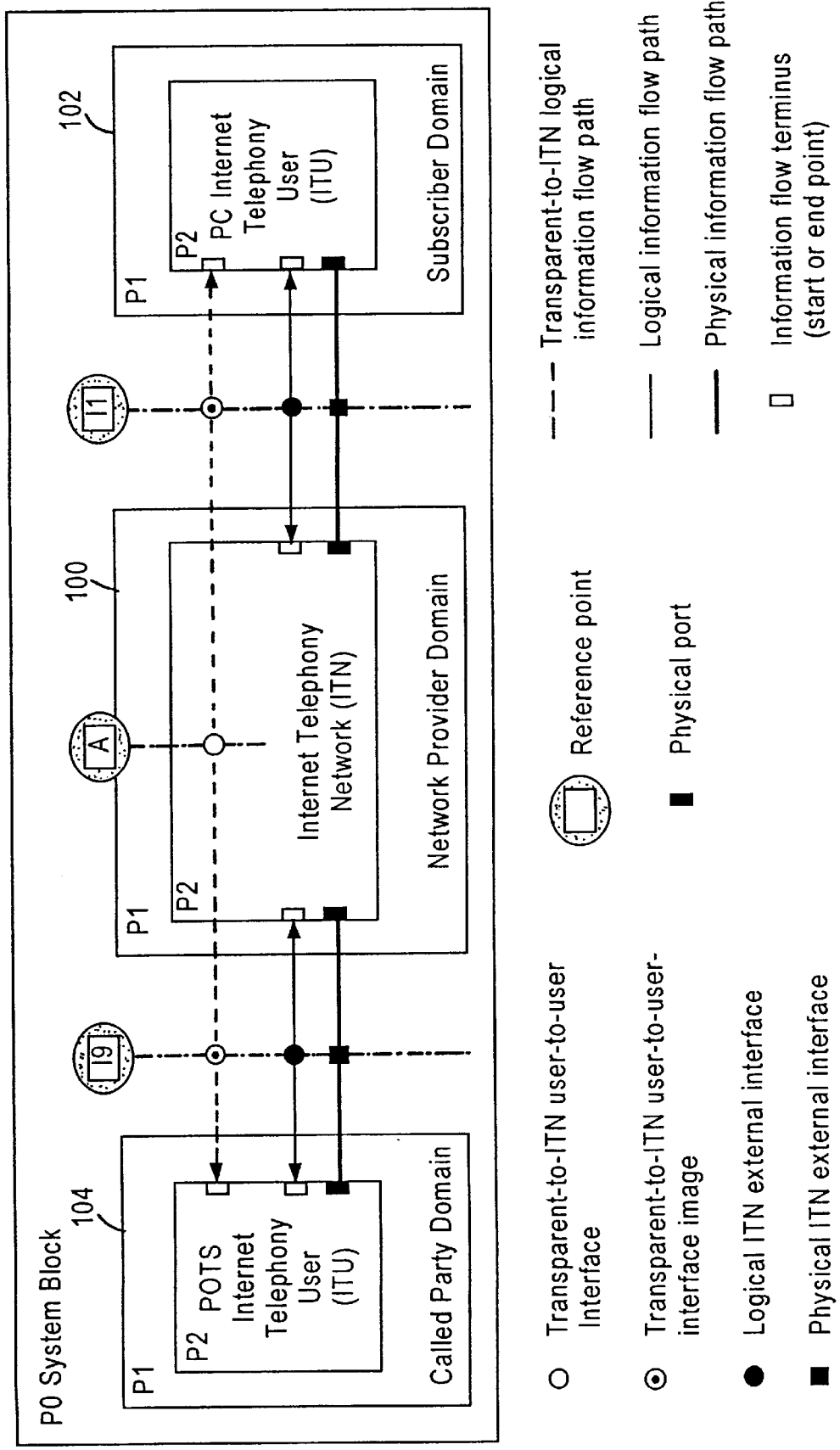
FIG. 1A is a high level (partition 1 level) diagram of a PC to Phone Internet Telephony architecture of one embodiment of the system of the invention.

Referring to FIG. 1A there is illustrated a high level (partition 1) reference model of the Internet Telephony Network or ITN. The center block 100 is the Internet Telephony Network or ITN, is shown in this illustration as managing a customer call between a PC and a POTS telephone. This ITN is in the Network Provider Domain and is responsible for all functions required of a traditional POTS network, i.e., call set-up, usage accounting, surveillance, etc. The ITN spans both the circuit switched network (such as a Public Switched Telephone Network or PSTN) and the packet switched (Internet Protocol or IP—frame relay, etc.) networks. The PC Internet Telephony User (ITU or computer or PC user) is shown at 102 in the Subscriber Domain and the called POTS Internet Telephony User (ITU or telephone user) is shown at 104 in the Called Party Domain. The interface between the PC user and the ITN is designated I1, while the interface between the POTS user and the PSTN is designated I9. I9 represents a standard analog or digital telephone interface.

Figure 1B:
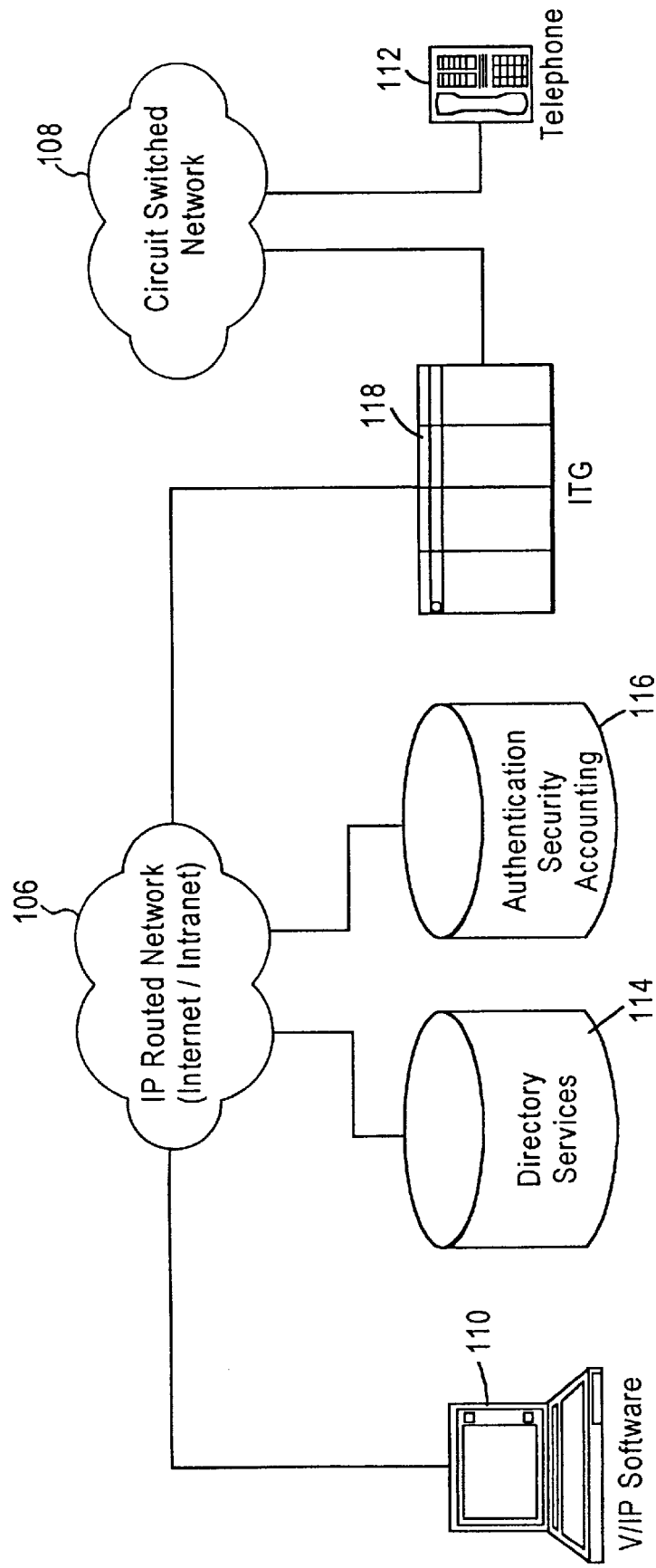
FIG. 1B is another simplified high level diagram of the generic system.

FIG. 1B shows a different high level depiction of the generic system wherein the packet switched and circuit switched networks are separately shown at 106 and 108. In this figure the end-to-end system connects a laptop computer 110 and a telephone 112. These constitute respectively the PC user call control object U1 and the U3 POTS U1 service user, as is presently described in further detail in relation to FIG. 2. The directory services object 114 and authentication and security accounting object 116 are coupled to the packet switched IP routed network 106. These constitute respectively the C1 ITN directory object and the C3 authorization, usage recording and pricing object, as presently described in further detail.

The Internet Telephony Gateway or ITG 118 connects the packet switched and circuit switched networks. This is sometimes referred to herein as the C2 ITN call control object. The computer may be linked to the packet switched network via any available computer to Internet link. Similarly the connection between the circuit switched network and the telephone may be any of the conventional links including POTS.

Figure 2:
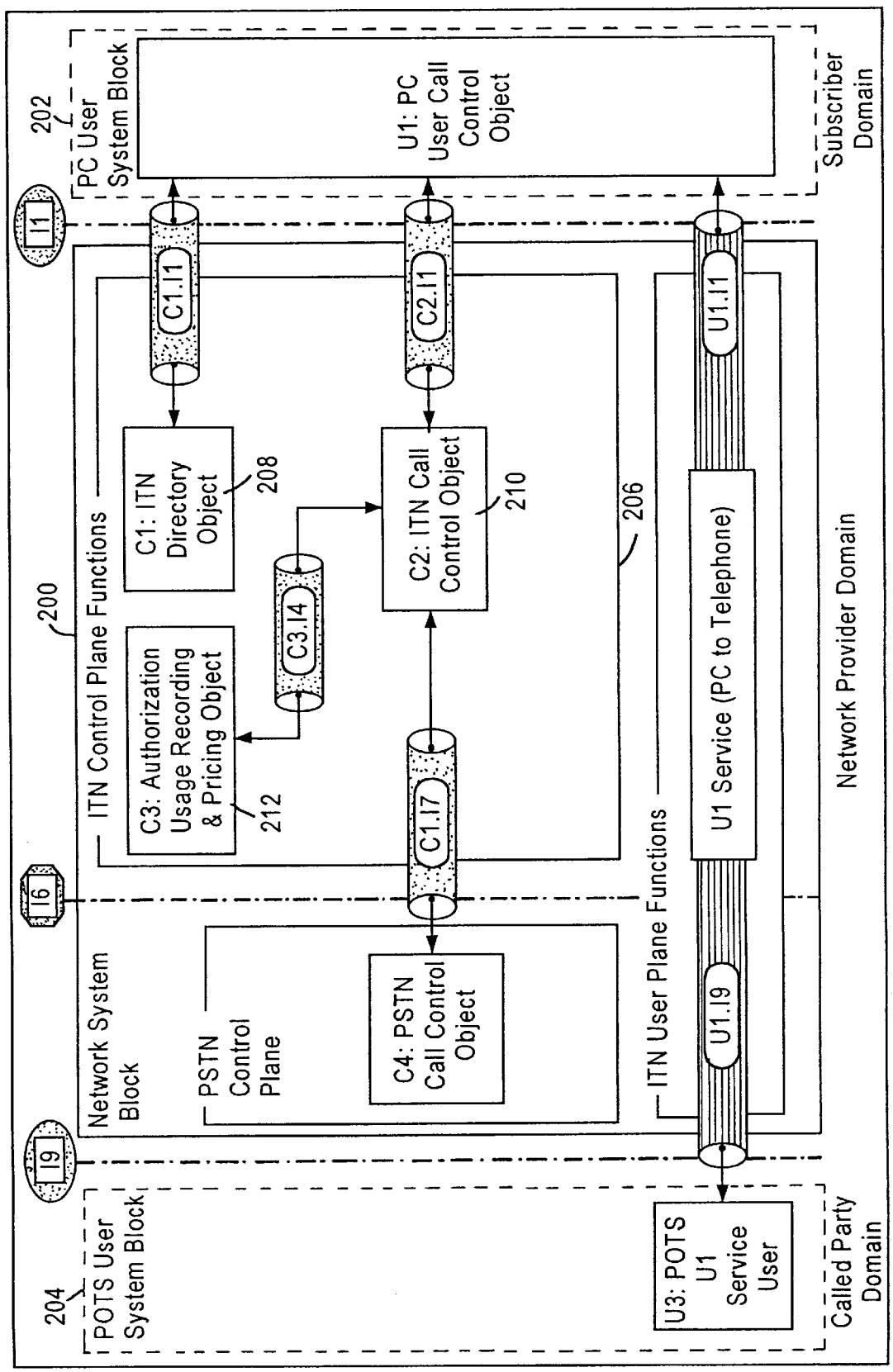
FIG. 2 is a diagram of one embodiment of a preferred architectural implementation showing interfaces between IP network elements.
Figure 3:
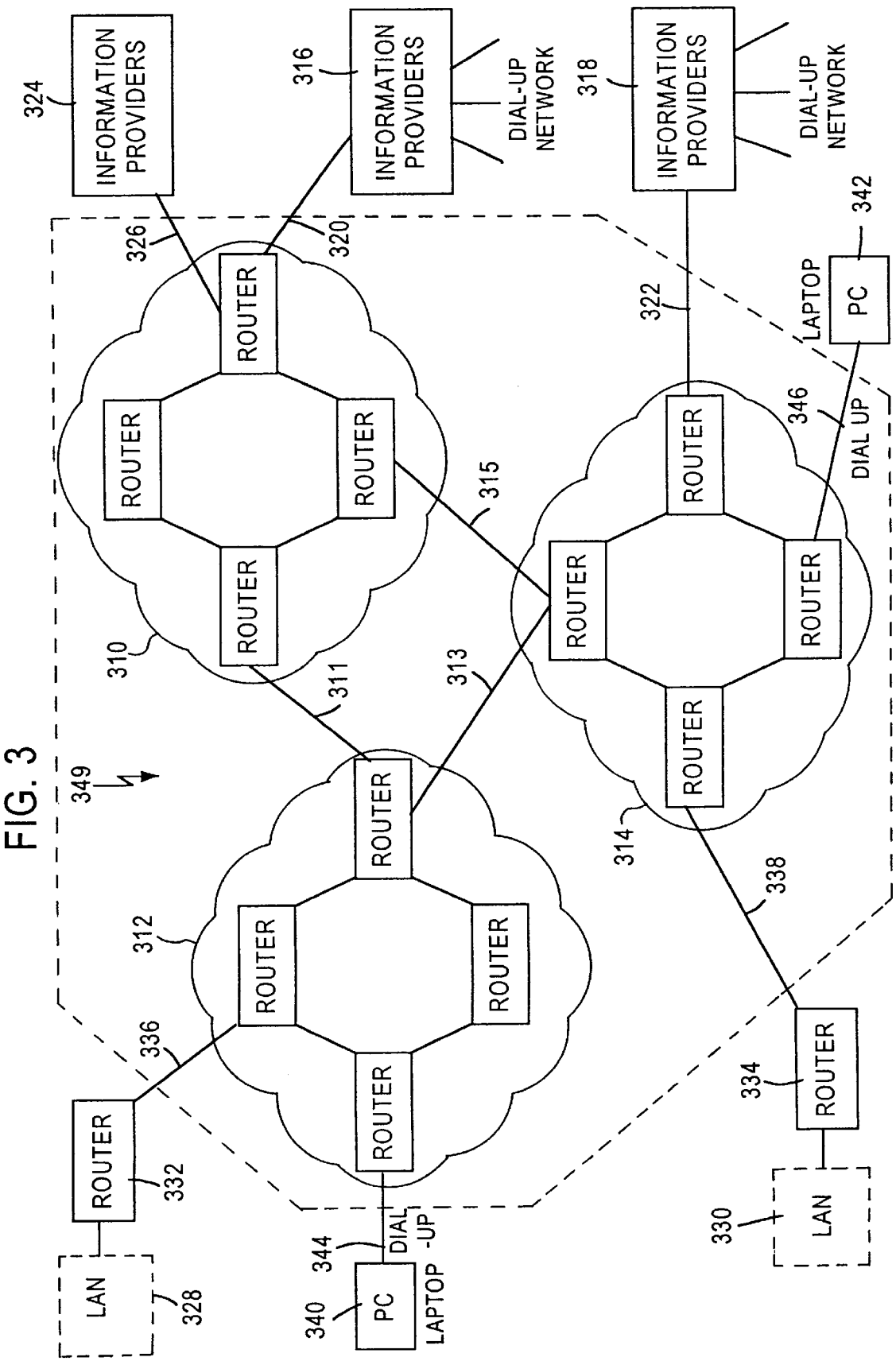
FIG. 3 shows a simplified diagram of the Internet and various types of systems typically connected thereto.

In order to manage a call across the circuit switched and packet switched and packet switched networks, it is necessary to provide an architecture, a set of interfaces, and a call flow. FIG. 2 is a diagram showing the interfaces between IP network elements in one architectural implementation. Referring to that figure there is shown at 202 the PC user System Block in the subscriber domain, which includes the U1 PC User Call Control Object. At 200 there is shown the Network System Block or network provider domain, which includes the PSTN Control Plane and C4 PSTN Call Control Object. At 204 there is shown the POTS User System Block or called party domain, which includes the U3 POTS U1 Service User. Within the Network System Block the ITN Control Plane functions are illustrated at 206. The ITN Control Plane functions are those which establish and teardown communication paths across the User Plane. Three Control Plane Objects are illustrated, namely:

C1: The Internet Telephony Gateway Directory Object

C2: The Internet Telephony Call Control Object

C3: The Internet Telephony Authorization and Usage Recording Object

These objects are shown respectively at 208, 210, and 212. Not shown in this figure is the PSTN Call Control Object C4 since neither the PSTN network elements nor the PSTN protocols are modified by the ITN system.

The C3 object represents the network element required in this architecture to perform customer authentication, call authorization, usage accounting, and usage pricing for a particular PC user's customer account. By bundling usage recording, pricing, and authorization into this one logical object, it is possible to eliminate the conventional separation between authorization and billing processes and significantly reduce the potential for fraud in a regionally deployed system. By having a single logical database which is managing customer authentication, authorization, and usage pricing for the network, a transaction-based approach to updating data is possible. This minimizes opportunities for fraud based on exploitation of the conventional temporary inconsistencies which are encountered with partitioned or replicated data bases. There is no requirement that this unitary logical object be implemented as a single physical system. Although not shown in FIG. 2, C3 can also respond to real time requests from external OSS systems for usage record details and account status information for the customer account.

The C3 object ensures coordination between User Authorization and Usage Recording for a single PC user's customer account. C3 also responds to external requests for that information.

According to the invention the C3 object is implemented in a manner such that multiple sites maintain their own database servers and no single site on the Internet is in possession of all of the authentication, authorization, usage pricing, and account data. The overall data constitutes a distributed database which forms a unitary logical object which relies on the database servers at the individual sites. Operation is such that a local C3 database or server receives a request for data. If the local server database cannot locate the requested information it sends a request to a second database server asking it to locate the information and send the results back to the requester. The second database server locates the information and sends a message to the requester. If the second database server cannot locate the information in its database it (or the local server database) sends a similar request to the next database server until the desired information is located. Alternatively, the account number may be coded so as to indicate the proper database instance. Database servers with this capability are described in detail in the common assignee's copending Sistanizadeh application Ser. No. 08/634,544, attorney docket number 680-170, filed Apr. 18, 1996. That application is incorporated by reference herein in its entirety.

The C3 object is invoked during a call when an Authorization request is relayed over the interface C3.I4. This interface is responsible for allowing an authorization of ITG usage by a service subscriber, and for maintaining the current state of a subscriber's connections within C3, as well as passing ITG generated usage records from C2 to C3 in real time. Communication through the C3.I4 interface is preferably encrypted and secure. The authorization request relayed over C3.I4 typically consists of an account number and password provided by the PC User to be authenticated by C3. At this point C3 checks the account password and available account balance. If the password is correct and the account remaining balance permits the call to be established, then C3 responds affirmatively to C2. C3 also retains data indicating that a call associated with that account is in progress. In such an architecture, mutual authentication of C2 and C3, and a secure transaction between them is preferred.

In providing the authorization, C3 evaluates the customer account status to determine if there are multiple connections currently in service (possibly across multiple ITGs). It should be appreciated that while FIG. 2 shows only a single gateway between a PC user and the ITN (via the PSTN), a plurality of gateways exist serving the various regional areas from which subscribers may request service. With the state information obtained from the C3 status evaluation the authorization system may ensure that only one call per account is being handled by the network, and/or ensure that the maximum billing limit is not being circumvented by multiple concurrent sessions. If this precaution is not provided a second PC caller using the same account and password might receive authorization for a call prior to the posting of the first caller's usage record. Optionally, in order to handle low billing amount availability without denying a call completely, C3 can respond to C2 with a maximum allowable call duration.

Another feature is that C3 may reserve a certain remaining balance on the account for the call so that additional calls related to that account will not result in exceeding that account's limit. C3 may return the pricing algorithm for the usage to C2 which will pass it on to the PC user. In this way the PC user knows the initial charge and ongoing per minute rate for the requested usage. This is particularly important when C2 is owned by a different company than C3, and the user wants to know the overall rates that will be charged prior to completing the call. The PC is such as to be able to receive and utilize the algorithm, and display pricing to the user. The PC is also able to present the total charge being incurred by the user as time goes on during the call.

After the completion of the call, the C3 object is also responsible for accepting usage recording data from C2, pricing the usage, and decrementing that priced amount from a customer's available balance. C3 then logs the final call data. Preferably C2 also logs and maintains the call detail information. This feature is very useful in the situation where C2 and the C3 database objects are owned by different companies. In this case, the database object data can be used by its owner to manage the customer account. In addition, the C2 data can be used by the owner of the C2 object to charge the C3 database object for the completion of the call over its facilities. In effect this C2 data becomes the basis for a usage based settlement interface between carriers.

Preferably the C3 system is partitioned. Such a partition may be made by a field identifying the carrier owning the customer account, a sub-field within the customer account number (such as NPA-NXX), the customer's telephone number, the customer's e-mail domain name, the customer's originating IP address, or some other field. Each partitioned database may then be placed on its own physical system on a geographical or other basis. With such a partitioned customer account data architecture, the domain of all managed accounts may be divided into efficiently implementable sub-groups.

Figure 4:
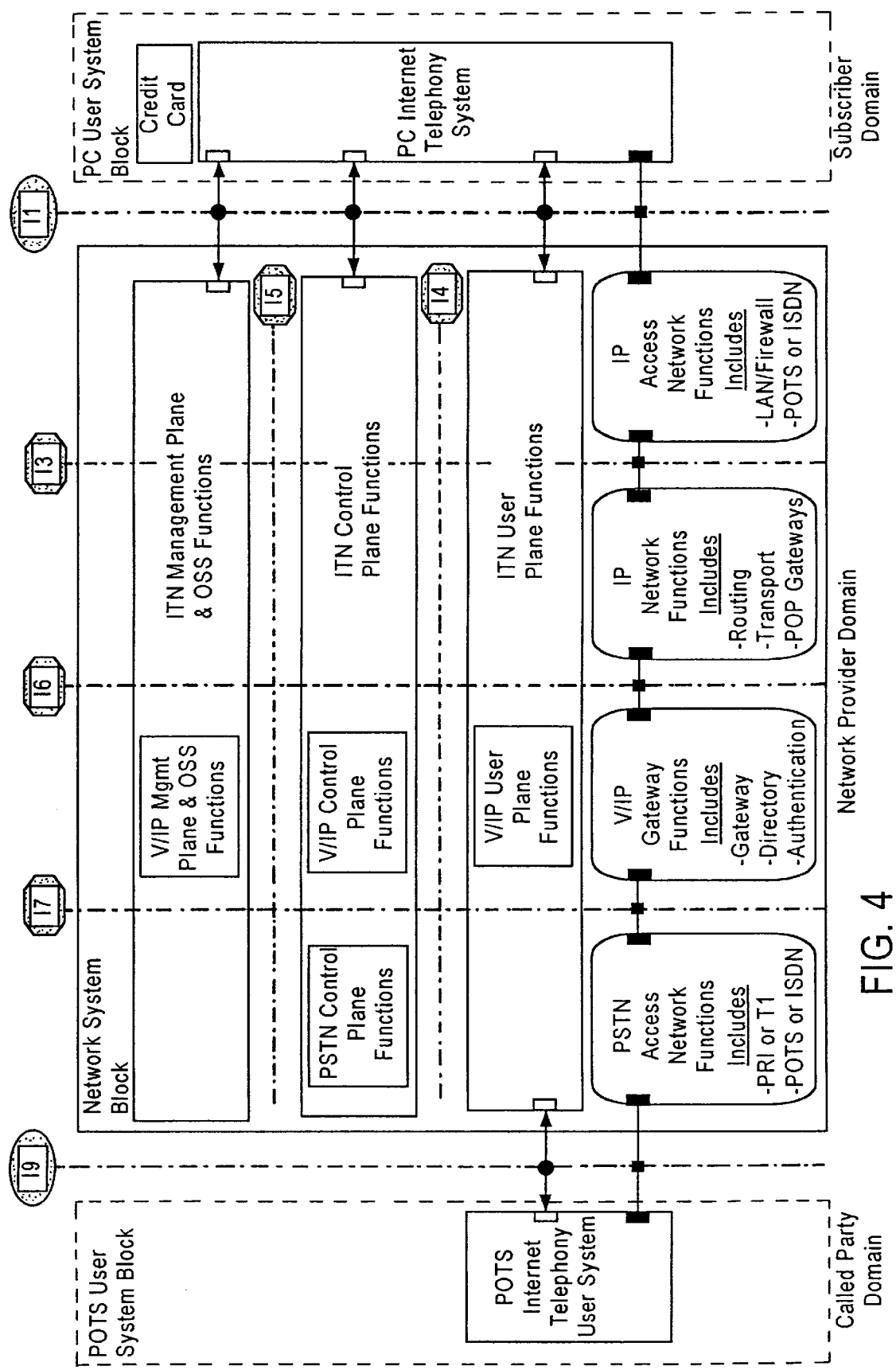
FIG. 4 is an Internet Telephony Network (ITN) block diagram showing the ITN system at a second level of partitioning (partition 2 level).

Referring to FIG. 4 there is provided an illustration of the ITN system at a second level of partitioning. Within this partitioning there are three planes (types of processes which span all the network elements involved with a service), and four types of network functions (domains of individual transport networks (e.g., PSTN or IP) over which communication must cross).

The three planes are:

The ITN User Plane Functions: These functions are those which are directly involved with real time communications transport and signal manipulation within a network.

The ITN Control Plane Functions: These are the functions which establish or set-up and tear-down communication paths across the User Plane.

The ITN Management Plane and Operations Support Systems Functions (OSS): These are the functions needed to provision and maintain the elements of the User Plane and Control Plane.

The four network functions are:

IP Access Network Functions (right or PC User Side): The IP access network is used locally on the PC user side simply to reach the IP network. This access may be direct via a LAN, or over a circuit switched PPP link connected to a Point of Presence (POP).

IP Network Functions: The IP network is the involved Intranet backbone and associated support systems (such as the DNS), this network provides the IP transport functions.

V/IP Gateway Functions: These are the network functions (and elements) which are involved primarily with supporting a Voice over IP service.

PSTN Access Network Functions (POTS User Side) The PSTN access network consists of the traditional PSTN connecting the Internet Telephony Gateway (ITG) to the called telephone user.

Figure 5B:
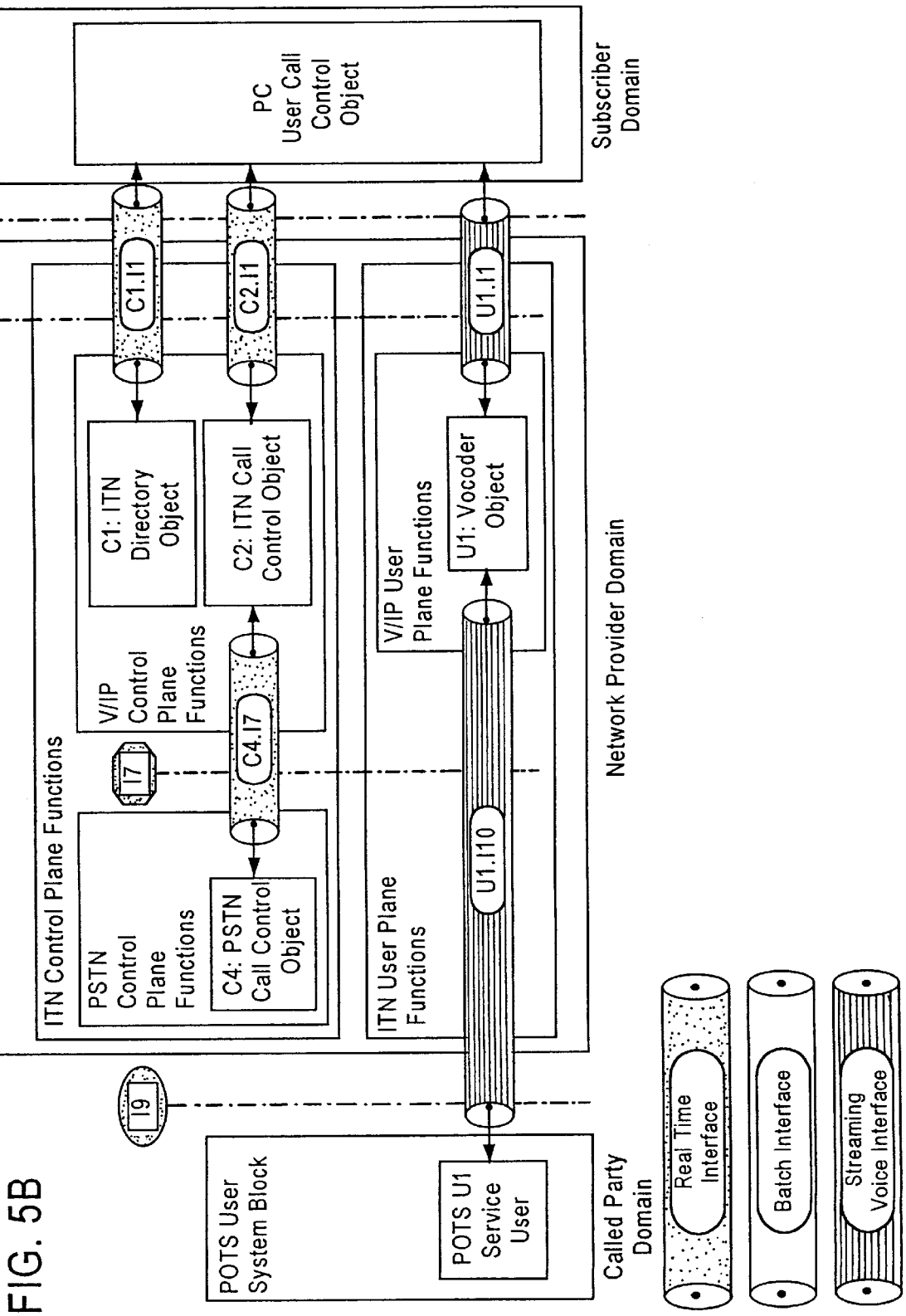
FIG. 5 illustrates the V/IP objects and interface relationships between users and the network, including external objects and interfaces.

The V/IP Gateway Functions and relationships to the other elements involved with the V/IP service are now described in relation to FIGS. 4 and 5. FIG. 4 illustrates interface references defined between the different User Planes and the different Network Functions. Although this partitioning has been done at the logical level, it is not necessary that physical systems be partitioned in this manner. As an example, an Internet Telephony Gateway may have functions spanning both the Control Plane (call setup) and User Plane (Vocoding).

The internal interface references designated within FIG. 4 are:

1. The interface between the Control Plane and the Management Plane functions is shown at I5. Management functions such as directory table maintenance, surveillance, and periodic billing exports cross the I5 interface.

2. The interface between the User Plane and the Control Plane Functions is shown at I4. Interfaces between various elements of the Control Plane are also designated as I4.

3. The interface between the V/IP Gateway and POTS Access Network is shown at I7.

4. The interface between the IP Network and the V/IP Gateway functions is shown at I6.

5. The interface between the IP Network and the PC Access Network is shown at I3.

6. For the sake of simplicity, one additional interface of lower utilization, I10, is not shown in FIG. 4. This interface is an external billing interface to a credit card provider and is shown and detailed in FIG. 5.

FIG. 5 illustrates the V/IP objects and interface relationships between users and the network, including external objects and interfaces. An object is a major process which has been identified within the functional specifications of the system. An interface is a communications path between two objects. External objects are objects which use interfaces that span between different network functions. By defining external objects and interfaces in this way, the V/IP system elements can be defined based on any communication which might be made across interfaces I6, I7, and I10 as shown in FIG. 5.

FIG. 5 shows a second level of partitioning illustrating the user, control and management planes within the network. Only those objects attached to a new or modified object for the V/IP service are shown. Other previously shown objects required for V/IP in the IP Management and Control Planes between I6 and I3 are not shown. The U1 PC to Phone service is a user plane service which is shown and defined in FIGS. 5 and 6.

Figure 6:
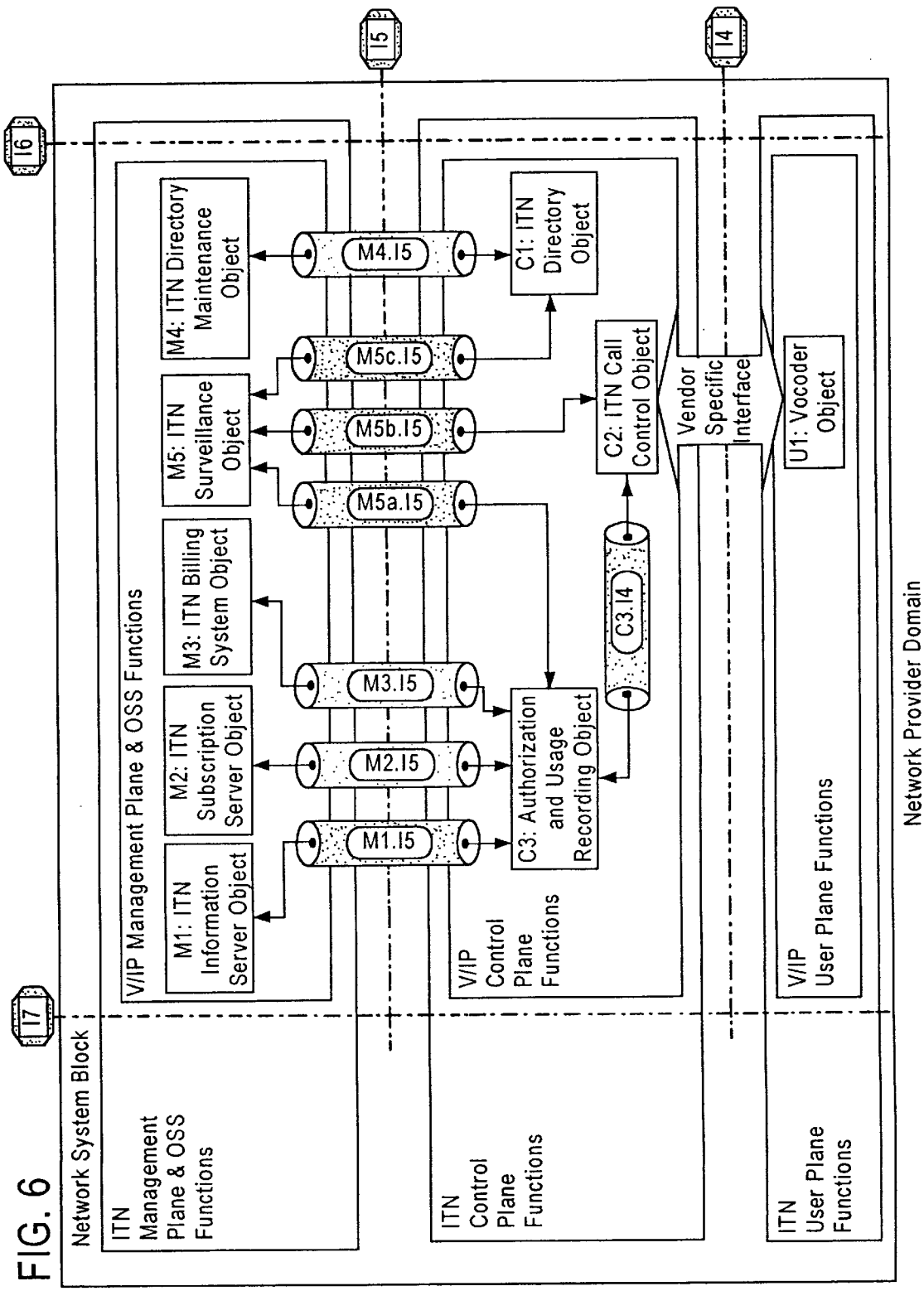
FIG. 6 illustrates the V/IP objects and interface relationships which have been defined between internal ITN objects.

FIG. 6 illustrates the V/IP objects and interface relationships which have been defined between internal ITN objects. Again only those objects or interfaces that are new or modified for V/IP are shown. Multiple objects may be contained within a single physical entity, and this physical entity may cross several planes.

The more significant objects and interfaces are now described in further detail.

ITN objects are considered to be partitions of the ITN processing requirements into sub-systems. A definition of ITN platform objects in this way, independent from protocol or message set constraints, provides a logical view of the system independent of those constraints.

User Plane Objects

U1 Object: Vocoder

The U1 Object converts packetized voice segments (which are encapsulated with IP) to and from circuit switched voice segments (which are encoded in Pulse Code Modulation (PCM)). The Vocoder performs various functions in order to accomplish this. It buffers a certain amount of packetized voice segments in order to maintain a continual flow on the circuit switched network. It dynamically assesses the delay characteristics of the transport network between the Vocoder and the User's software application in order to minimize those buffer requirements.

The Vocoder is able to handle all ITG ports in service, with all participants (on both sides of each call) talking at the same time. The Vocoder also identifies the level of packet loss resulting from voice transport across the IP network and maintains a record of that packet loss for summary reporting. Based on the level of packet loss, the Vocoder applies corrective algorithms to the voice wave form so that the resulting loss of signal quality is minimized for the called PSTN party.

The U1 Object is able to identify a loss of voice content packets, or a continuous stream of format errors in the encoded voice data incoming on the U1.I1 and U1.I10 interfaces (see FIG. 5). If such a condition is found and there has been no corresponding signaling at the control plane level, U1 will notify C2 to pull down the connection and perform any necessary clean up tasks.

User Plane Interfaces

Two user plane interfaces are defined:

External Entity to V/IP User Plane

1) U1.I1: The Internet Telephony Packetized Voice Interface is an external interface which is responsible for transporting Vocoded, packetized voice segments across the IP Access Network and IP Network.

2) U1.I10: The Circuit Switched Voice Interface is an external interface responsible for transporting PCM voice segments across the PSTN.

Control Plane Objects

Three control plane objects are defined:
1) C1: Internet Telephony Gateway Directory Object
2) C2: Internet Telephony Call Control Object
3) C3: Internet Telephony Authorization and Usage Recording Object (Internal)

The C1 Object: The Internet Telephony Gateway Directory manages which E.164 addresses (telephone numbers) are served within the terminating footprint of a particular ITG. The management of the terminating footprint may be in the form of NPA-NXX ranges which relate to an IP address for a single ITG. When queried with a "called" telephone number by the PC Call Control Object, the C1 object returns the IP address of the Internet Telephony Gateway (ITG) that serves the called telephone number.

The IP address of the V/IP Server is communicated to the PC user or Client software application prior to initiating contact with the C1 object. The object's TCP port number for the C1 directory application is defined, selected, and maintained within the client software.

The C2 Object: Internet Telephony Call Set-Up may be described as follows:

The ITN (ITG) communicates with the PC user to establish a PC-to-Telephone call. The call setup is originated by the PC user and destinated or terminated by the telephone user by supplying the address or number of the called terminal. However, it is the C2 Object or Call Control Object which coordinates the signaling among the involved network elements. Included in this signaling are:

Management of the state of the call with the client PC software (via C2.I1 shown in FIG. 5).

Validation of a PC users' Account number and password (via C3.I4 shown in FIG. 6).

Establishment and tear down of the PSTN circuit (via C4.I7 shown in FIG. 5).

Generation of usage information which is sent for processing and pricing (via C3.I4 shown in FIG. 6).

Managing the state of the connection within C3 (via C3.I4 shown in FIG. 6).

When initiating a V/IP call, the PC user may be required to provide the 10 digit E.164 (ITU-T telecommunication numbering or telephone number) address of the called telephone user, the IP address of the ITG associated with the called telephone user (obtained via the C1 Object), the PC's IP address, as well as the billing account number and associated password.

The C2 object is able to signal various states of a connection (ringing, busy, etc.) to a PC user. If the C2 object receives a maximum call duration from C3 during call set-up, this maximum call duration is sent to the PC software either as an audio message or as information to be presented on the PC screen. C2 generates the raw usage records which are sent to C3. A usage record is not tagged as billable unless the PC application has acknowledged its receipt of a connection establishment message. The C2 object may require a user ID and password to be provided by the PC Client software prior to completing a V/IP call. This information is authenticated via the C3 object.

The C3 Object: User Authorization and Usage Recording

The C3 Object ensures coordination between User Authorization and Usage Recording for a single PC user's customer account. C3 also responds to external requests for that information. C3 is a unitary logical object with distributed instances. That is, physically distributed account, authorization, validation and billing databases are so arranged as to be usable as a single logical object. The data associated with a user subscriber account is typically stored in an instance of C3 which is local to the user subscriber. The C3 Object is invoked during a call when an Authorization request is relayed over C3.I4 (this request typically consists of an account number and password provided by PC User) At this point C3 checks the account's password and available monthly minutes remaining, and responds appropriately to C2. Optionally, C3 can respond to C2 with a maximum allowable minute duration for a call. Successful account validation by the C3 Object is a prerequisite to successful call establishment by the C2 Object.

The C3 Object is also responsible for accepting usage recording data from C2, and decrementing the minutes used from the available minutes (and/or optionally pricing that usage, and decrementing that priced amount from a customer's existing balance), and then logging the information. Preferably, C3 also knows the state of a users connections across multiple ITGs. With this state information, the authorization system may ensure only one call per account is being handled by the network, and/or ensure that the maximum available minute limit is not being circumvented by multiple concurrent sessions (otherwise a second PC caller might receive authorization for a call prior to the posting of the first caller's usage record).

The theory behind bundling usage recording, pricing, and authorization into one logical object is to significantly reduce the potential for fraud when the system is widely deployed. By having a single logical database which is managing customer authentication, authorization, and usage pricing for the network, data synchronization is facilitated, and opportunities for fraud are minimized. As described, it is not necessary that C3 be implemented as a single physical system. The C2 Object will provide C3 with a customer billing account number and a password (originally supplied by the PC user). The C3 Object maintains a current account "minutes remaining" balance and usage records for each user on a monthly basis. This usage information can be extracted in real time based on a request from the M1.I5 interface as shown in FIG. 6.

If a user who is requesting authorization has a low "minutes remaining" balance, and this low balance will result in a maximum call duration which is shorter than the maximum call duration typically allowed by the network, then the Authentication server will transmit a maximum call duration back to the C2 Object.

The Control Plane Interfaces

Four control plane interfaces are defined:

External Entity to V/IP Control Plane

1) C1.I1: The Internet Telephony Directory Interface is an external interface which is responsible for PC to Directory services address resolution (see FIG. 5). The client PC provides the E.164 address (telephone number) of the intended party to be called, and the Directory service returns the IP address of the appropriate hop-off Internet Telephony Gateway.

2) C2.I1: The Internet Telephony Call Management Interface is an external interface which is responsible for PC to Internet Telephony Gateway signaling for call establishment and tear-down.

3) C4.I7: PSTN Call Management Interface is an external interface which is responsible for managing signaling to the PSTN which is necessary for the PSTN to establish and tear down circuit switched connections to the called party. Signaling from the ITG to the serving PSTN central office is preferably via PRI ISDN. Alternately, T1 E&M PSTN signaling may be used.

4) C3.I4: The Internet Telephony Authorization and Usage Recording Interface is an internal interface shown in FIG. 6, and is responsible for two functions. First the interface must allow for an authorization of ITG usage by a service subscriber. Second, the interface must maintain the current state of a subscriber's connections within C3, as well as pass ITG generated usage records from C2 to C3 in real time.

Management Plane Objects

Five management plane objects are defined and shown in FIG. 6:

1) M1: ITN Information Server & Feedback Object
2) M2: ITN Subscription Server Object
3) M3: ITN Billing System Object
4) M4: ITN Directory Maintenance Object (Internal)
5) M5: ITN Surveillance Object (Internal)

The M1 Object: The ITN Information & Feedback Server allows the PC user to access information on the V/IP service including general and user-specific information. Essentially, the M1 Object is the HTML interface to the V/IP network for subscribers of the service. Following is the information which the user might request from the ITN via HTML:

Descriptions on how to download and install client software and operate the service Descriptions of service availability and pricing plans Graphical (map) areas showing the ITG terminating footprints NPA-NXX ranges supported by the ITG terminating footprints Call usage record details (will extract the data from the control plane in real time via M1.I5)

Billing account status & balance (will extract the data real time via M1.I5)

Change of the ITN password (will verify old password and update to new password via M1.I5)

An introductory page, with links to each of the pages items listed above.

Operationally the M1 Object interface will be accessible via commercial browsers and at least a Netscape 3.0 or Internet Explorer 3.0 web browser. On any customer specific request for usage records or account balance, a PC user will have to provide within the query the same account number and password which is used for call establishment. This information will be validated by C3 when fulfilling the request.

The M2 Object: ITN Subscription Server: The ITP allows the PC user to subscribe to the V/IP service via an on-line process. Information gathered from the potential subscriber will include:

ISP (Internet Service Provider) account number

ISP email address

CPU type of PC, amount of memory

Type of sound card, microphone and speakers

Operating System and version

Global Service Provider (GSP)

Free disk space

Upon activation the subscriber will receive notification via email. This email will include instructions, the web page URLs (Uniform Resource Locator or www (World Wide Web) address) needed to get started, and an initial password (which can be changed via M1).

The M3 Object: ITN Billing System: Monthly, the M3 Object will poll C3 to extract account balances and credit card numbers in order to request payments from credit card companies. As account balances are processed by the M3 Object, failed billing attempts will be flagged in a report (either formatted as ASCII, or in a PC database product's format).

The M4 Object: ITN Directory Maintenance: Directory data (in the form of NPA-NXX ranges pointing to ITGs) will be created, validated, and managed outside of the network (away from C1, the ITN Directory Object). The M4 object is responsible for this function. M4 will accomplish this by assisting in the creation of the Directory tables in a format which can be exported directly (via M4.I5) to C1. The M4 Object preferably also supports the creation of graphical maps showing the terminating call areas supported by the ITGs. The maps and the NPA-NXX table information may be exported so that it may be presented to the user via M1. Off the shelf software products like MapInfo may be used to support the requirements of M4.

Operationally the M4 Object is able to import NPA-NXX data, along with supporting graphical central office serving area information. The object is able to graphically define ITG terminating calling areas. The M4 Object automatically generates the NPA-NXX to ITG IP address Directory table based on the graphical information provided above. The M4 Object supports multiple versions of the C1 Object Directory database.

The M5 Object: ITN Surveillance: The V/IP service may cross many network elements within the ITN. Having a centralized surveillance capability which can span multiple platforms ensure its operation. The M5 Object attempts to identify and log critical alarms, and to present these alarms to an administrative console. Such alarms may include: Whether a network based application is under distress (via an SNMP Management Information Block (MIB)), whether the system is alive and communicating with the network (via "Ping" or similar function), whether required application processes are active and if they need to be restarted (via a "ps -eaf" or similar function), whether the processes are sane (via periodic test queries to validate correct responses).

These types of problems may be analyzed by M5, and alarms generated and logged within C5 at four levels: Critical (service affecting), Major (user intervention recommended), Minor (of note), and Informational (components reporting normal operation). These alarms may be used to manage a local database containing managed objects representing the current operational state of ITN platforms and processes. Each managed object and/or platform will be assigned one of three operational states: Red (out of service), Orange (operating with degraded capabilities), and Green (operating normally). A graphical representation of the ITN network is presented to a console via a standard display package such as OpenView. Console operators have the option of directly connecting to any ITN object or system to perform troubleshooting or diagnostic operations. This connection presents the console operator with the same capabilities as a local system administrator.

With respect to M5 addressing requirements, new elements added to the ITN will have their IP addresses and their type of object identified in M5. The M5 Object will create its database of managed objects dynamically (once given the IP address or host name) via the M5x.I5 interfaces.

Management Plane Interfaces

Ten Management Plane Interfaces have been defined:

External Entity to V/IP Management Plane

1) M1.I1: Internet Telephony Data Request Interface
2) M2.I1: Internet Telephony Subscription Interface
3) M3.I10: Credit Card Provider Interface V/IP Management Plane to V/IP Control Plane
4) M1.I5: Internet Telephony Network Data Extraction Interface 5) M2.I5: Internet Telephony Subscription Management Interface
6) M3.I5: Internet Telephony Billing and Usage Extraction Interface
7) M4.I5: Internet Telephony Directory Maintenance Interface
8) M5a.I5: Internet Telephony Call Management Surveillance Interface
9) M5b.I5: Internet Telephony Authorization and Usage Recording Surveillance Interface
10) M5c.I5: Internet Telephony Directory Surveillance Interface The functions of these interfaces are as follows:

The M1.I1 Interface: The Internet Telephony Data Request external interface is responsible for providing a subscriber with data requested about the ITN in real time.

The M3.I10 Interface: The Credit Card Provider external interface is responsible for allowing an ISP to place a charge against a user's credit card account number.

The M1.I5 Interface: The Internet Telephony Network Data Extraction internal interface is responsible for providing the M1 Object with real time data regarding a subscriber's remaining minutes of use, usage records of the current and previous billing cycle, and/or calls currently in progress. The M1 Object will reformat and present this data to the subscriber who requested it.

The M2.I5 Interface: The Internet Telephony Subscription Management internal interface is responsible for managing the list of account numbers allowed to use the ITN. This interface supports several functions: an initial batch load of subscribers and initial passwords, adding or removing individual account numbers, and resetting individual passwords.

The M3.I5 Interface: The Internet Telephony Billing and Usage Extraction internal interface is responsible for performing a periodic extraction of usage records from the network.

The M4.I5 Interface: The Internet Telephony Directory Maintenance internal interface is responsible for maintaining the NPA-NXX to hop-off ITG directory data.

The M5a.I5 Interface: The Internet Telephony Call Management Surveillance internal interface is responsible for carrying a variety of information which allows M5 to assess the availability, health, and status of the physical computer and software processes of the various Internet Telephony Gateways.

Figure 7:
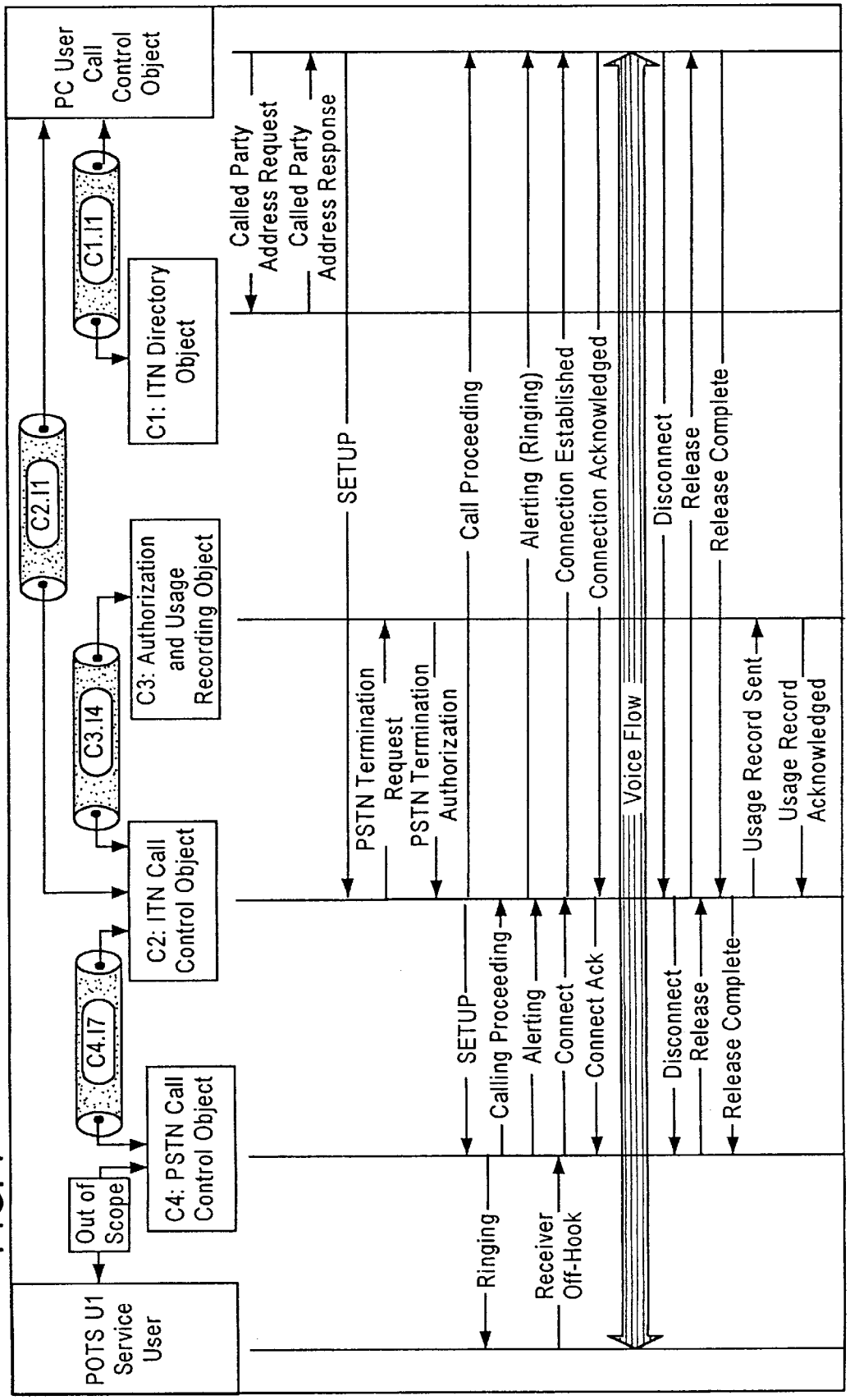
FIG. 7 is a diagram of a typical control plane message flow.

Based on the foregoing descriptions of the interfaces and objects a high level call flow of signaling messages is described. FIG. 7 illustrates an example diagram of such a control plane message flow. This example should be understood to show one version or embodiment of a set of messages which may be implemented for a PC to PSTN service. Converse messages would be utilized for a PSTN initiated PSTN to PC service, as well as appropriate corresponding messages for PC-PC and telephone-telephone service. Additional messages may be added if enhanced functionality is provided.

The call flow starts at the point where the user has established IP layer connectivity with the network, and has invoked the V/IP software application. This preliminary procedure typically entails the following steps by the party initiating the call (not illustrated in FIG. 7):

1. The customer will boot the PC, and connect to the IP network following their existing procedures for network access.

2. The customer will launch their V/IP application, either as a plug-in to an existing browser or as a stand-alone application. When launched, this application will present a template of fields which are required to initiate a call.

3. The customer will populate a "telephone number to be called" data field. The customer will also either populate his/her account number and password, or the application will reapply this data if it has been previously saved within the application.

4. The customer will then initiate the call. During the call, the call's completion status will be presented in real-time to the user by the application (via a visual display). One example of the call initiation procedure is now described.

The following steps commence with the Called Party Address Request step in FIG. 7 and proceed as follows:

1. The user initiates a call via the PC's V/IP software. This software application invokes the Directory (C1 Object) to obtain the IP address of the destination ITG. Based on the dialed number submitted by the PC application as described in the foregoing preliminary procedure, the C1 Object returns the IP address of the associated ITG (C2 Object).

2. The PC's V/IP software application invokes the C2 Object to set up a call by passing to C2 the number to be called, the user's account number, and a password. This is shown as SETUP in FIG. 7.

3. C2 invokes the C3 Object in order to receive authorization to proceed with the call (PSTN Termination Request). This may entail communication among instances of the distributed database to verify the account status of the caller and optionally set a limit on the duration or cost of the call depending upon the account status and/or balance. The pricing of the call may be communicated to C2 for communication to the caller. C3 will pass the authorization information back to the C2 (PSTN Termination Authorization).

4. If authorization was successful, C2 will establish the PSTN connection, and notify the client software that the call is proceeding (SETUP Call Proceeding). C2 may also pass on to the calling PC the pricing information obtained from C3. C2 will continue to update the client software with call establishment information as the call is proceeding and may also pass along to the caller a running account of the cost of the call.

5. After the call has been established, the PC will respond to the network that it recognizes that a connection has been established (Connection Acknowledged), timing of the call's duration can be initiated, and any usage measurements will indicate that the call is billable.

6. Steady state call (Voice Flow).

7. The PC's V/IP software application invokes the C2 service to release the call. The PC application signals release to C2, and C2 releases the call in the PSTN and confirms the release back to PC application. Also, timing of the call's billable duration is completed. Alternatively, the PSTN user may initiate call tear down as well.

8. The C2 Object passes a usage record to C3 for reporting. The C3 Object may also initiate individual call billing by reporting to M3 as shown in FIG. 6.

Figure 8:
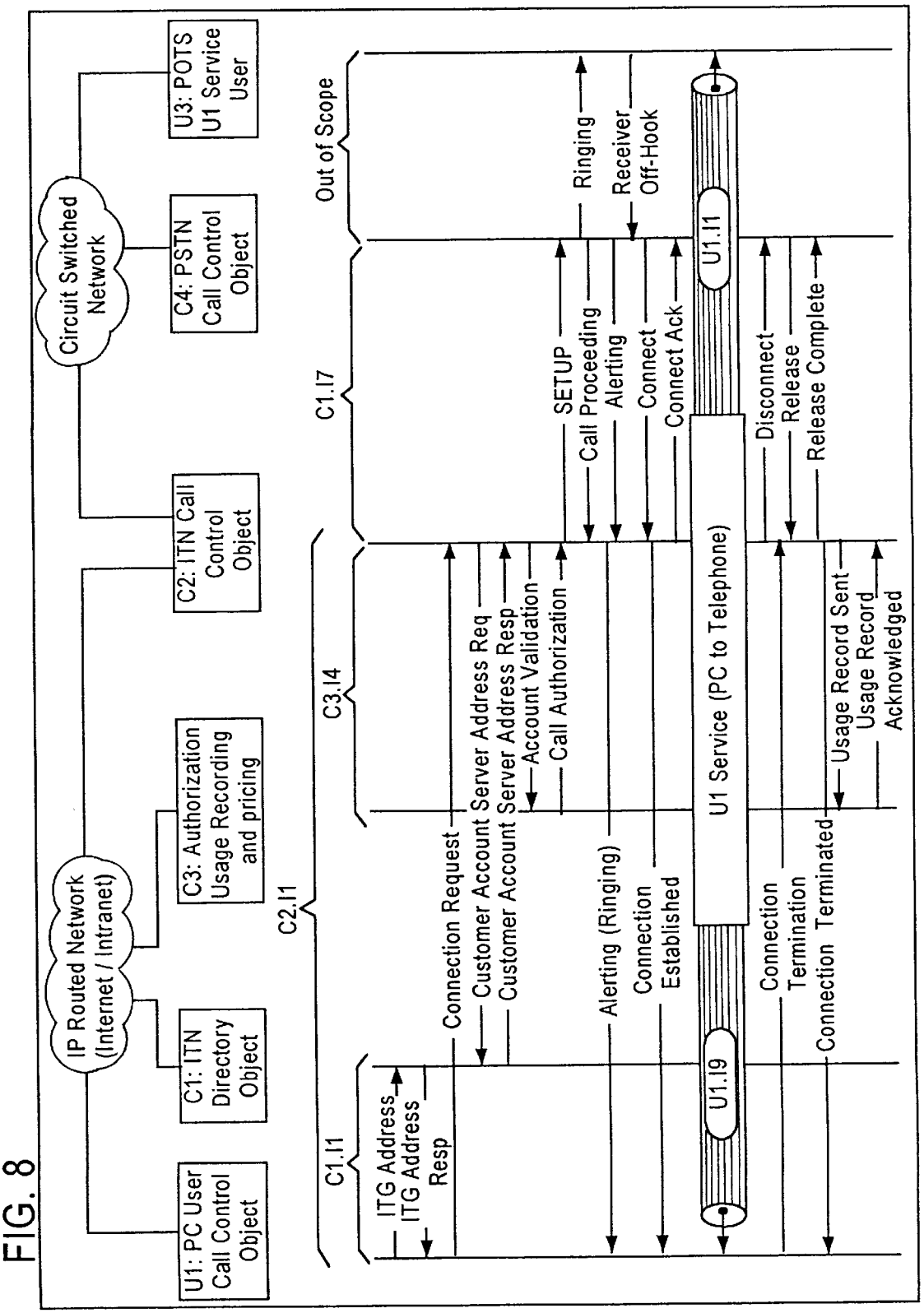
FIG. 8 is a diagram of another typical control plane message flow.

A modified version or embodiment of the call set up procedure is now described in connection with FIG. 8.

The following steps commence with the Called Party Address Request step in FIG. 7 and proceed as follows:

1. The user initiates a call via the PC's V/IP software. This software application invokes the Directory (C1 Object) to obtain the IP address of the destination ITG. Based on the dialed number submitted by the PC application, the C1 Object returns the IP address of the associated ITG (C2 Object).

2. The PC's V/IP software application invokes the C2 Object to set up a call by passing to C2 the number to be called, the user's account number, and a password (Connection Request).

3. The C2 Object invokes the C1 Object to request the customer account server address (Customer Account Server Address Req), which is then returned (Customer Account Server Address Resp).

4. The C2 Object invokes the C3 Object for account validation (Account Validation) using the Customer Account Server Address (address of the instance of the C3 object database) and receives call authorization (Call Authorization). This may include limitations as described in connection with the description of FIG. 7.

5. If authorization was successful, C2 will establish the PSTN connection, and notify the client software that the call is proceeding. C2 will continue to update the client software with call establishment information as the call is proceeding.

6. After the call has been established, the PC will respond to the network that it recognizes that a connection has been established (Connect Ack), timing of the call's duration can be initiated, and any usage measurements will indicate that the call is billable.

7. Steady state call (U1 Service PC to telephone).

8. The PC's V/IP software application invokes the C2 service to release the call. The PC application signals release to C2, and C2 releases the call in the PSTN and confirms the release back to PC application. Also, timing of the call's billable duration is completed. Alternatively, the PSTN user may initiate call tear down as well.

9. The C2 Object passes a usage record to C3 for reporting and for individual call billing if that option is chosen. The C3 Object acknowledges receipt of the usage record to C2.

Figure 9:
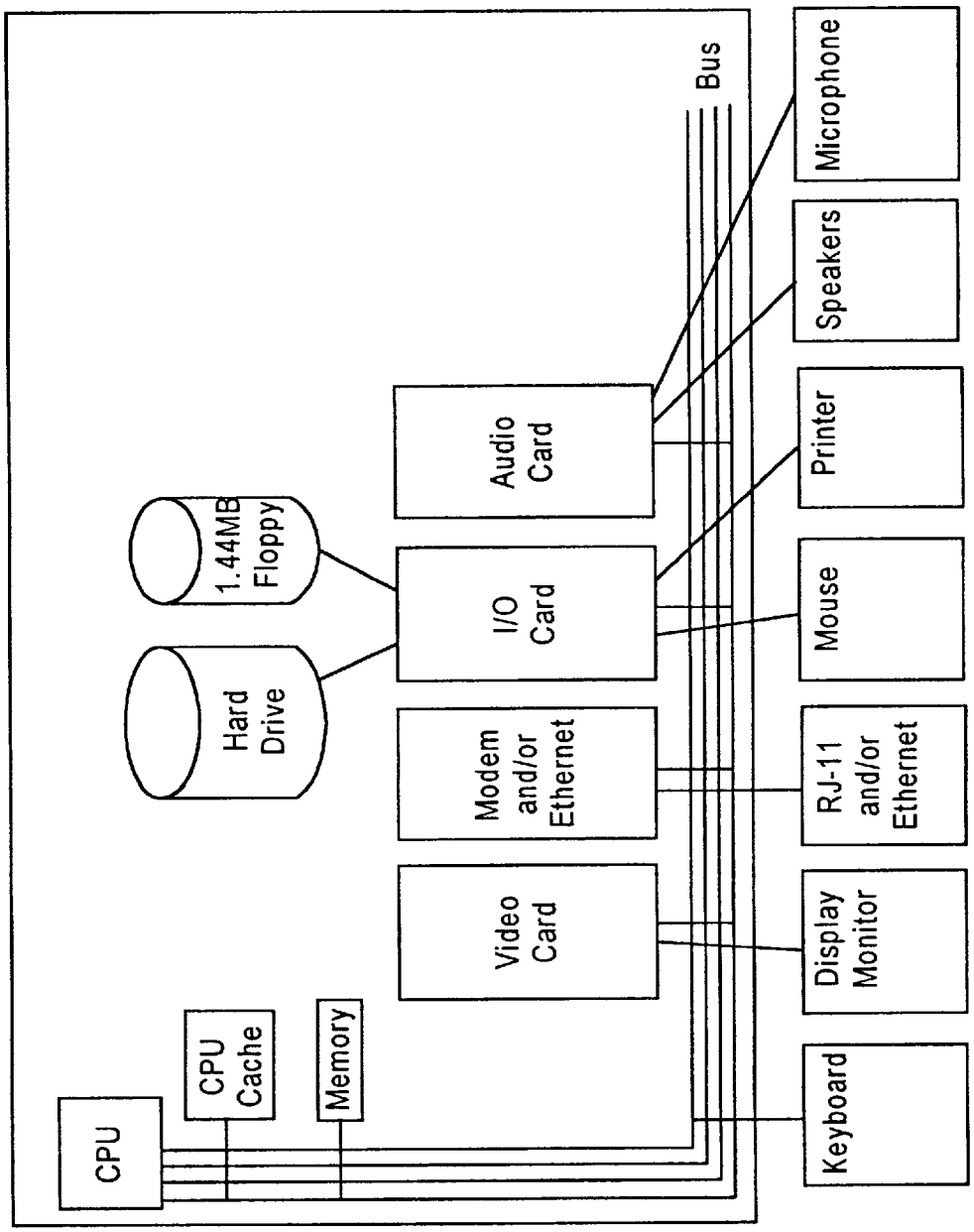
FIG. 9 provides a high level diagrammatic illustration of a typical PC which may be utilized by a user in the system of the invention.

FIG. 9 provides a high level diagrammatic illustration of a typical PC which may be utilized by a user in the system of the invention.

Figure 10A:
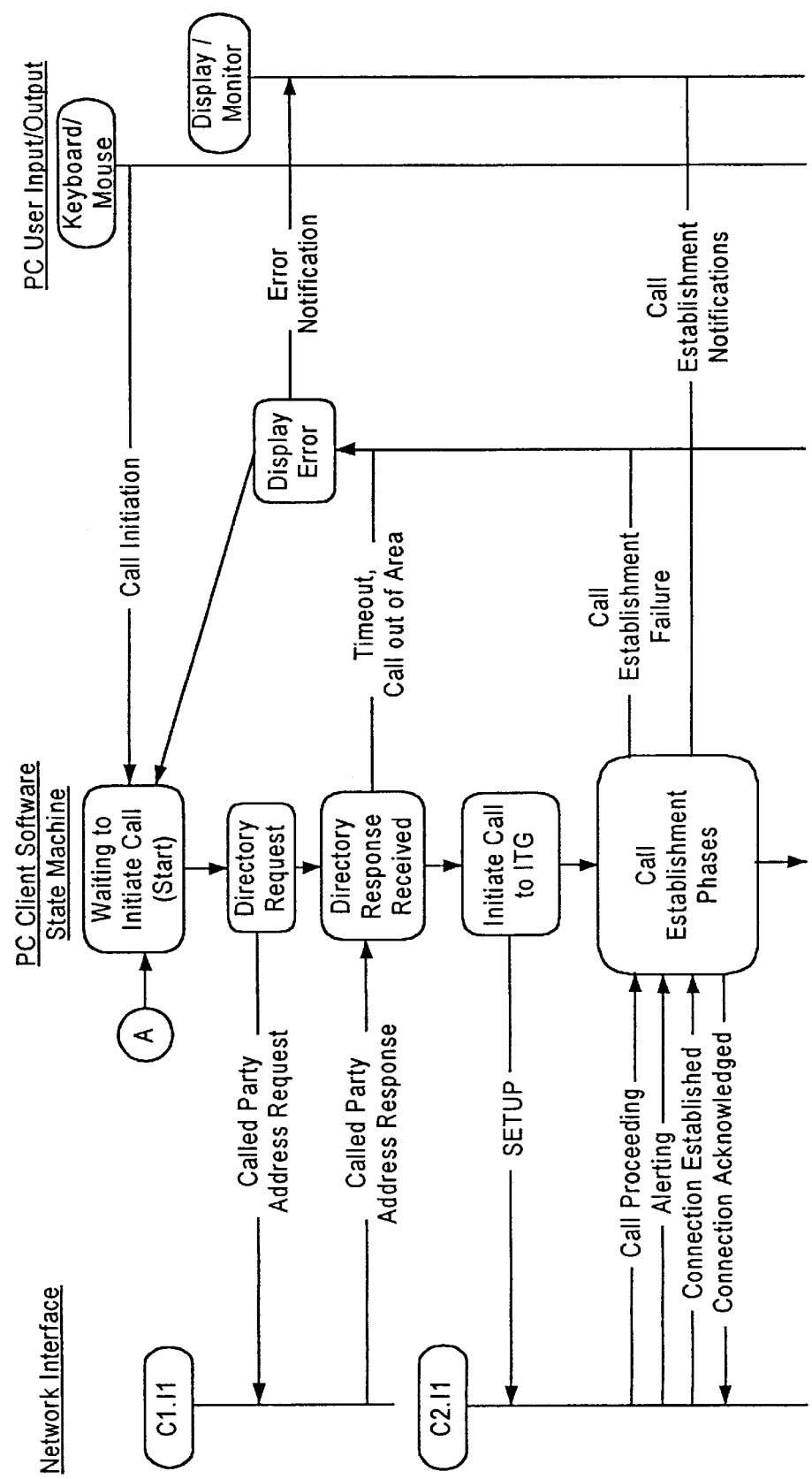
FIG. 10 illustrates a typical client software state machine.
Figure 10B:
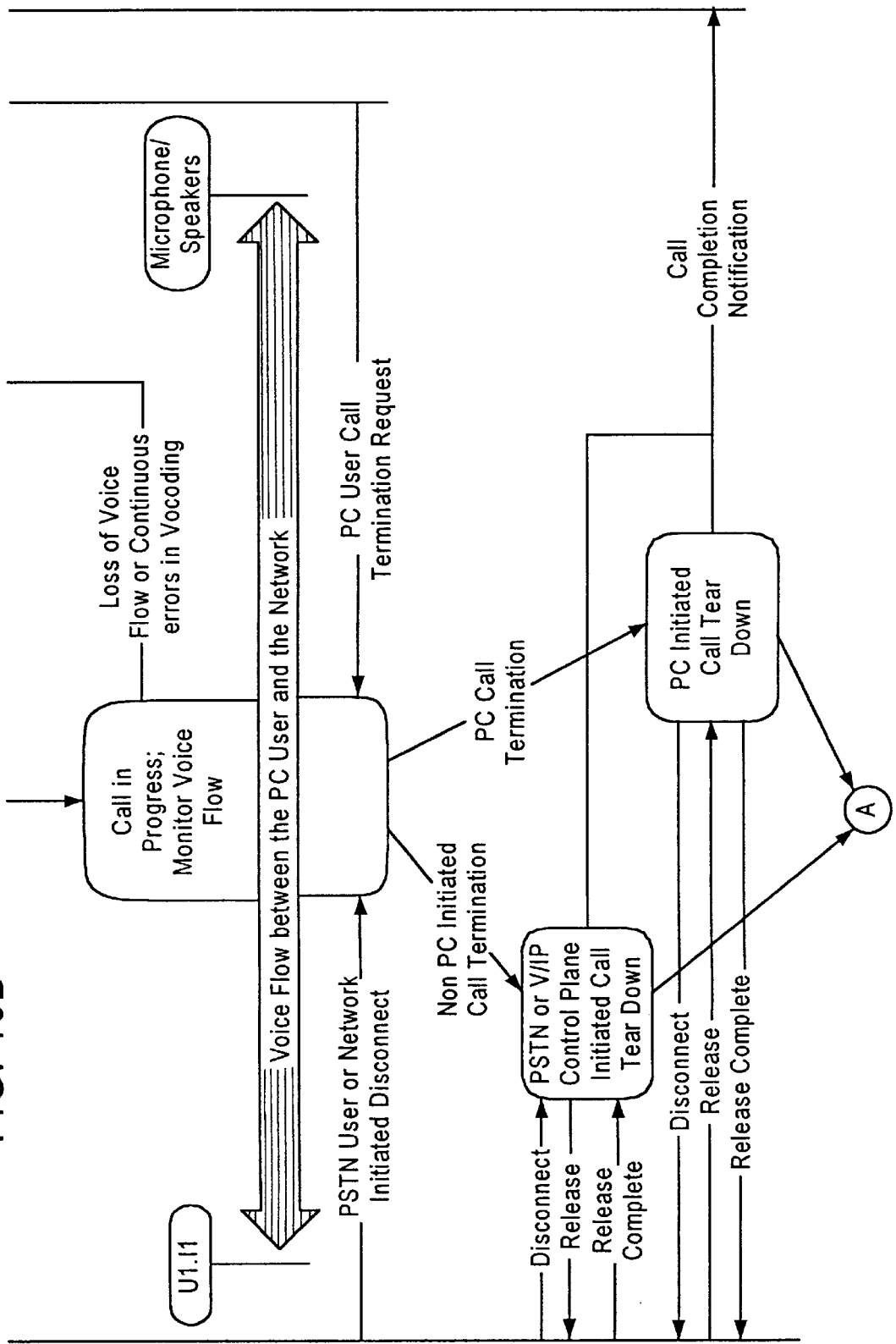

FIG. 10 illustrates a typical client software state machine which is executed in the subscriber's PC. The V/IP software state machine correlates operations within the environment of the typical/high end PC of the user. FIG. 10 provides an example of how the end user interacts with the V/IP network via the client software. Interaction between the PC user and the software's state machine utilizes messages which cross between the client software's state machine and the operating system's input/output drivers for each hardware device. The more significant messages and the content which they may carry may be summarized as follows:

Keyboard/Mouse

Call Initiation: This comprises the input of information needed by the state machine (and the V/IP control plane) which is required to establish a call. The information includes the calling party's account number and password, as well as the telephone number being called.

PC User Call Termination Request: This comprises the input of a notification by the user to the software to conclude the call.

Display/Monitor

Error Notification: This comprises a dialog which shows the reason for the failure of a particular call.

Call Establishment Notification: This refers to the display information showing the step-by-step progression of a call as it is established through the network.

Call Completion Notification: This comprises a dialog which shows the statistics of a completed call.

Figure 11:
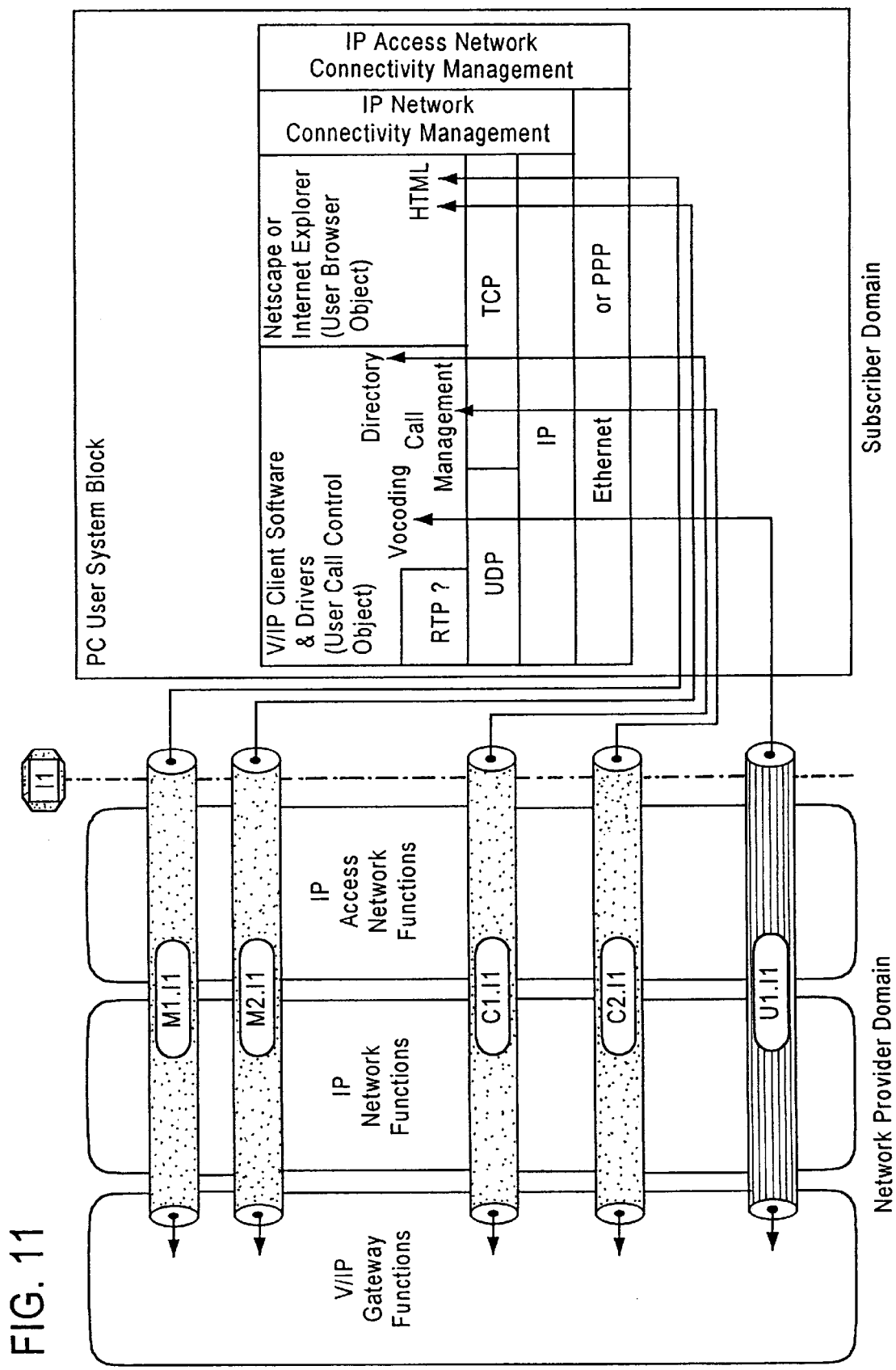
FIG. 11 shows the PC software interface and the relationship to the ITM interfaces.

FIG. 11 shows the PC software interfaces (stack) and the relationship to the ITN interfaces. It is necessary that the V/IP software state machine fit seamlessly within the environment of a typical high end PC owned by an ISP subscriber. FIG. 11 shows how the state machine interacts with the other software components for Internet connectivity and communication. Using the types of PC shown in FIG. 9, state machine shown in FIG. 10, and interface relationships shown in FIG. 11, the following customer software characteristics and functions are significant:

1. It is not necessary for the client software to validate that IP Access Network or IP Network connectivity has been established prior to attempting to communicate with the network. The availability of connectivity across these layers is assumed. A lack of response by the network to the application's state machine is displayed to the user as a lack of network level connectivity.

2. Each of the five V/IP network interfaces is able to have their transactions traverse seamlessly across the IP Access Network and IP Network. The client software should use the same IP network drivers which are used for their existing ISP Internet connectivity. Client software driver conflicts or adverse interactions should not occur with the installed base of PC software.

3. All management plane interfaces with the user may be via the PC's existing Web Browser. The client software need not take on the task of managing network based customer data.

4. The compressed voice interface, U1.I1, preferably communicates via UDP (User Datagram Protocol), however, RTP (Routing Table Protocol) on top of UDP is also an option. If RTP is used, the client software should validate that it is a valid option over the existing IP network.

5. If RTP is selected, and communication over the IP Access network is performed with a PPP link, RTP header compression should be supported in order to reduce the required IP Access network bandwidth.

6. The software must be able to transmit DTMF digits to the hop-off ITG. Preferably the digits will be transmitted "out of band" (in other words, the PC will not generate DTMF signals which are transmitted as compressed tones).

7. The software should be able to transmit the length (duration) that a DTMF digit a pressed.

8. The software should display to the user the current state of a call as it is made through the Internet Telephony Gateway (ITG).

9. The voice played back to the PC user will be toll quality. The Vocoder includes capabilities such as echo cancellation, it should be able to handle varying levels of packet loss and latency, and it should be able to apply corrective algorithms to the voice stream.

10. A user account number and password should be required within the Call Initiation message to the state machine. If the user so chooses, these items should be able to be saved within the client application.

In order to insure ease of use and maximum utility to the subscriber it is desirable to provide for the subscriber an easy access and instructional tutorial as to the use of the system. At the same time it is also desirable to provide the subscriber with his/her billing account balance, status, and call usage details on a real time basis. This information may include descriptions on how to download and install client software and operate the service, descriptions of service availability and pricing plans, graphical (map) areas showing the ITG terminating footprints, and NPA-NXX ranges supported by the ITG terminating footprints. With respect to account information the data available to the subscriber may include call usage record details, billing account status & balance, and verification of the existing password. All of the foregoing may be conveniently provided through the use of an introductory page with links to pages that provide access to each of the foregoing.

The system of the invention provides the above described features through the architecture illustrated in FIGS. 4, 5, 6, and 12. Thus FIG. 6 shows the authorization and usage object C3 connected to an Information Server Object M1 in the V/IP management plane. This information and feedback object M1 comprises a server separate from the C3 authorization and usage object but connected to the C3 control plane object via the M1.I5 interface between the ITN management plane and control plane functions. The M1 object serves as an HTML interface to the V/IP network for subscribers to the service.

Operationally the M1 Object interface is accessible via commercial browsers and at least a Netscape 3.0 or Internet Explorer 3.0 web browser. On any customer specific request for usage records or account balance, a PC user will have to provide within the query the same account number and password which is used for call establishment. This information will be validated by C3 before fulfilling the request. The M1.I1 link between the PC user browser and M1 information server is shown in FIG. 5. The subscriber, using a commercial browser such as Netscape 3.0 or Internet Explorer 3.0 and HTML by way of example, accesses the information server via M1.I1. The information server validates the password and obtains the information from the authorization, usage and account object C3 via M1.I5, and presents the information to the PC user subscriber with the correct formatting display via M1.I1.

The M1 information server provides real time interface to the authorization, usage and account object C3 while at the same time also providing isolation of the C3 object. The information server thus provides an intermediary which, among other things, prevents undesirable interaction between information retrieval and service implementation in the C3 authorization, usage and account object. Appropriate sizing of the capacity of the information server permits the provision of virtually instant access for subscribers without necessarily requiring interrelated sizing of the authentication, usage and account object.

The combination of the logically unitary distributed authorization, usage and account object with this intermediary information server, which is constantly available to subscriber, presents a unique and powerful tool for information retrieval and usage. As has been previously explained, the distinctive authorization, usage and retrieval object provides tracking of multiple ongoing calls against the same account through separate and geographically distal ITGs and network elements.

The new information server permits a subscriber to engage in real time monitoring of this activity and real time tracking of overall account status and balance. Further, there is no requirement that the subscriber perform such monitoring or information gathering from a fixed locale. The information is as readily available from a hotel room by laptop computer as from the home location of the subscriber. Still further, the information may be retrieved and monitored not only by the subscriber but also by any entity with valid credentials for accessing the service, such as a super account holder or employer. This also provides a mechanism for an employer to act on the obtained information to place a stop on further use of any supervised account.

Figure 12:
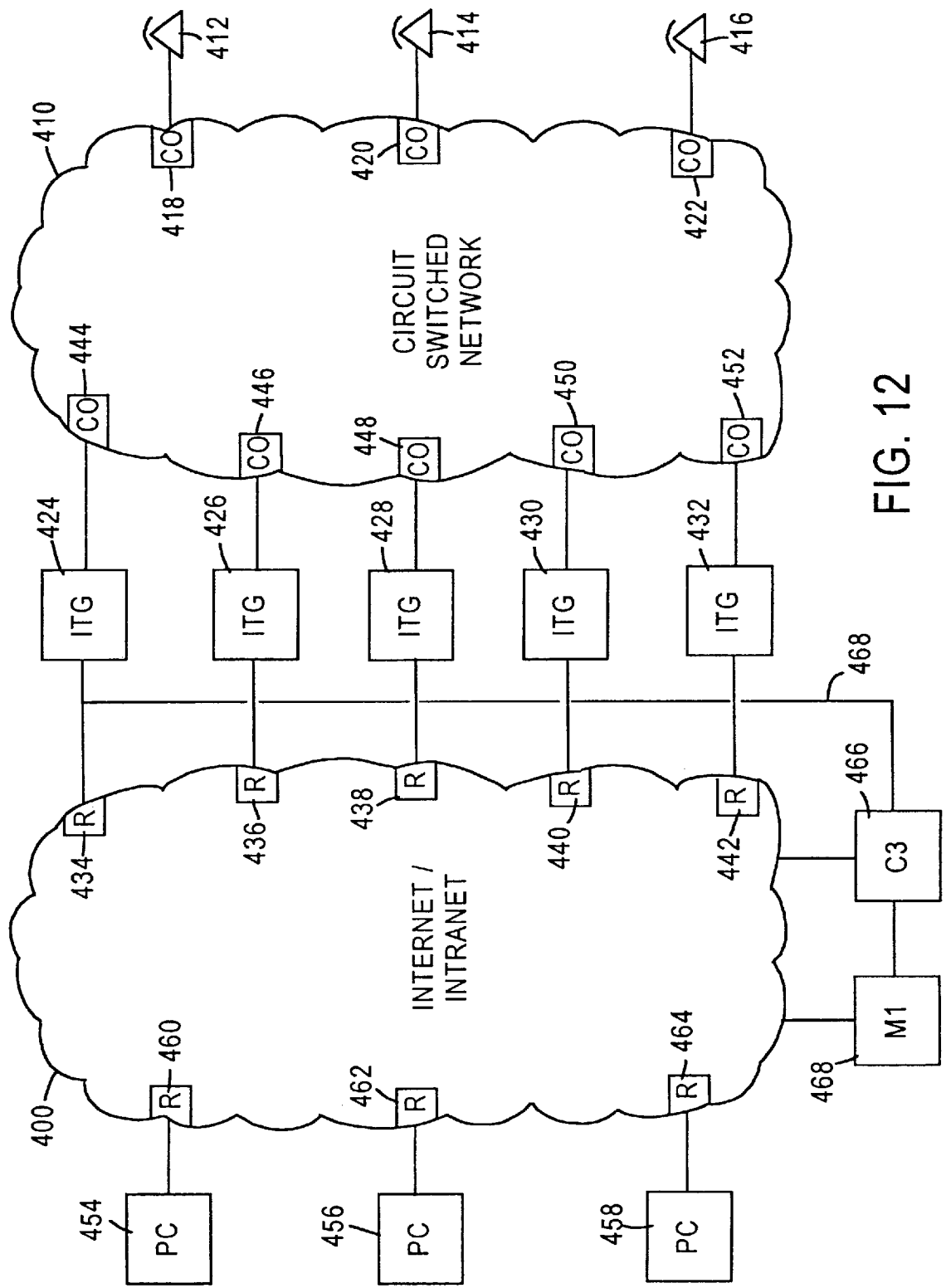
FIG. 12 is a simplified diagram illustrating another aspect of the invention showing an architecture wherein a separate intermediary information server provides substantially real time retrieval of account information across the entire communication system.

FIG. 12 provides a simplified illustration of this aspect of the overall communication system. Referring to that figure the IP Routed Internet/Intranet is shown at 400. The Circuit Switched Network, such as a public switched telephone network, is shown at 410. The circuit switched network serves a large number of subscriber terminals, here illustrated as telephone terminals 412, 414, and 416. The telephone terminals may typically be connected to the circuit switched network via end offices or central offices 418, 420, and 422 via local links or loops. It will be appreciated that these terminals may be distributed over a wide geographical area such as the entire United States or North America, by way of example.

The circuit switched network is connected to the packet switched network via a plurality of C2 call control objects or ITGs shown here by way of illustration as 424, 426, 428, 430, and 432. These gateway control objects are connected to routers in the Internet/Intranet as shown at 434, 436, 438, 440, and 442. The ITGs are also connected to end or central offices in the circuit switched network shown here as 444, 446, 448, 450, and 452. Also connected to the Internet/Intranet are voice equipped personal computers or PCs 454, 456, and 458. These PCs are shown connected to routers 460, 462, and 464. It will be appreciated that the particular gateway or ITG chosen to effect a particular communication path is dependent upon multiple factors, such as the lowest cost connection through the telephone network, by way of example. Thus the ITG 424 may be chosen to effect a link between PC 454 and telephone terminal 412.

As has been explained, the gateway controllers are all linked to the C3 authentication, usage and account object 466 as shown here at 468. The authentication, usage and account object in turn is linked to the information server object M1, here shown at 468. This has previously been described in more detail in connection with FIGS. 4, 5, and 6 hereinabove.

It is believed that this simplified diagrammatic illustration in FIG. 12 will facilitate an appreciation of the power of the authentication, usage, and account object C3 acting in conjunction with the information server M1. The arrangement permits the information server to provide to users almost immediate access to information regarding accounts which may actually be locally stored in instances of the authentication, usage and account object dispersed over an enormous geographical area. Such flexibility permits travelers to access their accounts from hotel rooms, while their employers may also access those accounts from the home or any branch office of the business establishment.

Figure 13:
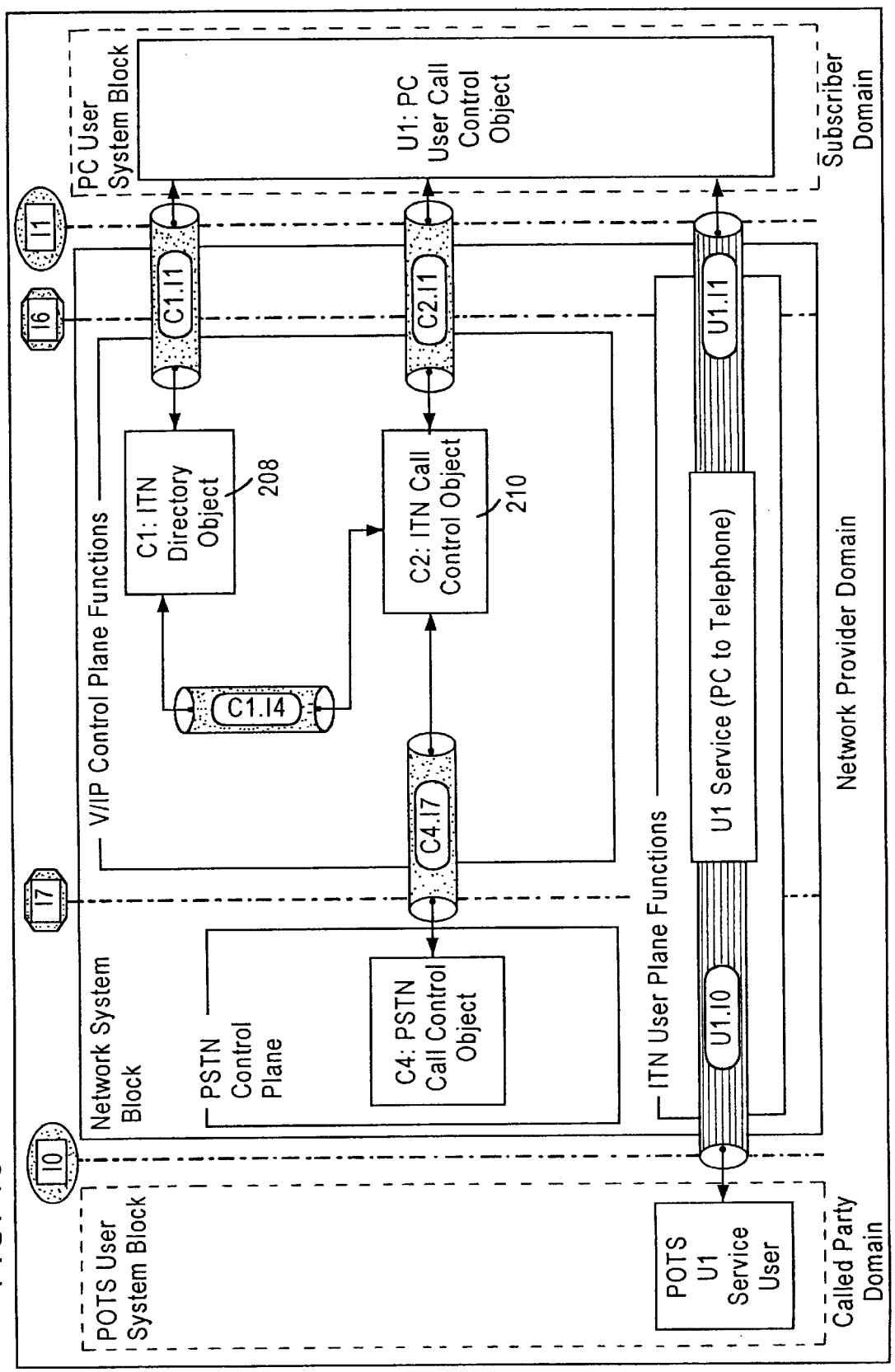
FIG. 13 is a diagram of another embodiment of the arrangement shown in FIG. 2 showing an additional new interface to assist in implementing choice of an optimal hop-off gateway.

Addressing now the question of improved gateway selection for managing a call across circuit switched and packet switched networks, there is shown in FIG. 13 an addition to the interface arrangement previously described in detail in relation to FIG. 2. FIG. 13 shows the C1 directory object which, in its enhanced implementation, will be queried in order to resolve which C2 gateway control object is to be chosen for setting up a particular call or communication path. C1.I4 represents a new interface which will allow a directory system to acquire the state of multiple gateway control objects or ITGs in order to assess their current states and best distribute calls between them.

Figure 14:
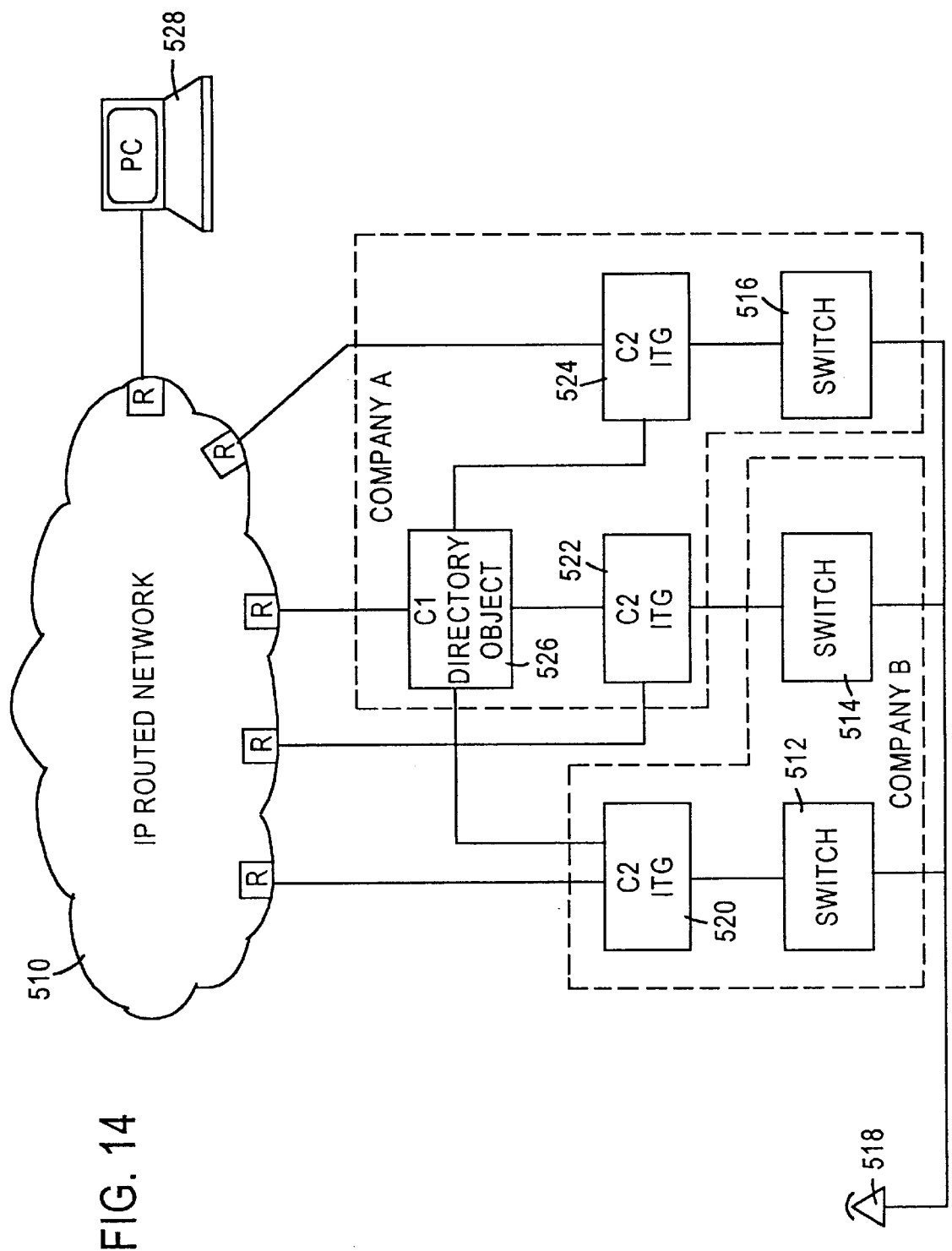
FIG. 14 provides a more global view of the architecture of the multi-gateway interface between the IP routed network and the switched telephone network.

Referring to FIG. 14 there is shown an expanded depiction of a circuit switched and packet switched network system illustrating multiple C2 gateway control objects or ITGs. The IP routed network or Internet/Intranet is shown at 510, while the circuit switched telephone network is represented by the central office or end office switches 512, 514, and 516, connected to a telephone terminal 518. The switches are connected to three C2 gateways or ITGs 520, 522, and 524. All gateways are connected to a C1 object directory 26 and to the Internet/Intranet 510. The directory 526 is connected to the Internet/Intranet 510 via an Internet/Intranet router R. All gateways 520, 522, and 526 are also connected to the Internet/Intranet 510 via routers R.

As shown in FIG. 14, the switch 516, gateway 524, and C1 directory object 526 are owned by company A, as indicated by the broken line. Switches 512 and 514 and gateway 520 are owned by company B. An illustrative laptop computer 528 is connected to the Internet/Intranet via a router R. The connection between the company A owned C2 gateway or ITG 522 and company B owned switch 514, being an inter-carrier connection, may be a Feature Group D connection. On the other hand, the connections between C2 gateways or ITGs and switches, which are owned by the same company, may be PRI ISDN connections. These would include the connection between the ITG 520 and switch 512, owned by company B, and the connection between the ITG 522 and switch 516, owned by company A.

In a basic configuration the Internet Telephony Gateway Directory manages which E.164 addresses (telephone numbers) are served within the terminating footprint of a particular ITG. The management of the terminating footprint may be in the form of NPA-NXX ranges which relate to an IP address for a single ITG. When queried with a "called" telephone number by the PC Call Control Object, the C1 object returns the IP address of the Internet Telephony Gateway (ITG) that serves the called telephone number.

In a global sense there will be multiple directory objects owned by a plurality of companies serving different geographical areas, as well as serving overlapping and/or the same area. These distributed directory objects may be linked together in a hierarchical relationship to be subject to interrogation by other directories so as to enable a system wide gateway address search. For this purpose the distributed directories may be considered to constitute a unitary logical object in the manner described for the C3 authorization, usage and control object.

According to this feature of the invention direct signaling between the directory object and gateways is enabled. This permits the directory to query the gateways as to their status, the current availability of ports, the available bandwidth, the possibility of bandwidth and/or route reservation, costs, and other operational capabilities. The directory is able to monitor gateway capabilities and availability, to query as to specific calls, and to arrange reservations in real time. In view of the fact that gateway owners are providing availability to the gateways for profit, it is in the interest of the owner to furnish maximum information and even to advertise the capabilities of their facilities. When this new directory to gateway signaling interface is coupled with the capabilities of the enhanced directory object it makes possible the fulfillment of a large variety of the previously outlined objectives. As will be described in further detail, the directory object of the invention presents enhanced capabilities for implementing optimal gateway and routing selection.

Figure 15:
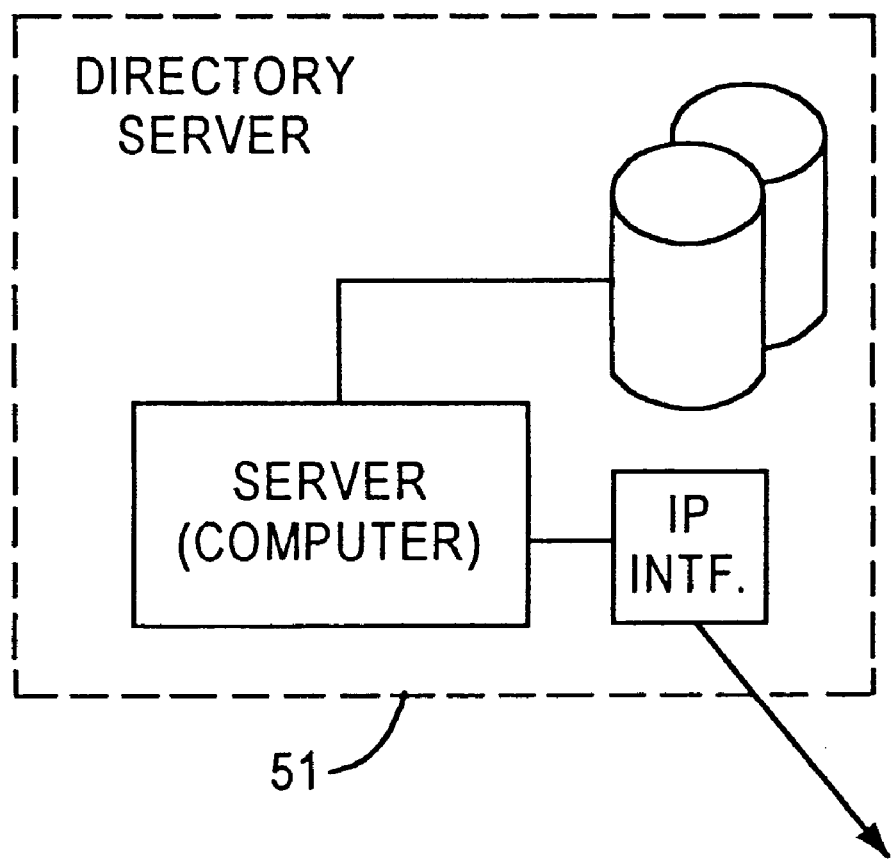
FIG. 15 is a simplified block diagram of a directory server computer which functions as the central processing unit of one preferred embodiment of an enhanced directory object for use in a combined circuit switched and packet switched telephony communication system.

Referring to FIG. 15, the enhanced directory server 51 comprises a server computer which functions as the central processing unit of the directory server. The computer has an IP packet data interface to the Internet/Intranet 510 as shown by the connection to the C1 directory object in FIG. 14. The directory system 51 also includes a data storage system storing a series of databases attached to or incorporated into the server. As discussed more below, the databases include look-up tables for direct translations of called party telephone numbers and/or addresses to gateway addresses and routing control records for conditional processing of requests for communication.

Essentially, when a user wishes to initiate a telephony communication, they instruct their PC to start communication using a telephone number address, such as by populating the telephone number field in their V/IP software application as previously described. This software application invokes the Directory (C1 Object) to obtain the IP address of the destination ITG. Based on the telephone number submitted by the PC application, and on the identity of the calling terminal, and on any specific requests or handling conditions specified, the directory server 51 reacts and responds. Assuming authorization from the C3 authorization object, the directory object or server may execute a direct look-up table based translation to a gateway IP address. However, for any subscriber customer who has established more detailed routing requirements, the directory object server 51 will execute conditional analysis in response to the query from the directory object.

In its simplest form, if the conditional analysis produces a first result, the directory object server translates a telephone number included in the query into a first gateway or ITG IP address. If the conditional analysis produces a second result, the directory object server translates the name included in the query into a second gateway IP address. The server then transmits a response message containing the first or the second destination address to the calling PC. The PC uses the received gateway IP address to proceed through the previously described authentication procedure and establish the desired communication through the public packet data network.

Figure 16:
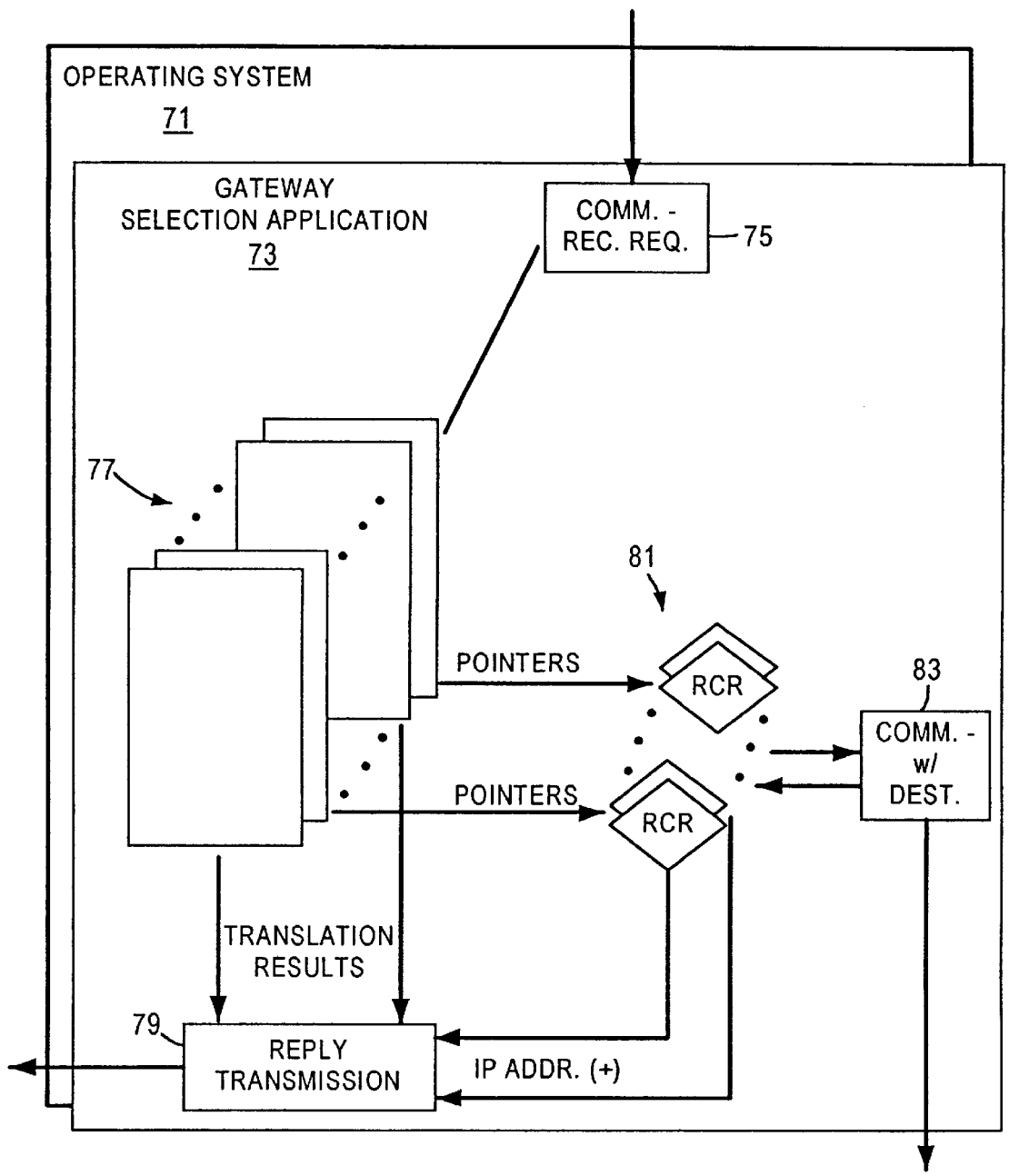
FIG. 16 diagrammatically illustrates one possible organization of the software for the enhanced directory object of FIG. 15.

FIG. 16 provides a simplified illustration of an example of one possible organization of the software for the directory server 51, for implementing the enhanced operations as described in one embodiment in the above referenced Voit application Ser. No. 08/812,075. The computer of the enhanced directory server runs a standard operating system 71, such as UNIX. The operating system facilitates execution of one or more applications. One of the applications that will run on the computer of the directory server 51 is a gateway selection application 73. The gateway selection application 73 includes executable code facilitating the actual processing. The executable code permits access to both translation tables and routing metrics 77 as well as routing control records (RCRs) 81 stored in a database within the storage system portion of the directory server 51. The executable code of application 73 may also trigger several communication routines 75, 79 and 83.

More specifically, when the computer of the directory server 51 receives a 'query' or request for gateway selection, the operating system 71 passes the request from the IP interface to the communication routine 75 of the application 73. The communication routine extracts the appropriate information from the query message, such as the address of the requesting terminal device and the name that the address or telephone number of the terminal device which has been identified for connection. The communication routine may also extract any commands as to routing which the caller specifies. These may include least customer cost routing, reservable routing, specified bandwidth routing, specified carrier routing, or the like.

The gateway selection or directory processing application 73 can access a series of translation tables as well as routing metrics 77. Some of the tables will simply translate called numbers into IP addresses of the most proximate gateways having a footprint which includes the number. The routing metrics are routines or methods by which routing algorithms determine that one route is better than another. This information is stored in tables which may include reliability, delay bandwidth load, maximum transmission units (MTUs), communication costs, hop count, available ports, reservability, and the like.

The product of the translation or routing metric will result in an IP address. The directory processing application 73 will supply the resulting IP gateway address and any related instructions or commands produced by the operation to a communication routine 79 for transmission of a reply message to the terminal device that requested the translation. The application 73 also provides the address of that terminal device to the reply transmission routine 79. In response, the routine 79 will formulate an IP reply message containing the terminal device address as the destination address and containing the IP address produced by the translation process as message data. The reply transmission routine 79 forwards the message through operating system 71 and the IP interface for transmission through the public packet data network or Internet/Intranet to the requesting terminal device. The requesting terminal device then initiates the desired communication using the gateway address.

Certain parties or customers will desire and subscribe to a variety of routing services requiring conditional analysis type processing. For each of those customers, the directory server will store a routing control record (RCR) 81. For each number associated with such a customer, the translation tables 77 will store a pointer pointing to the routing control record (RCR) 81 that controls that customer's routing service.

The directory processing application 73 will receive a query in the manner discussed above. However, when the application accesses the translation table with the number associated with a customer having conditional analysis based service, the translation will return a pointer identifying the controlling RCR. The directory processing application 73 then executes a conditional analysis routine utilizing the identified RCR 81. The conditional analyses defined by the RCRs vary considerably, depending on the customized routing service selected by each customer. In the simplest form, the RCR specifies a set of conditions or criteria and two or more alternate procedures, depending on which criteria are satisfied by the current call or directory request query. For example, the RCR may specify alternate procedures for different times, or for different addresses of the terminal which the customer used to request the translation. In these cases, the directory processing application 73 compares call or query related parameters to the criteria in the RCR 81 and obtains the gateway destination address corresponding to the parameters of the current call or translation query.

FIG. 14 depicts a single directory server 526, and the above discussion has concentrated on a single server implementation for ease of explanation. In an actual, large scale deployment, the directory server system would comprise a number of server systems 526 in a hierarchical arrangement. Each domain name server 526 would serve a region or segment of the public packet data network or Internet/Intranet and would provide translations and conditional analysis processing of numbers corresponding to addresses residing within the segment served. Any computer or PC on the segment requesting translation would first query the directory server system 526 serving that segment. If the number was not one associated with that server, the directory server 526 would communicate through the hierarchy of such servers to relay the query to the appropriate server for processing; and after processing, that server would provide the destination gateway address and any associated information in the reply back to the querying device. Also, each directory server 526 in a given area could be duplicated, for redundancy.

It should be noted that any number of useful telecommunications functions can be performed by controlling the IP address and/or other routing information returned as a result of the conditional analysis performed by the directory server. The IP address and/or other routing information returned to the caller is determined by customized routing control records (RCRs) stored in a database in the directory server 526. These routing programs can provide a wide range of customized routing services, in a manner similar to the services provided by call processing records used in the AIN telephone network.

Figure 17:
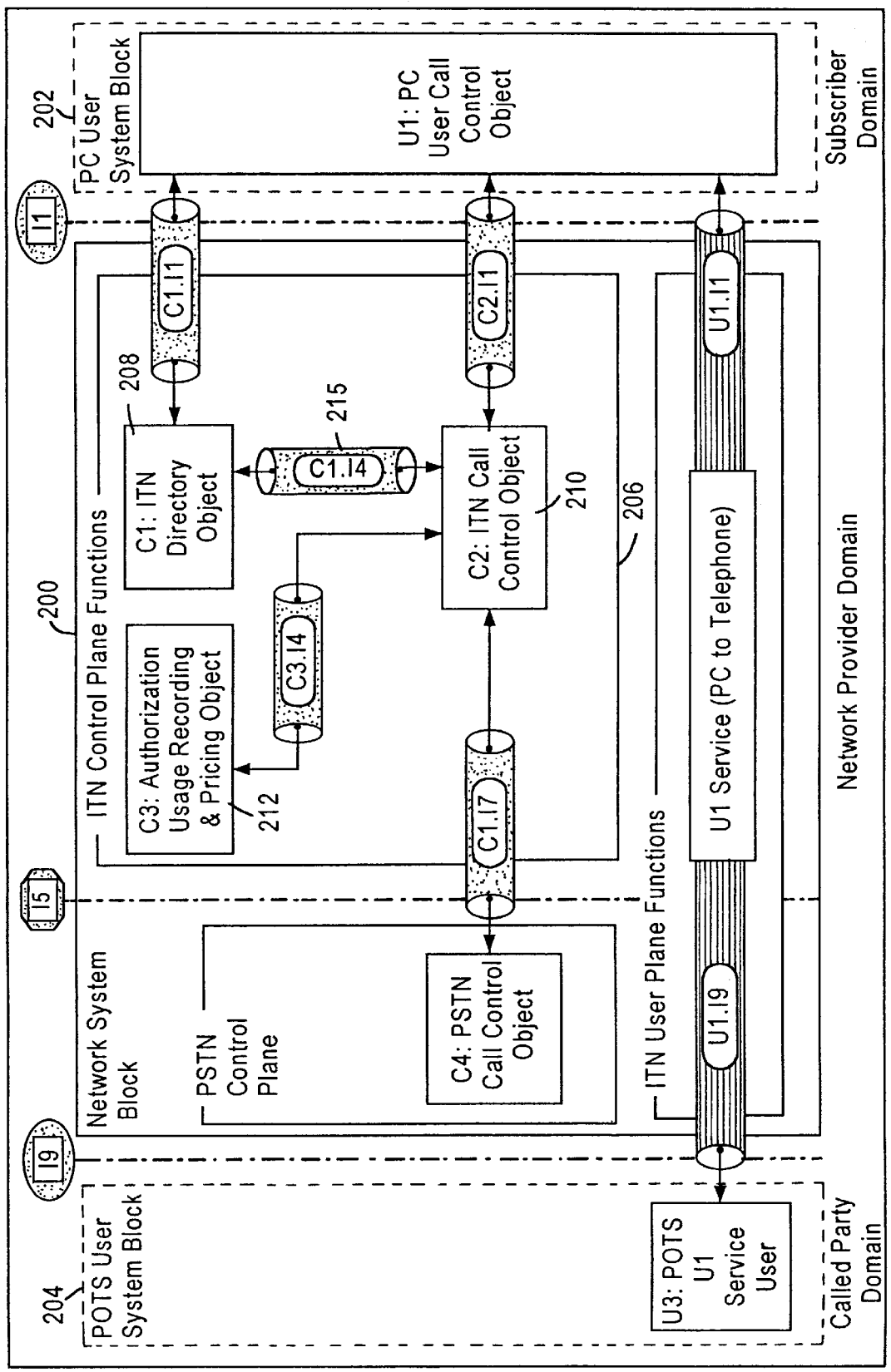
FIG. 17 is a diagram of another embodiment of a preferred architectural implementation showing interfaces between IP network elements.
Figure 18:
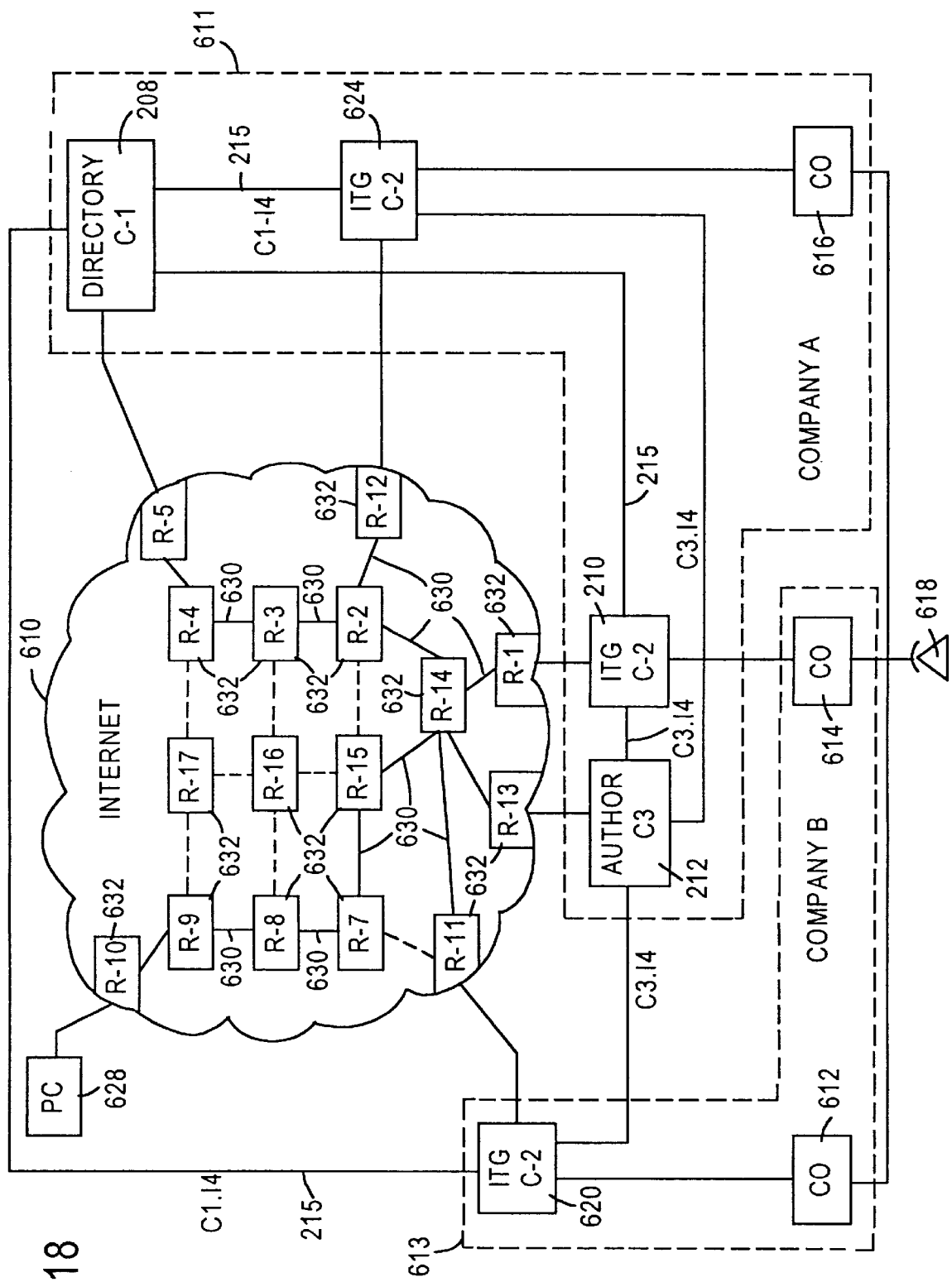
FIG. 18 provides a more global view of the architecture of the multi-gateway interface between the IP routed network and the switched telephone network using the interface architecture of FIG. 17 to provide varied qualities of IP through-put.

Referring to FIGS. 17 and 18 there are shown architectures of another preferred implementation of the invention. This version of the invention is directed to providing a predictable and guaranteed quality of service to the user. Generally speaking the parameter most in need of control is bandwidth. Many Internet users access the Internet using a modem connected to a standard analog telephone line. Such service is known as Plain Old Telephone Service, or POTS. Modems used on POTS lines reach their data transfer limit around 30 kbps without compression. With compression, data transfer rates can be as great as 60 kbs.

Such bandwidth is adequate for real-time audio communication, but a poor solution for applications requiring higher throughput, such as video. As a result, services such as ISDN are becoming popular for applications demanding a connectivity bandwidth above that obtainable from conventional modems. As an approximation the applicability of available Internet connections may be illustrated as follows:

| | | |
|---|---|---|
| POTS | 28.8 kbps | Audio/FM mono quality |
| ISDN-BRI | 144 kbps | Audio/FM stereo quality Low end video |
| ISDN-PRI | 1.544 mbps | Audio/CD quality Video |
| T-1 | 1.544 mbps | Audio/CD quality Video |
| ATM | 622.0 mbps | Audio/CD quality Video/broadcast quality Virtual reality applications |

The Internet itself does not present a completely uniform bandwidth transmission medium. Originally the National Service Foundation (NSF) funded a 56 kbps network linking the five original supercomputer centers, and offered to let any of the regional and university computer centers that could reach this network to connect to it. This was the genesis of the Internet network which is known today and the original reason to connect was to access the supercomputer facilities remotely. This occurred and traffic rose dramatically.

In 1987 NSF funded an upgrade of the backbone using 1.544 mbps T1 leased lines connecting six regional networks including the five existing supercomputer centers. This upgraded and expanded network replaced the old NSF 56 kbps network. This NSF network was in turn upgraded by a private non-profit network organization to a 45 mbps T3 backbone to which thousands of smaller networks connected. The Internet was largely defined by having connectivity to this NSFNet backbone. This network was in turn superceded by the present Internet comprised of a series of Network Access Points (NAPS) where private commercial backbone operators can interconnect, much as with the NSFNet backbone. In this way there developed the current approximately eleven major interconnection points, three official NAPs, three historical NAPs, and five defacto NAPs.

Any national backbone operator that has peer connection at one or more of these interconnects has some connectivity to the Internet. At this point most backbone operators are cross connecting with other backbones at virtually any location of convenience. The trend is presently toward ATM technology for NAP backbones permitting broadband access at speeds of up to 36 mbps for T3 access and up to 139 mbps for OC3 access. ATM services are offered using permanent virtual circuits (PVS) and later switched virtual connections (SVC). The difference is that PVCs appear as point to point or point to multipoint, and must be set up ahead of time through a provisioning process, whereas SVCs are dynamic. The NSF sponsors a Routing Arbiter service at each NAP. Clients may make arrangements with the routing arbiter for dissemination of routing information among participants in the service. The high speed T3 backbones which connect to major metropolitan areas are extended to surrounding communities via less expensive 1.544 mbps lines. These lines may extend to even further points with even less expensive 56 kbps leased lines. Generally all nodes of the network owned by the national service provider are referred to as Points of Presence (POPs). Business customers then lease their own telephone line from the telco to the POP and so connect to the Internet.

Referring to FIG. 17 there is seen a depiction of the combined interfaces previously shown and discussed in connection with FIGS. 2 and 13. Thus FIG. 17 shows at 202 the PC user System Block in the subscriber domain, at 200 the Network System Block or network provider domain, and at 204 the POTS User System Block or called party domain. Within the Network System Block the ITN Control Plane functions are illustrated at 206. The ITN Control Plane functions are those which establish and tear-down communication paths across the User Plane. Three Control Plane Objects are illustrated, namely: C1 The Internet Telephony Gateway Directory Object, C2 The Internet Telephony Call Control Object, and C3 The Internet Telephony Authorization and Usage Recording Object.

These objects are shown respectively at 208, 210, and 212. As previously described, the C3 object represents the network element required in this architecture to perform customer authentication, call authorization, usage accounting, and usage pricing for a particular PC user's customer account. The C3 object is invoked during a call when an Authorization request is relayed over the interface C3.I4. This interface is responsible for allowing an authorization of ITG usage by a service subscriber, and for maintaining the current state of a subscriber's connections within C3, as well as passing ITG generated usage records from C2 to C3 in real time.

The C2 Call Control Object, which comprises the ITG, communicates with the PC user to establish a PC-to-Telephone call. It is the C2 Object or Call Control Object which coordinates the signaling among the involved network elements. Included in such signaling are management of the state of the call with the client PC software (via C2.I1 shown in FIG. 5), validation of a PC users' Account number and password (via C3.I4 shown in FIG. 6), establishment and tear down of the PSTN circuit (via C4.I7 shown in FIG. 5), generation of usage information which is sent for processing and pricing (via C3.I4 shown in FIG. 6), and managing the state of the connection within C3 (via C3.I4 shown in FIG. 6). The C1 Object, the Internet telephony gateway Directory, manages which E.164 addresses (telephone numbers) are served within the terminating footprint of a particular ITG. In its basic configuration, the C1 object returns the IP address of the Internet Telephony Gateway (ITG) that serves the called telephone number when queried with a "called" telephone number by the PC Call Control Object or calling PC. In the enhanced configuration described in connection with FIGS. 13–16, the directory C1 is interfaced to the ITG call control object C2 via the interface C1.I4 shown at 215 in FIG. 17. Direct signaling between the directory object and gateways is enabled. This permits the directory to query the gateways as to their status, the current availability of ports, the available bandwidth, the possibility of bandwidth and/or route reservation, costs, and other operational capabilities. The directory is able to monitor gateway capabilities and availability, to query as to specific calls, and to arrange reservations in real time.

According to this embodiment of the invention the directory C1 is provided in its enhanced form as shown and described with respect to FIGS. 15 and 16. The directory object is owned by an entity, typically a Telco, who offers subscriptions to resource reservation. Optimally the entity which owns the directory object also owns the authentication, pricing, and usage database object C3. The owning entity stores in the enhanced directory tables of algorithms which include routing algorithms wherein specific quality or bandwidth is specified. In the instance of supplying subscribed resources, the enhanced directory stores algorithms of reserved or guaranteed routes specified by the subscribers. It is a feature of this embodiment of the invention that guaranteed routes may be supplied to non-subscribers on an impromptu basis. In this situation the enhanced directory may store a plurality of algorithms of routes which the owning entity can control and readily establish either by ownership or by contract. In utilizing the directory in this manner the specifications of the parameters of the communication path are being imposed at the originating rather than the terminating end. This is in contrast to the conditional routing previously discussed. Such routing typically is based on conditions specified by the destination terminal. In the present embodiments the conditions are specified by the originating terminal or negotiated by the originating terminal.

Referring to FIG. 18 there is shown a simplified diagrammatic illustration of a hybrid circuit switched-packet switched network or system having an architecture for implementing this embodiment of the invention. The packet switched network, such as the Internet, is diagrammatically shown at 610 as comprising a series of routers R. The telecommunications system, or circuit switched network, is diagrammatically shown as a comprising a pair of telco's designated company A and company B. By way of example, the two companies may be regional operating companies 611 and 613. Telco A at 611 is represented by the single switch or central office 616, while telco B at 613 is represented by a pair of switches 612 and 614. All of the switches are shown as connected to a representative telephone terminal 618.

In this example the telco A owns and operates an enhanced directory C1 object 208, a call control ITG C2 object 210, and an authorization, usage recording, and pricing C3 object 212. It will be noted that these objects bear the same reference numerals as the C1, C2, and C3 objects shown and described with respect to FIG. 17 and FIGS. 2–6, and the prior description of the arrangement in those Figures is applicable. Thus the C1, C2, and C3 objects are interfaced by the interfaces C3.I4 and C1.I4. The C1 and C2 objects are also interfaced to the PC user call control U1 object by interfaces C1.I1 and C2.I1, and to the PSTN by interface C1.I7. These connections or interfaces will be recognized to represent logical connections and that the communication between the various objects comprises packet communication via the Internet or intranetwork 610. Company A also owns ITG or call control C2 object 624 which is shown connected to the CO or end office switch 616.

A particular aspect of this embodiment of the invention is the use of dedicated virtual paths established in the Internet to maintain a prescribed service level, i.e., quality of service, for the party which establishes the call, i.e., the calling party. Specifically, the Internet 610 includes a plurality of routers R that route data packets along any available paths, here shown as broken lines, based on known algorithms. As known in the art, the separate packets that constitute a message may not travel the same path depending on traffic load. However they all reach the same destination and are assembled in their original order in a connectionless fashion.

In order to provide guaranteed service quality, typically during long distance telephone calls via the Internet, the data packets can be transported on dedicated virtual paths at a minimum guaranteed bandwidth and latency, for example 28.8 kbps per telephone call in each direction. As illustrated in FIG. 18 such virtual paths are shown as solid lines 630. Such paths may be used for large-scale transport of packets carrying long distance traffic to different telephone networks.

FIG. 18 shows two telco networks respectively belonging to Company A and to Company B. The illustrated destination nodes or routers for Company A comprise R-12 for ITG 624 and R-1 for ITG 210. The illustrated destination node for Company B comprises R-11 for ITG 620. It will be understood that many more such destination nodes and ITGs may exist. The terminal indicated as PC 628 may be representative of one of a number of such terminals connected to a LAN connected to node R-10. This LAN may in turn belong to a business enterprise desiring to insure a specified quality of voice connection via the Internet to these three Points of Presence (POPs) R-11, R-1, and R-12 for the two telcos.

This LAN customer may utilize the directory C1 208 of Company A, which may own the routers R-1 and R-12. Company A may also own the router R-14 which it uses as a hub for permanently maintained virtual circuits. The LAN customer 628 may contract with Company A to reserve an OC-1 (51.84 mbps) bandwidth path from its node of connection R-10 to each of nodes R-1 and R-12, as well as to node R-11. These paths are reserved by PC (or LAN) 628 for calls originating in the LAN. Company A, which owns and operates the directory 208, accordingly stores in the database of that directory a reservation of such routing. This is shown, by way of example, in the first three line entries in the table illustrated in FIG. 19. At any time that a call originates from PC 628 to a telephone terminal for which the destination node is R-1, R-12, or R-11, the address database in the directory will be directed to the table of FIG. 19, which will indicate that the call is entitled to use this OC 1 bandwidth reservation. The call will be routed by the directory to the appropriate destination node and ITG with the specified bandwidth. Company A will insure that the bandwidth reservation also appears in a similar table in the source router or node R-10. The prescribed paths are then established through the intermediate nodes to the destination nodes R-1, R-12, and R-11, respectively.

While the connections between the C2 ITGs and the C1 directory have been shown as logical connections for ease of illustration, it will be recognized that these communication paths in fact comprise routes through the packet switched network. Since the owner of the directory will seek a high volume of usage it will seek to provide maximum availability for the facility. To this end the directory owner may provide high capacity communication paths for frequent users of the directory. Thus FIG. 18 illustrates a virtual path from such a potential user as ITG 620 which is connected to node R-11. This path is shown as extending through intermediate nodes to destination node R-5 for the directory 208. This path is shown in the table of FIG. 19 as specifying an OC-3 reservation. Any attempt to reach the directory 208 from ITG 620 will result in the directory specifying the availability of the OC-3 capacity.

For similar economic reasons Company A will desire that the directory be available to its own customers with equal facility. Accordingly OC-3 virtual circuits will be reserved from ITGs 210 and 624, as also shown in the table of FIG. 19. It will be appreciated that while the table in FIG. 19 carries only the listing of one customer of Company A, namely PC 628, this is intended to be merely illustrative of all customers of Company A which choose to reserve bandwidth. Likewise, while the discussion has been in terms of voice circuits, it should be appreciated that higher bandwidth services, such as video or multimedia, are equally accommodated by providing the requisite bandwidth virtual paths. In most instances the virtual circuits will utilize only a portion or percentage of the available path capacity.

Once the sequence of routers has been established for a virtual path, the end-to-end virtual path is stored as a virtual path lookup table in the C1 directory database, along with the total available bandwidth. The C1 directory 208 also monitors unused bandwidth when allocating bandwidth for each routing request. Hence, the C1 directory 208 is able to monitor traffic along a virtual path to determine whether a data rate in a communication link should be changed. If the directory determines that a virtual path has little traffic, then the directory may specify a higher data rate for the communication link. However, if the directory determines that a large amount of traffic exists on the virtual path, then the data rate may be reduced to the minimum guaranteed service level stored in the directory database for the calling number. The interface C1.I4 between the directory C1 and the call control object gateway C2 (ITG) enables this capability and permits the enhanced directory to determine the state of the IP network before establishing virtual routing in specified bandwidths.

An alternate arrangement for providing a communication link according to a prescribed service level involves using Internet Protocol, version 6 (IPv6). IPv6 incorporates a variety of functions that make it possible to use the Internet for delivery of audio, video, and other real-time data that have guaranteed bandwidth and latency requirements. Hosts can reserve bandwidth along the route from source to destination. Hosts can specify loose or strict routing for each hop along a path. In addition, packets are assigned a priority level, ensuring that voice or video transmission is not interrupted by lower priority packets. Signaling information between the ITGs and between an ITG and the directory object will typically be given highest priority. Service levels for subscribers at calling stations are typically arranged at different levels, depending on subscriber preference and cost. Once a service level for a subscriber is established, the guaranteed service level is stored in the C1 directory object database.

In addition to the ability of the enhanced directory to store subscriber reservations it may also be utilized to store negotiating programs or applications for negotiating a routing of the desired quality through the Internet on a per call basis. Listings of preferred routers for use from specific ITGs may be maintained on the basis of prior arrangements which have been made by the owning entity. The actual negotiation of the routing may be from the calling PC under the control of a program or routine downloaded from the directory. Alternately, the route may be negotiated from the ITG pursuant to communication between the ITG and the directory.

In addition to route and quality negotiation the directory database may provide a connection reservation service. A subscriber or network user may request the establishment of a routing of a specified quality of service for a specific time. In such service the directory may pre-arrange the routing and provide the caller with a reservation number. The caller may then initiate the call at the specified time and receive the pre-arranged routing and quality of service by simply providing the reservation number.

Different hop-off gateways may provide different services. As an example, one gateway may provide the ability to utilize the common channel signaling network of the involved telco's to determine the availability of the called terminal prior to setting up a routing. In this manner a connection could be guaranteed prior to proceeding with a routing determination, authentication, pricing, and authorization procedure. Another ITG may offer a rating service, such as either permitting or barring 976 other specified calls. Still another ITG may provide high capacity as compared to an ITG which has a high percentage of busy time. All such information may be stored in the directory database and placed at the disposal of users of the directory and users of the particular ITGs. The directory may cooperate with the authentication, pricing and usage C3 object so that sufficient detail as to routing and facilities to be used may be provided to permit accurate pricing, authentication, and authorization.

Because of the hierarchical distributed nature of the directory it is possible for a directory with the most advanced offering of services to be sought by other instances of the distributed directory to satisfy the demand of their own subscribers. The enhanced directory may store large quantities of information as to the capabilities and services available from the various directory and gateway objects in order to provide highly flexible and varied services and thus attract usage and revenues.

An example of the operation of the embodiment of the invention shown in FIGS. 17–19 may be as follows:

The call flow starts at the point where the user has established IP layer connectivity with the network, and has invoked the V/IP software application. This preliminary procedure would typically entail the following steps by the party initiating the call.

1. The customer boots the PC, and connects to the IP network following his/her existing procedures for network access.
2. The customer will launch their V/IP application, and the application will present a template of fields which are required to initiate a call wherein special parameters are specified by the caller.
3. The customer will populate a "telephone number to be called" data field, an account number and password field (or the application may reapply this data if it has been previously saved within the application, and special parameter fields, such as, minimum bandwidth for the call, maximum latency, reservation of the specified network capacity for a particular time, and other like parameters. The customer may also be making a particular call frequently wherein parameters for the call are specified in an RCR for the customer in the enhanced directory object, such as the directory object of FIGS. 15 and 16. In this event the customer may simply identify the desired communication path and parameters by number, name, or other characterization in an appropriate field.
4. The customer will then initiate the call. During the call, the call's cost status will be presented in real-time to the user by the application (via a visual display).
5. The user initiates a call via the PC's V/IP software. This software application presents the data in the populated fields to the Directory (C1 Object) to obtain the IP address of the hop-off ITG and any other information specified in the request as defined in the populated fields. Based on that information submitted by the PC application as described in the foregoing preliminary procedure, the C1 Object searches its storage of called numbers and accompanying parameters and ascertains the address or addresses of the gateway or gateways which have the capability to supply the connectivity being requested. The directory then engages in communication with one or more of those gateways to ascertain their immediate availability to provide the required service. This may entail a polling of gateways by the directory. As a result of its search of its own database and the information obtained from the gateway or gateways, the directory frames a response to the inquiry of the calling party.
6. The directory object thereupon returns to the calling party the IP address of the associated ITG (C2 Object) and any instructions necessary to establish the particular specified call.
7. The PC's V/IP software application invokes the C2 Object to set up a call by passing to C2 the number to be called, the user's account number, a password and any necessary data for establishing the specified parameters in the packet switched network. This may include specification of specific nodes and specific node to node virtual circuits. It may also include negotiation of the desired parameters.
8. C2 invokes the C3 Authorization, Pricing, Authentication and Account Object in order to receive authorization to proceed with the call. This may entail communication among instances of the distributed database to verify the account status of the caller and optionally set a limit on the duration or cost of the call depending upon the account status and/or balance or set a reservation of a specified amount to be debited to the account. The pricing of the call may be communicated to C2 for communication to the caller. C3 will pass the authorization information back to the C2 Call Control or ITG Object.
9. If authorization was successful, C2 will establish the specified communication path through the packet switched network, establish the PSTN connection, and notify the client software that the call is proceeding. Alternatively the application in the calling PC may establish the routing through C2 relying on programming or routines supplied from C1 based on either the specified parameters in its associated database or based on parameters specified by the caller in the fields which have been populated. C2 may also pass on to the calling PC the pricing information obtained from C3. C2 will continue to update the client software with call establishment information as the call is proceeding and may also pass along to the caller a running account of the cost of the call.
10. After the call has been established, the PC will respond to the network that it recognizes that a connection has been established (Connection Acknowledged), timing of the call's duration can be initiated, and any usage measurements will indicate that the call is billable.

11. Steady state call (Voice Flow).

12. The PC's V/IP software application invokes the C2 service to release the call. The PC application signals release to C2, and C2 releases the call in the PSTN and confirms the release back to PC application. Also, timing of the call's billable duration is completed. Alternatively, the PSTN user may initiate call tear down.

13. The C2 Object passes a usage record to C3 for reporting. The C3 Object may also initiate individual call billing by reporting to M3 as shown in FIG. 6.

Figure 20:
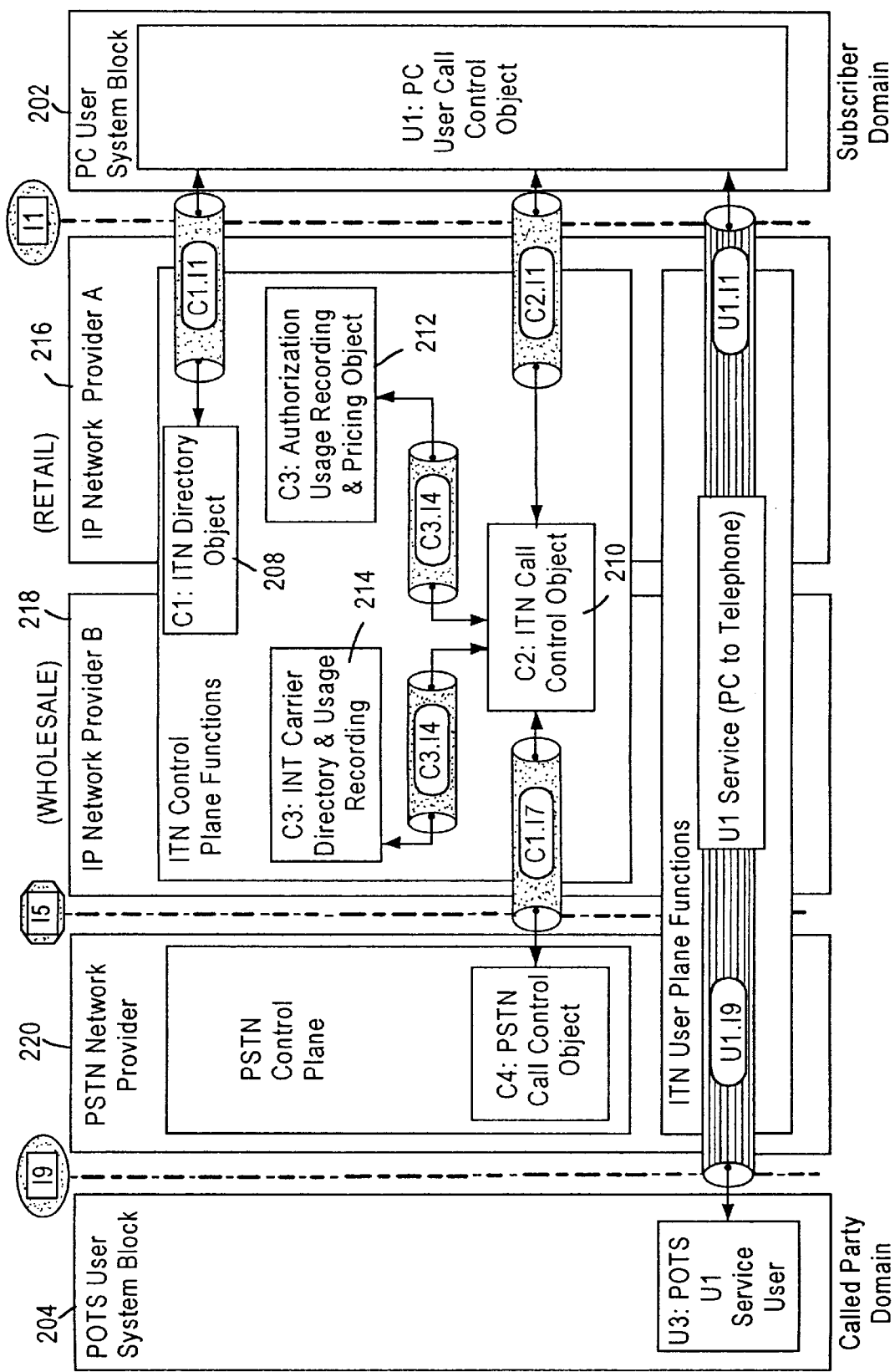
FIG. 20 is a diagram of another embodiment of the architectural implementation previously shown in FIG. 2, which new embodiment implements the architecture and methodology of the present invention.

Referring to FIG. 20 there is shown a further embodiment of the invention illustrating an architecture and methodology for handling resource allocation across carriers, settlements between carriers, usage accounting across carriers, and usage allocation among carriers. This architecture is generally similar to that which has been previously described in relation to FIG. 2 and like reference numerals are utilized for like elements.

At 202 there is shown the PC user System Block in the subscriber domain, which includes the U1 PC User Call Control Object. The subscriber or end user domain interfaces at I1 to the IP packet switched network. This network extends from the I1 interface to the interface I6, which interfaces the IP network to the PSTN network provider 220. Between these I1 and I6 interfaces the IP network is shown in FIG. 20 as divided between IP network provider A at 216, and IP network provider B at 218. In this example network provider A is considered the retail IP service provider, or the retail facing IP service provider. The retail IP network service provider interfaces directly with the PC end user, shown in the PC user system block 202.

Network provider B is considered the wholesale IP service provider, which interfaces at I6 to the PSTN network provider 220. The PSTN in turn interfaces at I9 to the POTS U1 service user in the POT User System Block 204 in the called party domain.

In this illustration of this embodiment of the invention the VIP Control Plane Functions include four objects. These comprise:

C1: The Internet Telephony Gateway Directory Object 208

C2: The Internet Telephony Call Control Object or hop-off gateway (ITG) 210

C3: The Internet Telephony Authorization, Usage Recording, and Pricing Object 212

C5: The ITN Carrier Directory and Usage Recording Object 214.

The C1, C2, and C3 objects are the same as the similarly designated objects previously described in relation to FIGS. 2, 5–8, 13, 14, 17, and 18. The C5 ITN Carrier Directory and Usage Recording Object 214 is an additional object for implementing the instant embodiment of the invention. The C5 object represents the network element required in the architecture of this embodiment of the invention to control multiple new functions presently to be described in detail. It has a new interface C3b.I4 to the C2 call control object or gateway 210.

It is to be noted in FIG. 20 that the C1 ITN directory object 208 and the C3 Authentication, Usage Recording, and Pricing Object 212 are within the domain and control of the retail network provider or IP network provider A at 216. Typically they may be owned and operated by the retail provider. The C2 ITN Call Control Object or hop-off Internet gateway (ITG) 210 and the C5 ITN Carrier Directory and Usage Recording Object 214 are within the domain and control of the wholesale network provider or IP network provider B at 218. Typically they may be owned and operated by the wholesale provider.

The C2 call control object or ITG gateway in this embodiment is under control of the wholesale network provider. Since that wholesale network provider is prepared to allow multiple carriers to connect to its C2 gateway or ITG, it desires to maintain a carrier account list similar to the retail account list maintained in the retail C3 Authentication, Usage Recording, and Pricing Object of the retail provider. This carrier account data is maintained in the C5 object. In addition, the wholesale service provider may desire to provide for allocation of the services which it provides, in order to avoid overload of its resources and possible breakdown of its system.

As a result, the C5 object may also store subsets of data for control of such variables as times and dates that specific carriers are allowed to connect to the Internet telephony gateway or ITG. Data also may be stored to control the maximum percentage of resources which are to be allocated to specific carriers. There may also be data to impose a prioritization among carriers based on various parameters, such as price and total usage which is guaranteed. Carriers may be allotted total cumulative usage time periods of connection to the gateway per month.

The foregoing provisions contribute to the implementation of a functionality for preventing swamping of the wholesaler's resources. In the event that the wholesaler is unable to handle a specific connection for a specific carrier, that carrier may have to inform its retail customer that the network facilities are busy. In addition to the foregoing, the C5 object is connected through the C3b.I4 interface to the C2 gateway object, and is thereby equipped to monitor the gateway load. If a carrier requests a connection which would exceed its allocation, the C5 object is able to assess the excess capacity which is immediately available and offer to allow the carrier to exceed its agreed allocation at a higher rate.

The C5 object performs carrier customer authentication, call authorization, usage accounting, and usage pricing for a particular call. It also provides a cumulative monthly billing totalization per carrier and per carrier call. Although not shown in FIG. 20, C5 can also respond to real time requests from external OSS systems for usage record details and account status information for the carrier customer account.

The C5 object is preferably implemented as a unitary database serving one or more gateways of the wholesale provider. However the C5 object may alternatively be implemented in a manner such that multiple sites maintain their own database servers. The overall data then constitutes a distributed database which forms a unitary logical object which relies on the database servers at the individual sites. Operation is similar to that described previously for the C3 database.

The C5 object is invoked during a call when an Authorization request is relayed to it over the interface C3b.I4. This interface is responsible for allowing an authorization of ITG usage by a carrier service subscriber, and for maintaining the current state of a carrier's connections within C5, as well as passing ITG generated usage records from C2 to C5 in real time. Communication through the C3b.I4 interface is preferably encrypted and secure. The authorization request which is relayed over C3.I4 to the C5 object typically consists of a carrier account number, and optionally a password or PIN which has been provided by the requesting wholesale carrier to be authenticated by C5. At this point C5 checks the account password or PIN and available account balance and usage. If the password or PIN is correct and the remaining account balance and usage permits the call to be established, then C5 responds affirmatively to C2. In such an architecture, mutual authentication of C2 and C5, and a secure transaction between them is preferred.

C5 may return to C2 the pricing algorithm for the requested usage, and C2 will pass this on to the retail carrier. The retail carrier then has the option of passing this information on to the PC user. This is readily implemented via the C1.I4 interface 215 in FIG. 17, as previously explained in connection with earlier described embodiments of the invention. In this way the PC user may know the initial charge and ongoing per minute rate for the requested usage.

After the completion of the call, the C5 object is also responsible for accepting usage recording data from C2, and decrementing that usage parameter from the retail carrier customer's available allotment balance. C5 then logs the final call data. Preferably C2 also logs and maintains the call detail information. The C2 data can be used by the wholesale's owner or controller of the C2 object, to compile in the wholesaler's C5 database object a charge for the completion of the call over the wholesaler's facilities. In effect this C2 data becomes the basis for a usage based settlement interface between carriers. The C5 object may transmit the charge to the retailer's C3 usage recording & pricing object.

Figure 21:
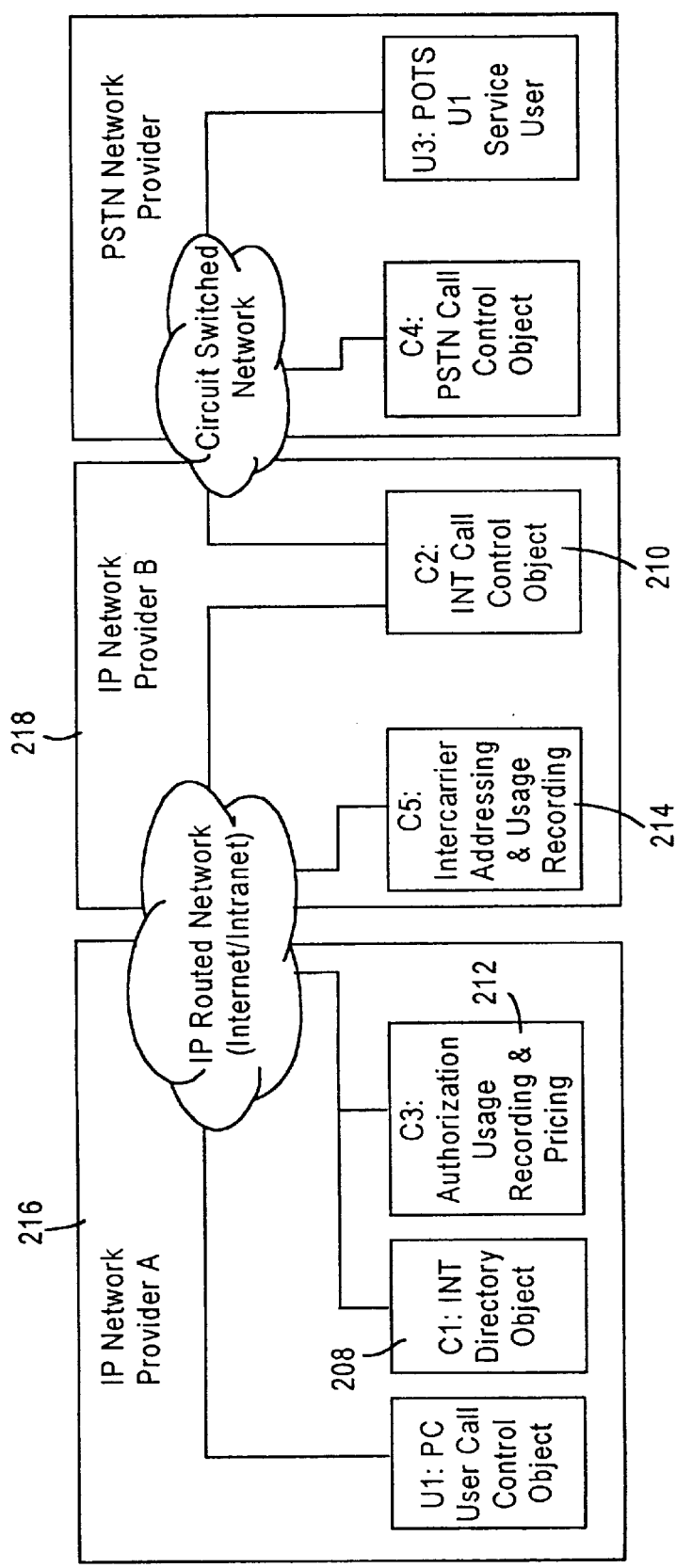
FIG. 21 is a simplified diagrammatic presentation of the hybrid network of FIG. 20 illustrating one example of a division of IP network service providers into wholesale and retail entities.

FIG. 21 shows a different perspective of the same network just described in relation to FIG. 20. This figure provides a simplified presentation which may better illustrate the breakdown between functions of the retail IP network provider A and the wholesale network IP provider B in this embodiment of the invention. One result of the combination of the invention is to permit an end user U1 to connect to a called party across multiple carriers through the Internet and PSTN, in a manner which is completely transparent to the calling and called parties. The wholesale provider need not know anything of the credit standing of the calling party, and need obtain no access to the confidential customer database of the retail carrier. At the same time the wholesale service provider is assured of collection for its services by virtue of its customer database of reliable carriers. The operation of the network to implement such functionality and to achieve such results is now described.

Figure 22:
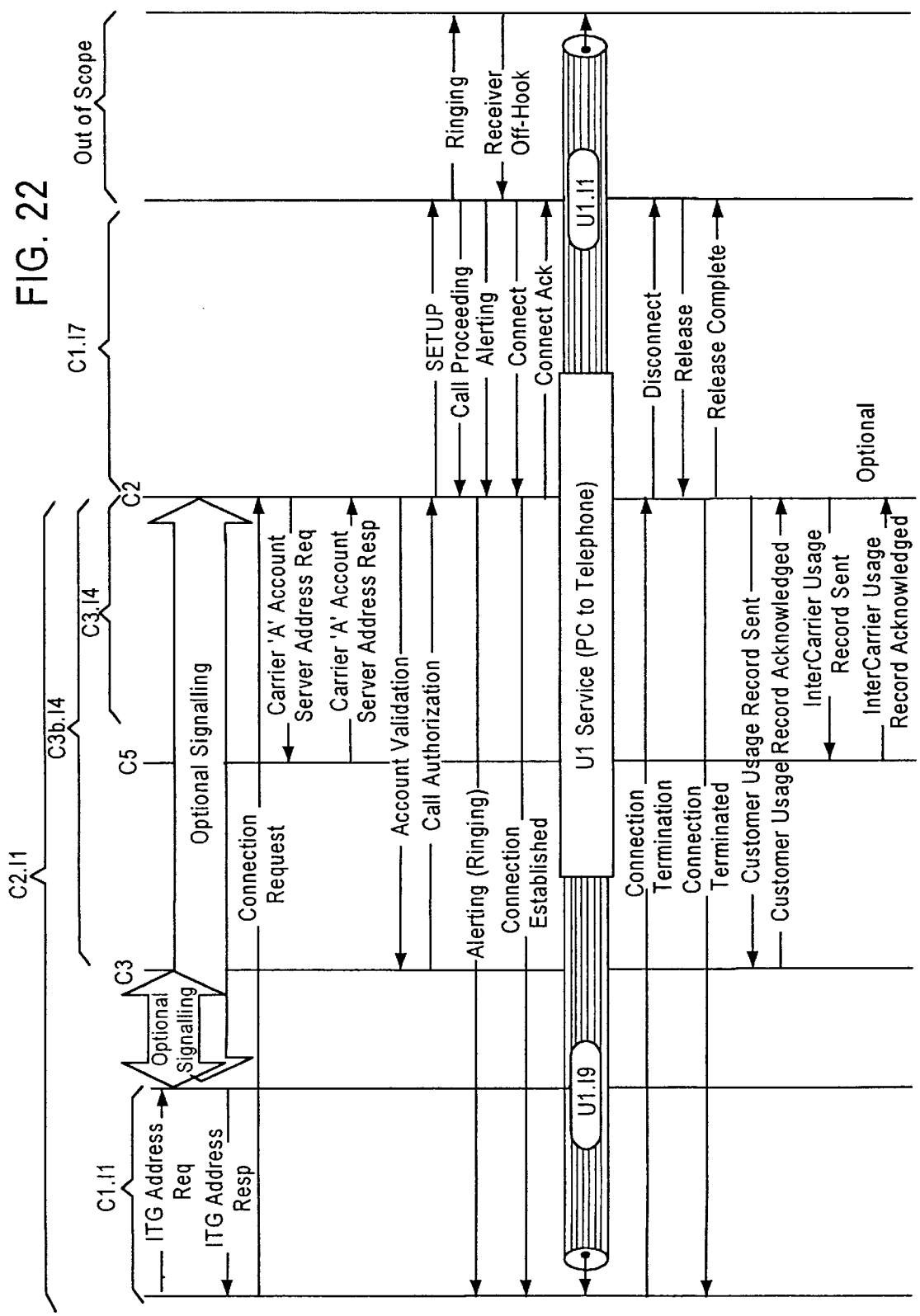
FIG. 22 is a diagram of a typical control plane message flow according to the instant embodiment of the invention.

FIG. 22 is a diagram of a typical control plane message flow according to the instant embodiment of the invention.

As with the call flow described in connection with FIG. 7 and other embodiments of the invention, the call flow starts at the point where the user retail PC user customer has established IP layer connectivity with the retailer IP network, and has invoked the V/IP software application. The customer will populate a "telephone number to be called" data field. The customer will also either populate his/her account number and retail password, or the application will reapply this data if it has been previously saved within the application. The customer will then initiate the call through the retail IP network of provider A. During the call, the call's completion status will be presented in real-time to the user by the retail application (via a visual display) as previously described. Having performed the foregoing preliminary steps the call will then proceed as follows:

1. The PC user initiates a call via the PC's V/IP software. This software application invokes the retail Directory (C1 Object), a directory of gateway or ITG addresses, to obtain the IP address of the destination or hop-off ITG. This is shown in FIG. 22 as the "ITG Address Request."

2. Based on the dialed number submitted by the PC application, as described in the foregoing preliminary procedure, the retail provider's C1 Directory Object returns the IP address of the appropriate wholesaler ITG (C2 Object). This is shown as "ITG Address Resp" in FIG. 22.

3. The PC's V/IP software application invokes the wholesale (Provider B) C2 ITG Gateway Object and requests it to set up a call. The request sends to the ITG gateway C2 the number to be called, the user's account number and password, and the retail carrier identification. This is shown as Connection Request in FIG. 22.

4. The ITG notes (C2 object) that it is getting an unsolicited query, and signals the C5 database with a request for the address of the retail carrier or provider C3 authorization server address. This is done in order for the wholesaler to determine if the call is acceptable, and is shown as "Carrier A Account Server Address Request" in FIG. 22.

5. The address of the C3 database object is returned to the C2 object by the C5 object as indicated at "Carrier A Account Server Address Response" in FIG. 22.

6. The C2 gateway thereupon uses this address to send an inquiry signal to the retail provider's C3 authorization object. The inquiry provides the PC user number and password and advises the C3 database of the estimated charge that may be incurred for the requested call. It requests the retail carrier account number and authorization to connect the call. This request is indicated in FIG. 22 as "Account Validation."

7. The retail provider's C3 authorization database consults its records for the PC user, verifies that it will permit the call, as well as any time or other limitations it wishes to place on its authorization. The retail provider's C3 object then responds to the wholesale provider's C2 gateway and authorizes connection of the call, subject to any limitations it may specify. This is indicated as "Call Authorization" in FIG. 22. The retail C3 authorization database is now alerted to maintain its retailer records for billing its customers, and to compare this to the cumulative bill that it will ultimately receive from the wholesale provider.

8. Having received authorization, the wholesale provider's C2 gateway proceeds through the call setup. This is indicated as the "SETUP" step in FIG. 22.

9. The call has now been transferred to the PSTN network call control object C4, and ringing proceeds. This is indicated as "Ringing" in FIG. 22.

10. The C4 PSTN call control object C4 signals the wholesale provider C2 gateway that the call is proceeding ("Call Proceeding"), and alerts the C2 gateway ("Alerting").

11. The C2 gateway thereupon sends a ring back signal to the calling PC user at "Alerting" (Ringing).

12. The called party goes off-hook at "Receiver Off-hook."

13. The PSTN C4 control object sends a connect signal to the C2 gateway at "Connect," and the gateway returns a "Connect Ack signal."

14. The C2 gateway thereupon signals the calling PC user that connection has been established as indicated at "Connection Established."

15. The voice communication proceeds as indicated in FIG. 22 at U1 Service ("PC to Telephone").

16. The PC user terminates the call at "Connection Termination" and a disconnect signal is sent from the C2 gateway object to the PSTN call control object C4.

17. The PSTN call control object releases the line at "Release."

18. The C2 gateway signals "Release Complete" and the gateway signals the PC user that the connection has been terminated at "Connection Terminated."

19. The C2 call control gateway thereupon preferably sends to the retail provider Authorization, Usage recording, and Pricing object C3 the usage record for that call. This permits the retail records to be updated by the retailer on a real time basis. This reporting by the wholesale provider may also include data relating to cumulative or total usage by the retailer or retail customer account or both. This reporting is indicated at "Customer Usage Record Sent."

20. The C3 object acknowledges receipt of this information at "Customer Usage Record Acknowledged."

21. The C2 gateway may then optionally send to the C5 Intercarrier Addressing and Usage Recording object the intercarrier usage record. This provides concomitant real time account record keeping by the wholesaler for use in billing the retailers. This is indicated at "InterCarrier Usage Record Sent."

22. The C5 object may acknowledge the receipt of this information at "InterCarrier Usage Record Acknowledged."

The foregoing represents a detailed example of one sequence of message flows and actions to implement the desired cross-carrier or cross-provider authentication, record keeping, and billing procedures in a satisfactory and efficient manner in a multi-network environment. The precise sequence of steps and communications may be varied. A basic goal is first establishing in real time, the acceptable identity of the retail provider or carrier, and then validating in real time with that provider the acceptability of the immediate call. The result is a real time identification of the retail provider whose customer is calling, followed by obtaining virtually immediate real time retailer acceptance of responsibility for payment to the wholesaler for completion of the call. All of the foregoing is attained with concomitant real time record keeping by both wholesaler and retailer to implement subsequent settlement between those providers or carriers.

In order to insure that the retail accounting is accomplished correctly, it is preferred that the necessary cost and accounting data is returned by the wholesale provider to the retail provider in real time immediately upon completion of the call. This insures that the retail provider receives immediately the official usage, pricing and billing data from the wholesale provider. Such data may be sent directly to the retail provider's account database C3. In addition to this real time and immediate informing of the retailer, it is preferable that the retail customer or PC user receive immediate details and billing information for the call. Procedures for accomplishing this have been described above in detail with respect to other embodiments of the invention. See FIG. 17 and the related description. As is there described, it will be appreciated that this data is computed by the retailer pursuant to confidential and proprietary retailer algorithms. The retail customer thus obtains the desired data from the wholesaler without any necessity of the wholesaler having any knowledge of the retailer algorithms or pricing. It will be appreciated that different retailers will have different algorithms and pricing, and will desire to maintain the confidentiality of this information. This architecture and methodology permits all parties to maintain the desired confidentiality of their business operations.

The C5 Intercarrier Addressing and Usage Recording object which maintains the usage records, is constantly aware of the calls in progress as well as cumulative data with respect to those calls and the carriers whose customers are making such calls. It is a feature of the invention that this database object serves not only as a repository of records but acts in a control fashion to assure that all carriers conform to allotments and restrictions imposed by the wholesale provider. It has been previously described how the C5 object may constitute a unitary logical object, while at the same time may be distributed and appearing in multiple instances. This nature of the object facilitates central control of the traffic through a large number of gateways. Thus it is possible for the wholesaler to not only impose a resource usage allotment on a carrier on a per gateway basis, but also on a network wide basis. Among other advantages, this facilitates distribution of calls among gateways.

By way of example, Carrier A may be allotted a total of 50 simultaneous calls through the wholesale network's gateway, but only 30 simultaneous calls through gateway 1. When Carrier A reaches its limit of simultaneous calls through gateway 1, the C5 object may advise Carrier A of the existence of the condition, but may also advise that gateway 2 (or multiple identified alternate gateways) are available. In this manner resource overload may be prevented while still affording acceptable service to the retail service providers. The C5 object thus may serve as a primary gatekeeper. An instance of the C5 database may be associated with each gateway in the network. However, because of the unitary logical nature of the object there is centralized control of all instances of the C5 object.

The architecture and methodology of the invention also comprehends an optional initial inquiry between the retail C1 directory object and the C3 authorization object in the retail network. In a situation where the wholesale IP network provider B makes a charge for each call which is attempted, whether or not the call is completed, the retail provider may desire to engage in an extra initial call screening in order to limit its own expense. This may be accomplished by placing a PC users initial request to the C1 directory for the address of the gateway on hold, until the C1 object has the opportunity to invoke the C3 object to ascertain the status of the account of the requesting caller. Such an inquiry may be made through the IP network of the retailer or Provider A in FIG. 21. If the inquiry discloses that the caller is already over his usage limit imposed by the retailer, the call may be rejected in a message to the caller, and no attempt made to contact the wholesaler with a call set-up request. Such initial screening by the retailer before contacting the wholesaler may result in savings for the retailer and may trigger retailer collection efforts with respect to any delinquent customers which are thereby identified.

While the foregoing initial screening may be employed by the retailer prior to contacting the wholesaler, the wholesaler will still desire to implement the retailer to wholesaler authorization procedures which have previously been described. Those procedures constitute the equivalent of a contract between the wholesaler and retailer with respect to each specific call, and serve the purposes of both the retailer and the wholesaler. While the retailer may raise questions regarding authorizing a call as a result of the initial screening, it may still desire to go through the initial pre-authorization procedure with the wholesaler, in order to obtain from the wholesaler the pricing of the call which it may be authorizing. Thus while the caller may not be in arrears, the requested call may be sufficiently expensive that the condition of the caller's account may be inadequate to cover that particular call. All parties thus benefit from the authorization procedure for specifically priced calls.

A further type of preliminary signaling that may be implemented in this embodiment of the invention is port reservation prior to connection. One example of such reservation may be effected as now described. Upon the C1 gateway address directory receiving a gateway address request from a PC user, the directory may utilize the C1.I4 interface in FIG. 17 to inquire of the C2 call control object as to the availability of ports. Upon ascertaining that a port is available, the directory may reserve the port and signal the calling PC user to proceed directly with connection to the gateway. In a similar manner the retail provider may offer to its customers quality of service or bandwidth reservation, as has previously been described.

Another optional signaling which the invention provides may be carried out between provider directories. The retail provider directory C1 may query the wholesale provider directory C5 to ascertain the optimal or least expensive C2 gateway that the retail provider may use for connecting that network to the wholesale IP network. Such preliminary signaling may be conducted on a real time per call basis without knowledge of the calling customer.

A further type of preliminary signaling that may be implemented in this embodiment of the invention is port reservation prior to connection. One example of such reservation may be effected as now described. Upon the C1 gateway address directory receiving a gateway address request from a PC user, the directory may utilize the C1.I4 interface in FIG. 17 to inquire of the C2 call control object as to the availability of ports. Upon ascertaining that a port is available, the directory may reserve the port and signal the calling PC user to proceed directly with connection to the gateway. In a similar manner the retail provider may offer to its customers quality of service or bandwidth reservation, as has previously been described.

Referring to FIGS. 23–26 there is illustrated a further embodiment of the invention wherein a packet telephony call through a packet internetwork or Internet is implemented from one POTS telephone terminal to another. The implementation of such a telephone communication differs from a computer terminal to telephone terminal type connection in the capabilities of the originating or calling terminal. With a computer originated call, the computer provides an intelligent terminal wherein the connection to an internetwork gateway is readily established in a routine fashion. An originating computer has the ability to deliver multiple fields of information through the common expedient of populating a template. A POTS telephone, on the other hand, provides no such capability in an inherent or user-friendly manner.

In order to enable telephone to telephone packet telephony in a seamless manner it is desirable to quickly transfer a package of information which is adequate to identify the calling party, the called party, and the retail operating entity or carrier. The transferred information should possess sufficient specificity to enable a degree of validation which can be utilized to support reliable authorization of involved operating entities. With this information the originating operating entity, which may be an Internet gateway, is able to identify the retail operating entity. From this the gateway knows which retailer's directory database it must access in order to determine whether or not to authorize the call. According to the present embodiment of the invention this initial information transfer may be accomplished in several ways.

According to a first method, the necessary information fields may be populated by using multiple dialed numbers to identify the retail carrier in a two step dialing procedure.

A second method may be implemented by information transfer through the use of an off-hook delay trigger and an advanced intelligent network (AIN) technique.

A third method may be effected by transferring information through the use of a Feature Group D connection with SS7 (Signaling System 7) connectivity.

A fourth method may implement the desired originating gateway connection using an 800 number and database to choose the gateway which is closest to the calling party.

Figure 26:
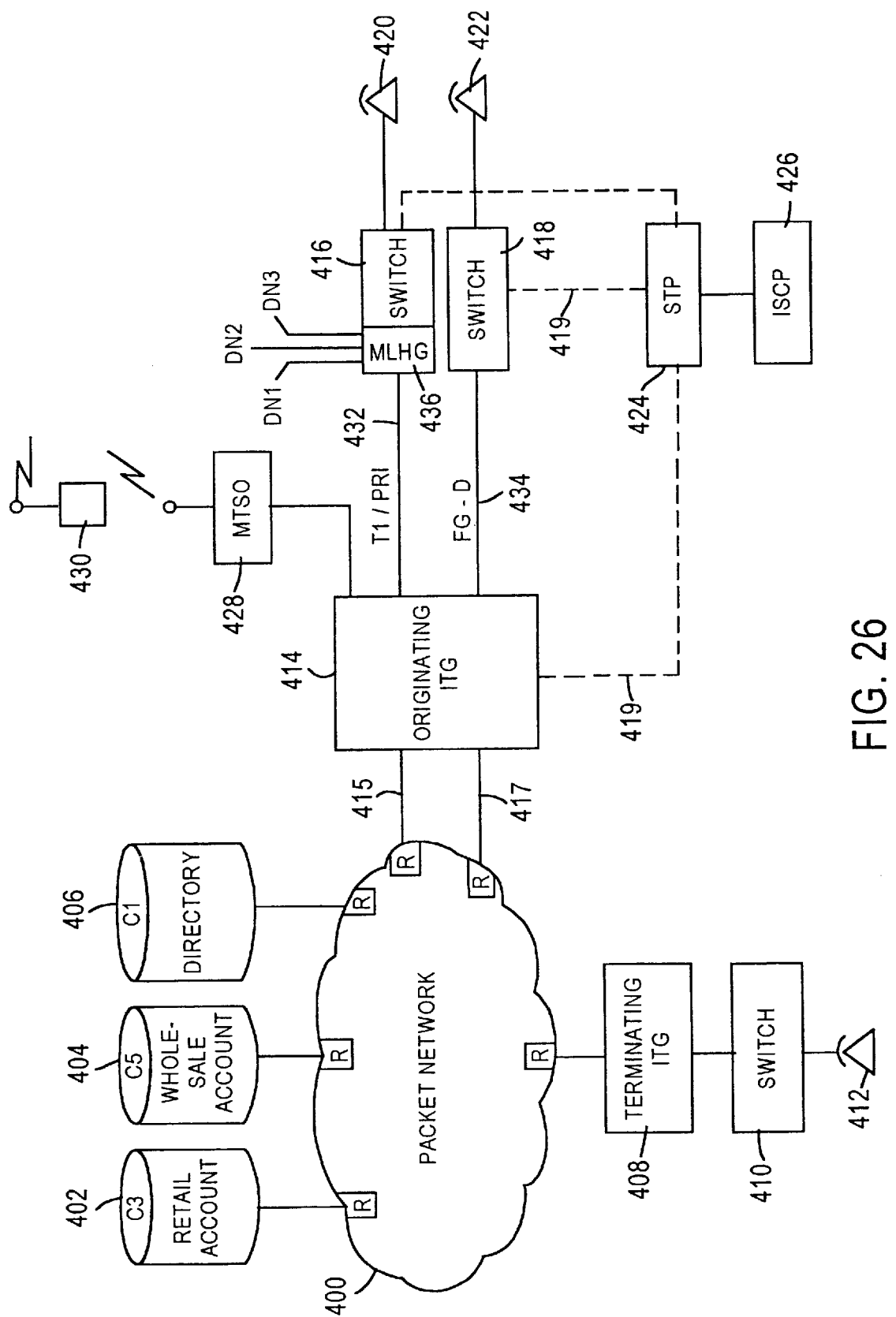
FIG. 26 is a high level diagram of the telephone to telephone embodiment of the hybrid internetwork shown in FIG. 23.

Referring to FIG. 26 there is shown a high level diagrammatic representation of the overall hybrid communication networks. The packet internetwork 400 is shown as a cloud 400. The packet network is connected through routers to the retailer customer account database 402, wholesaler account database 404, and directory database 406. These elements are identifiable as versions of the objects C3, C5 & C1 which have been previously discussed. The packet network is also connected to the terminating gateway or ITG 408, and through that ITG and a circuit switch 410 in a destination circuit switched network (not separately shown), to a called telephone terminal 412.

The originating gateway or ITG 414 is connected through multiple trunks/lines and associated routers to the packet network 400. The originating ITG 414 is also connected to an originating circuit switched network (not separately shown), which includes switches 416 and 418. The switches 416 and 418 in turn are connected to telephone terminals 420 and 422. The circuit switched network containing switches 416 and 418 includes an AIN common channel interoffice switching network. The AIN is represented in FIG. 26 by the switching transfer point (STP) 424 and integrated service control point (ISCP) 426. By way of example, the switch 416 may be connected to the ITG via a T1 or PRI link 432, and the switch 418 may be connected via a Feature Group D link 434. The T1 connection to the switch 416 may be via a multiline hunt group (MLHG) or universal call distributor (UCD) 436. The MLHG or UCD handles multiple directory numbers which are assigned to multiple retail carriers. The originating ITG 414 is also connected to a mobile telephone switching office (MTSO) 428, which provides radio links to mobile telephones 430. The MTSO switching office provides packet telephony connectivity for the mobile telephones.

The hybrid internetwork illustrated in FIG. 26 may be used to establish a packet telephone communication through the network using the previously listed four methods of establishing the responsible parties or entities involved in call origination. While these four methods constitute preferred embodiments of the invention, they are not intended to constitute an exclusive list and other equivalent methods may be used pursuant to the invention.

By way of example the first mentioned method may operate in the following manner. A retailer A obtains from the PSTN which includes the switch 416, an assignment of one or a series of directory number(s) (DN), which the retailer's customers can dial to use the packet telephony service offered by that retailer. The same procedure is used by the PSTN to provide DN's to a retailer B and a retailer C. Thus DN1 may be Retailer A, DN2 may be retailer B, and DN3 may be retailer C.

When a call comes in on DN1, DN2, or DN3 to the MLHG, the switch 416 connects that call to the ITG 414, which the respective retailers have each designated as their selected originating ITG. The ITG may or may not be owned and operated by one of the retailers. The retailer may also specify a specific router with which to access the packet network. For this reason the ITG 414 is provided with multiple links 415, 417 to multiple routers in the packet network.

When the ITG 414 receives a call, it can tell from the dialed DN the identity of the retailer which is being called. Also the ITG will have been pre-notified by that retailer as to the identity of any specific router which it may prefer to use. The ITG also obtains the identity of the caller via AIN or Feature Group A or D signaling, such as the ANI (automatic number identification) information. Using the identity of the retailer and the identity of the caller, the ITG 414 can then access the database 402 of the identified retailer. From this database it is possible to obtain information relating to the caller to determine whether or not and how the call should be authorized and routed. If the ITG does not own or operate this database, or vice versa, the information is obtained from the owner or operator. This preserves the confidentiality of the database content when different entities are involved.

In this example the call may be authorized prior to the time that the caller has supplied the called number. Thus a second call or dialing is necessary. The gateway or ITG collects the digits in the second dialing and accesses the directory 406 to determine the identity of the destination or hop-off gateway. The retailer then contacts the hop-off gateway 408 and requests a set-up of the desired communication path. A second authorization now will occur based on the identity of the retail carrier, as previously described with respect to the carrier directory C5. The hop-off gateway 408 is owned or operated by the wholesale operating company, and that company will access its database C5 for the necessary information relating to authorized, qualified or trusted retailers. If the calling retailer is acceptable to the wholesaler the requested communication path is then established. Recording of usage and computation of charges for such usages is carried out in the manner previously described in relation to preceding embodiments of the invention.

Turning to the second example of a processing method which has been listed above, the requirement for double dialing can be eliminated. According to this method SS7 common channel signaling is used in an AIN capacity. In this arrangement the circuit switched PSTN, which includes the switches 416 and 418, includes an advanced intelligent network or AIN. The switches 416 and 418 are connected by SS7 links to an STP 424, which is linked to an ISCP 426. Subscriber telephone terminals 420 and 422 have off-hook delay triggers placed on their local loop connections to the switches 416 and 418.

In this arrangement, the calling party at the telephone terminal 420 or 422 completes dialing of the called party telephone number. This dialing activates or trips the off-hook delay trigger. The activation of this trigger results in the formulation of a TCAP query message to the ISCP 426. The customer profile record or CPR for the calling party is then accessed in the database associated with the ISCP. This CPR is populated with the identity of the caller's pre-selected carrier, an ITG number for that carrier, and a password or user name and account number.

This information in the database associated with the ISCP is then passed on to the ITG 414 by one of several methods. By way of example, the ITG may have its own SS7 link to the STP, a Feature Group D line may be used, the fields may be passed via a PRI-ISDN line, or an SMDI link may be provided. When the ITG receives the information it is in a position to access the designated carrier's account or authorization database. Such access may be direct in the case where the ITG and database are owned or controlled by the same operating entity. On the other hand the access may be indirect, i.e., through the owner or operator of the database where different operating entities are involved.

Following the receipt of authorization the ITG 414 may contact the appropriate directory 406 and obtain routing to the destination, terminating, or hop-off ITG 408. This single dialing method using the PSTN AIN capabilities offers the further advantage of reservation of capabilities across the packet network prior to the time that the communication path or call is actually set up. This may be accomplished in the manner described in detail with respect to the embodiment of the invention illustrated in FIGS. 18 and 19.

In the third above-mentioned method, the originating authorization and routing is obtained by using the database capabilities of the telco's AIN, but without the necessity of a separate signaling link connecting the ITG to the STP. This arrangement is shown in FIG. 26 in relation to switch 418. However, in this embodiment the STP to ITG link 419 is unnecessary. In this embodiment the signaling is transmitted over a Feature Group D link 434 between the switch and the ITG. As a still further variation, PRI-ISDN signaling may be substituted for the Feature Group D link.

Pursuant to the fourth method which has been disclosed, the customer or caller at telephone terminal 420 has not pre-selected a retail carrier. In this case the customer dials an 800 number which has been advertised as providing access to packet or Internet telephony. When the 800 number is dialed, this is translated to a real number in a conventional manner. The real number may be the DN of the closest ITG to the dialing terminal or it may be a default ITG. In FIG. 26 this may be the originating gateway or ITG 414.

When the caller reaches ITG 414, the DN which was used identifies the retail carrier. The ITG also obtains from the ANI information the identity of the caller via AIN or Feature Group A or D. Using the identity of the retail carrier and the identity of the caller, the ITG can then access the directory of the identified retailer and obtain information relating to the caller to determine whether the call should be authorized and how it should be routed. In this scenario the call is authorized prior to the time that the caller has supplied the DN of the called party. Thus a second call or dialing is necessary. The gateway collects the digits in the second dialing and accesses the directory 406 to determine the identity of the destination or hop-off gateway. It contacts the hop-off gateway 408. At this point a second authorization will occur based on the identity of the retail carrier, as previously described with respect to the carrier directory C5 in connection with the embodiment illustrated in FIGS. 20 and 21.

In all of the above described methods it has been assumed that the call has been originated from the home or subscriber telephone terminal. However the invention also comprehends that the subscriber may initiate the call from another telephone terminal. In such a situation it is not feasible to simply rely on identification of the calling telephone terminal. According to the invention this problem may be solved by using a virtually automatic arrangement for gathering information from the caller through the use of a voice response dialogue in a manner similar to that which is presently used in credit card calling. Thus the voice response unit may obtain such information as account number, PIN, and the like.

It will be appreciated that in each of these techniques the PSTN has performed the information gathering and transmitting function which was served by the originating computer or PC in the previous embodiments. The methods described are not mutually exclusive and may be used in various combinations and permutations. The methodology enables the use of a worldwide Internet credit card calling service. The credit card entity provides a calling card with a worldwide 800 number and translations to an entire set of Internet telephony gateways. The credit card entity need not own any of these gateways, but may engage in reselling based on a presence. This presence permits its retail customer database to be accessed nationwide or worldwide by the originating Internet gateway of anyone. Thus by providing the customer interface and database capability via the packet network, it is possible to provide secure separation of the wholesaler and retailer records, while enabling authentication and collection of billing information at all levels.

Figure 23B:
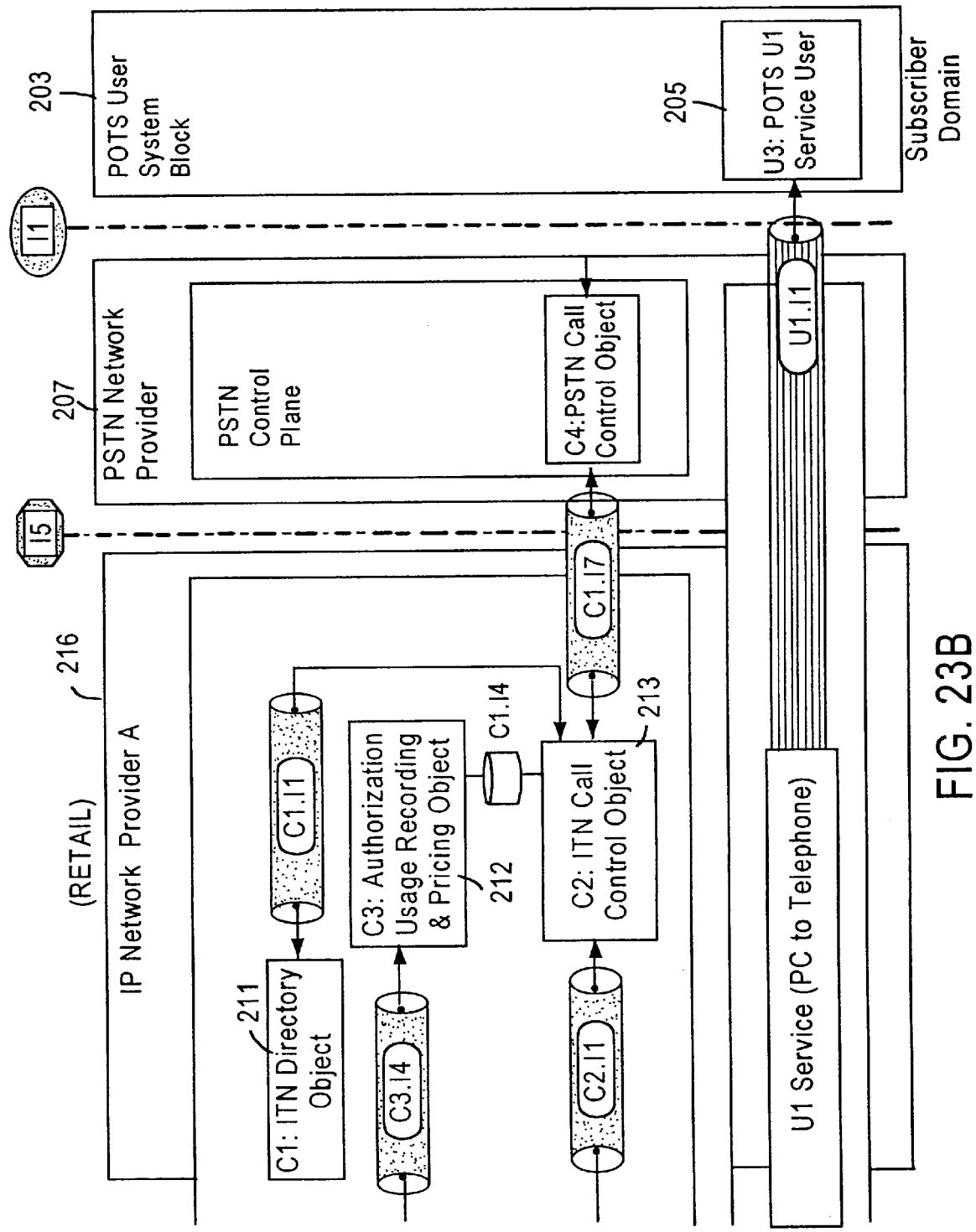
FIG. 23 is a diagram of another embodiment of the architectural implementation previously shown in FIGS. 2 and 20, which new embodiment implements the architecture and methodology of the present invention for a telephone terminal to telephone terminal call.

Referring to FIG. 23 there is shown a more detailed architectural and functional illustration of the embodiment of the invention thus far described with reference to the high level depiction of FIG. 26. This embodiment bears similarity to the computer terminal to telephone terminal embodiment which is shown in FIG. 20. Like reference numerals are used to indicate like elements in FIG. 23. This embodiment is similar to that shown in FIG. 20 in that it provides implementation for handling resource allocation across carriers, settlements between carriers, usage accounting across carriers, and usage allocation among carriers.

At 203 there is shown the POTS User System Block in the subscriber domain. This includes the U3:POTS U1 Service User 205. The user 205 is the Telco or PSTN subscriber and the calling party. The subscriber domain 203 interfaces at I1 to the PSTN Network Provider 207 to which the subscriber 205 connects, i.e., the originating PSTN in this example. The originating PSTN domain 207 interfaces to the Retail/Wholesale IP packet switched network 216, 218 at I5. The packet switched network extends from the interface I5 at the originating PSTN 207 to the terminating I5 interface with the destination PSTN 220. The PSTN 220 constitutes the PSTN Service Provider to the called U3:POTS U1 service user telephone terminal 207. This interfaces the IP network 216, 218 to the destination PSTN network provider 220.

Between these two I5 interfaces the IP network is shown in FIG. 23 as divided between IP network provider A at 216, and IP network provider B at 218. In this example network provider A is considered the retail IP service provider, or the retail facing IP service provider. The retail IP network service provider interfaces directly with the POTS subscriber, shown in the POTS User System Block 203.

Network provider B is considered the wholesale IP service provider, which interfaces at I5 to the terminating PSTN network provider 220. In this example the PSTN 220 is the destination PSTN. The PSTN 220 in turn interfaces at I9 to the POTS U3:U1 Service User 207 in the POT User System Block 209 in the called party domain.

In this illustration of this embodiment of the invention the VIP Control Plane Functions include five objects. These comprise:

C1: The ITN Directory Object 211

C2: The originating ITN Call Control Object or access gateway (ITG) 213

C2: The terminating ITN Call Control Object or hop-off (exit) gateway 217

C3: The Telephony Authorization, Usage Recording, and Pricing Object 212

C5: The ITN Carrier Directory and Usage Recording Object 214.

The C1, originating C2, terminating C2, C3 and C5 objects are the same as the similarly designated objects previously described in relation to FIGS. 2, 5–8, 13, 14, 17, 18, and 20. However, in this instance there are two C2 Objects, namely the originating and terminating C2 ITG Objects.

Since the wholesale network provider 218 offers its hop-off or exit C2 gateway or ITG for use by multiple retail carriers, it desires to maintain a carrier account list similar to the retail account list maintained in the retail C3 Authentication, Usage Recording, and Pricing Object of the retail provider 216. This carrier account data is maintained in the C5 object shown at 214. In addition, the wholesale service provider may desire to provide for allocation of the services which it provides, in order to avoid overload of its resources and possible breakdown of its system.

As a result, the C5 object may also store subsets of data for control of such variables as times and dates that specific carriers are allowed to connect to the hop-off gateway or ITG 217. Data also may be stored to control the maximum percentage or number of resources which are to be allocated to specific carriers. There may also be data to impose a prioritization among carriers based on various parameters, such as price and total usage which is guaranteed. Carriers may be allotted total cumulative usage time periods of connection to the gateway per month.

In the event that the wholesaler is unable to handle a specific connection for a specific carrier, that carrier may have to inform its retail customer that the network facilities are busy. In addition to the foregoing, the C5 object is connected through the C3b.I4 interface to the destination C2 gateway object or ITG 217. Through use of this connection it is equipped to monitor the load of the hop-off gateway 217. If a carrier requests a connection which would exceed its allocation, the C5 object is able to assess the excess capacity which is immediately available and offer to allow the carrier to exceed its agreed allocation at a higher rate.

The C5 object performs carrier customer authentication, call authorization, usage accounting, and usage pricing for a particular call. It also provides a cumulative monthly billing totalization per carrier and per carrier call. Although not shown in FIG. 23, C5 can also respond to real time requests from external OSS systems for usage record details and account status information for the carrier customer account.

The C5 object is preferably implemented as a unitary database serving one or more gateways of the wholesale provider. However the C5 object may alternatively be implemented in a manner such that multiple sites maintain their own database servers. The overall data then constitutes a distributed database which forms a unitary logical object which relies on the database servers at the individual sites. Operation is similar to that described previously for the C3 database.

The C5 object is invoked during a call when an Authorization request is relayed to it over the interface C3b.I4 in FIG. 23. This interface is responsible for allowing an authorization of ITG usage by a carrier service subscriber, and for maintaining within C5 a cognizance and record of the current state of a carrier's connections. In addition the C3b.I4 interface passes ITG generated usage records from the destination C2 ITG to the C5 object in real time. Communication through the C3b.I4 interface is preferably encrypted and secure. The authorization request which is relayed over the C3b.I4 interface to the C5 object typically consists of a carrier account number, and an optional password or PIN which has been provided by the requesting wholesale carrier to be authenticated by the C5 object. At this point C5 checks the account password or PIN and available account balance and usage. If the password or PIN is correct, and the remaining account balance and usage permits the call to be established, then C5 responds affirmatively to the destination C2 ITG 217. In such an architecture, mutual authentication of the destination C2 ITG 217 and the C5 object 214, and a secure transaction between them is preferred.

C5 may return to the destination C2 ITG 217 the pricing algorithm for the requested usage, and the C2 ITG 217 will pass this on to the retail carrier. The retail carrier then has the option of passing this information on to the POTS user via an audio message. This is readily implemented via the C1.14 interface shown at 215 in FIG. 17, and in FIG. 23, as previously explained in connection with earlier described embodiments of the invention. In this way the PC user may know the initial charge and ongoing per minute rate for the requested usage.

After the completion of the call, the C5 object is also responsible for accepting usage recording data from the C2 ITG object 217, and decrementing that usage parameter from the retail carrier customer's available allotment balance. C5 then logs the final call data. Preferably the destination C2 ITG object 217 also logs and maintains the call detail information. The destination C2 ITG data can be used by the wholesale owner or controller of the C2 ITG 217 object to compile in the wholesaler's C5 database object a charge for the completion of the call over the wholesaler's facilities. In effect this destination C2 ITG data becomes the basis for a usage based settlement interface between carriers. The C5 object may transmit the charge to the retailer's C3 usage recording and pricing object 212.

Figure 24:
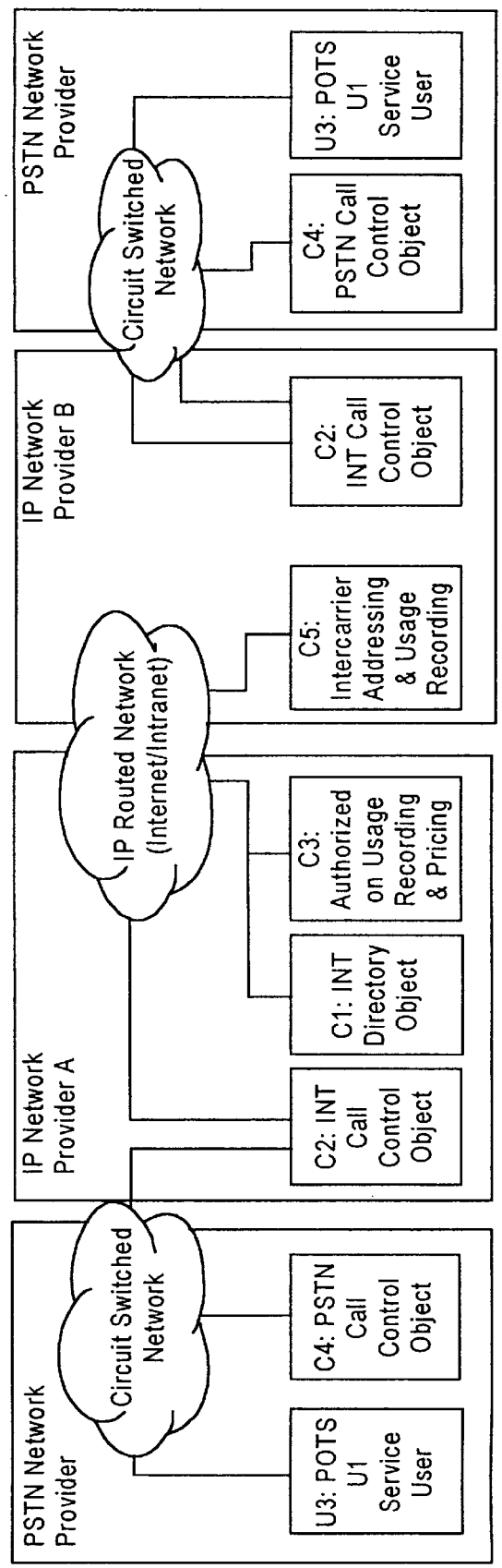
FIG. 24 is a simplified diagrammatic presentation of the hybrid network of FIG. 23 illustrating one example of a division of IP network service providers into wholesale and retail entities.

FIG. 24 shows a different perspective of the same network just described in relation to FIG. 23. This figure provides a simplified presentation which may better illustrate the breakdown between functions of the retail IP network provider A and the wholesale IP network provider B in this embodiment of the invention. One result of the combination of the invention is to permit an end user U1 205 to connect to a called party across multiple carriers through the Internet and PSTNs, in a manner which is completely transparent to the calling and called parties. The wholesale provider need not know anything of the credit standing of the calling party, and need obtain no access to the confidential customer database of the retail carrier. At the same time the wholesale service provider is assured of collection for its services by virtue of its customer database of reliable carriers. The operation of the network to implement such functionality and to achieve such results is now described.

Figures 25, 25A:
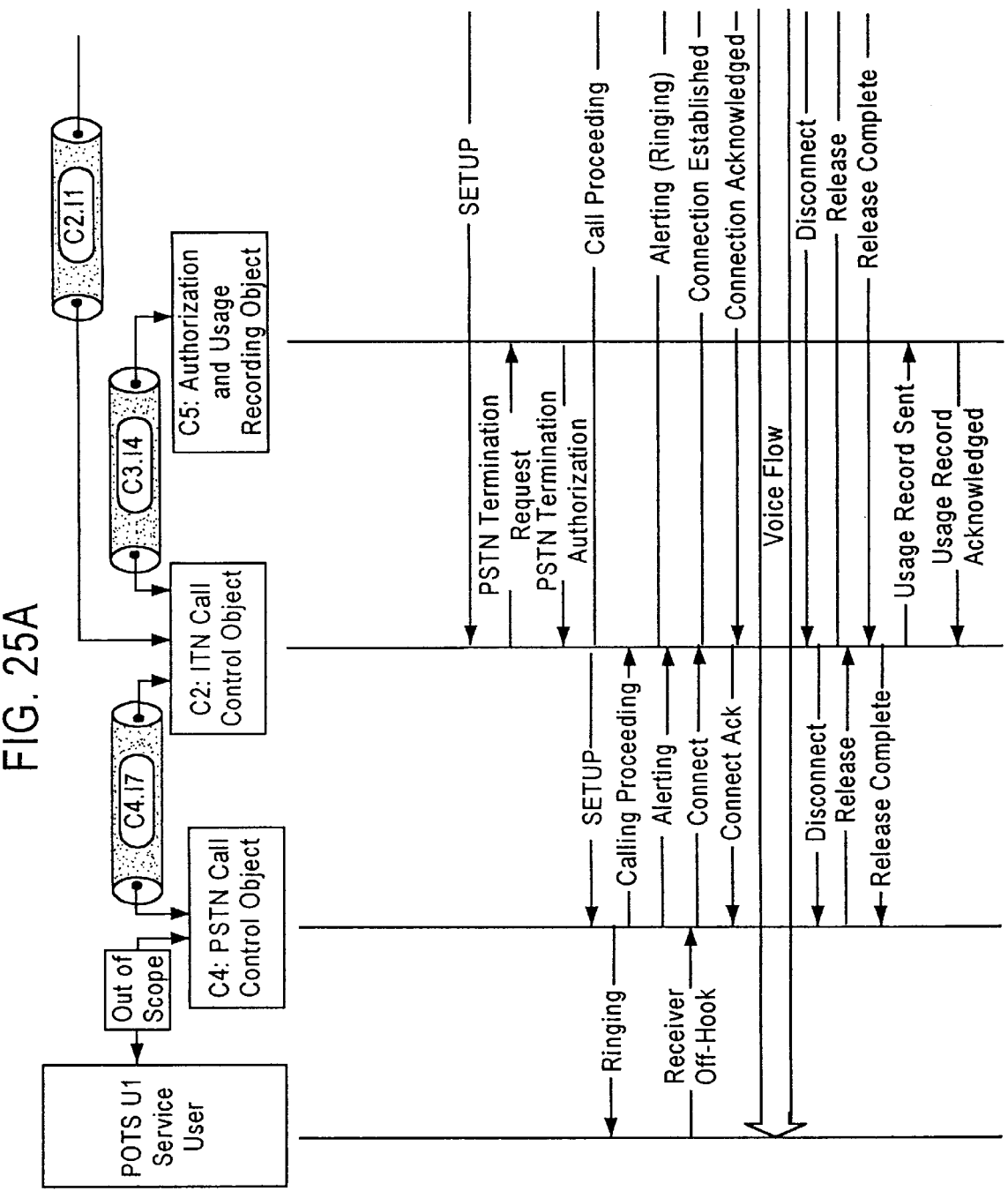
FIG. 25 is a diagram of a typical control plane message flow according to the embodiment of the invention implemented in the system illustrated in FIGS. 23 and 24.
Figure 25B:
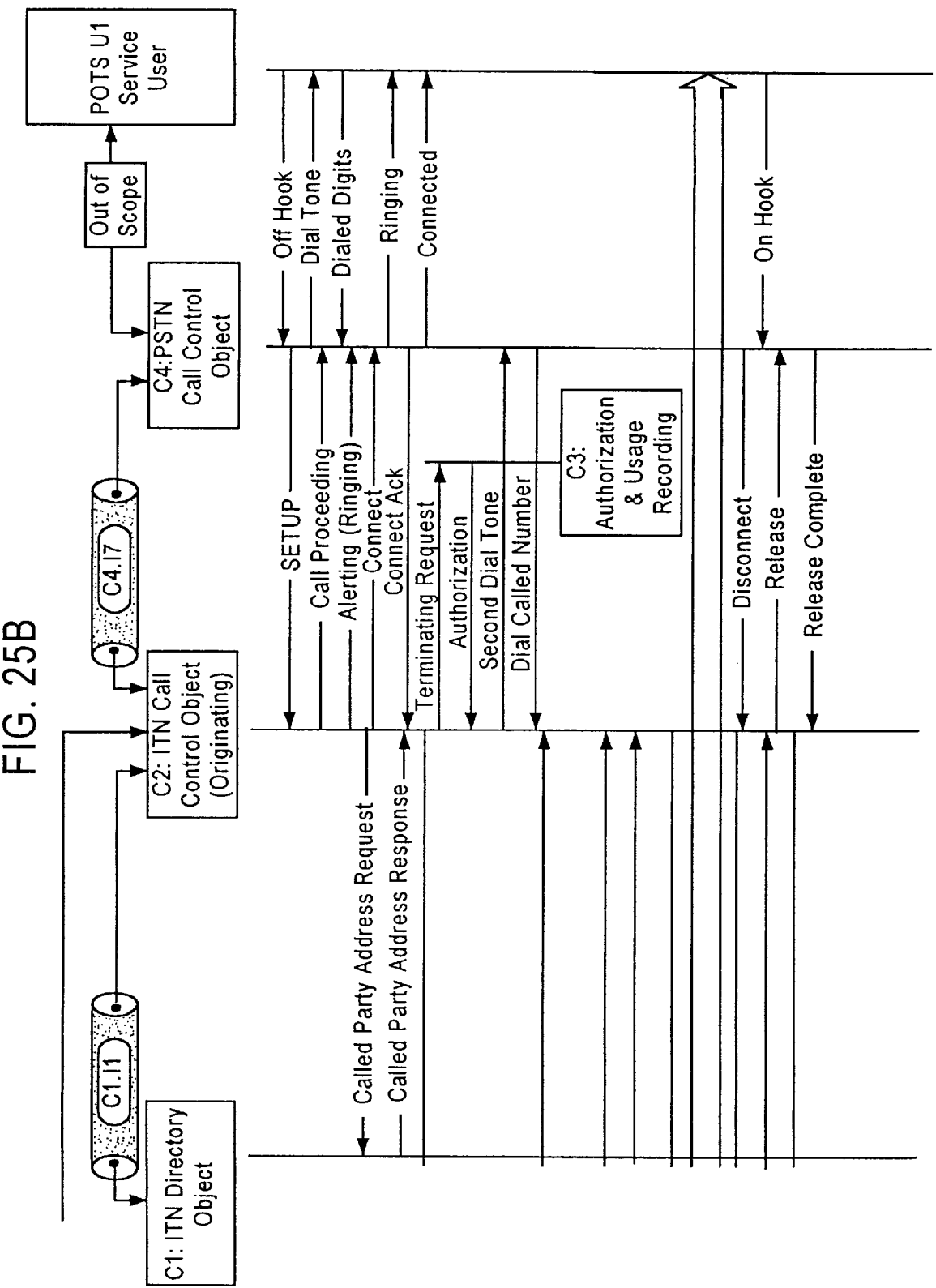

FIG. 25 is a diagram of a typical control plane message flow according to the instant embodiment of the invention.

The call is initiated when the calling subscribing POTS user at 205 in FIG. 23 goes off-hook. Dial tone is returned by the originating PSTN 207. In using the double dialing technique of the first listed method, the calling subscriber dials the DN which was provided by the retail provider. When the call comes in on this directory number the switch, C4:PSTN Call Control Object, connects the call to the originating C2:ITN Call Control Object or ITG 213 (FIG. 23 and 414 FIG. 26). This constitutes the originating gateway or ITG which the retailer either owns or designates as its selected originating ITG. The connection to the originating ITG C2 is now established. This is shown in FIG. 25 as SETUP and is complete with the connection acknowledgement or ACK.

In this scenario previously described, the originating C2:ITN Call Control Object or ITG 213, requests from the C3:Authorization Object 212 in FIG. 23, an authorization of the calling subscriber terminal, which has been identified by the ANI. The originating ITG 213, having obtained this authorization from the C3 database 212 of the retailer, now initiates the sending of the second dial tone to the caller, which is shown in FIG. 25. The calling terminal now enters the telephone number of the called party.

The C1 directory 211 is contacted by the originating C2 gateway ITG 213 for the IP address of the destination or hop-off gateway C2 ITG 217 (FIG. 23 and 408 FIG. 26), which is selected to serve the called terminal 207 (FIG. 23 and 412 FIG. 26). This gateway address is returned from directory C1 to the originating gateway C2 213. The originating C2 ITG 213 now contacts the hop-off or destination gateway C2 217 and SETUP at this wholesaler stage is initiated. This SETUP includes a second authorization based on the identity of the retail carrier. The hop-off gateway or ITG 217 makes a termination request to the C5 Authorization and Usage Recording object 214. Following a search of that database an authorization is returned to the destination gateway C2 ITG 217.

Upon receiving this authorization the wholesaler initiates the terminating SETUP. This occurs in the indicated steps between the destination gateway C2 ITG 217 and the destination PSTN C4 Call Control Object. That PSTN Call Control Object rings the called POTS terminal 207 (FIG. 23 and 412 FIG. 26). The receiver goes off-hook at that terminal and the call is connected. The disconnect is illustrated in FIG. 25 and proceeds as previously described.

While the foregoing has described what are considered to be preferred embodiments of the invention, it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

What is claimed is:

1. A method for communication between calling and called terminals through a hybrid system of switched circuit and packet networks via operations of plural operating entities, comprising the steps of:

in response to transmission from a calling terminal linked to a circuit switched network of signaling for initiating establishment of said communication, identifying a first database of a first of said operating entities;

accessing said first database to determine whether said first operating entity will authorize said communication;

in response to communication authorization, requesting a second of said operating entities to establish said communication;

in response to said request, accessing a second database of a second of said operating entities to determine whether said second operating entity will authorize said communication;

in response to authorization by said second operating entity, establishing said communication;

recording charges for said communication and allocating the recorded charges between said first and second entities; and sending a bill for said communication to said initiating terminal.

2. A method according to claim 1 wherein said calling terminal comprises a telephone terminal.

3. A method according to claim 2 wherein said first database is associated with said circuit switched network.

4. A method according to claim 3 wherein said step of accessing said first data base comprises signaling via links associated with said circuit switched network.

5. A method according to claim 4 wherein said second database is associated with said packet network.

6. A method according to claim 5 wherein said step of accessing said second database comprises signaling via links in said packet network.

7. A method according to claim 2 wherein said signaling for initiating establishment of said communication comprises dialing a directory number.

8. A method according to claim 7 wherein said directory number identifies said first database.

9. A method according to claim 2 wherein said first database includes account data including data relating to said calling terminal.

10. A method according to claim 2 wherein said first database is associated with a control network controlling the operation of said circuit switched network.

11. A method according to claim 10 wherein said control network comprises a common channel interoffice signaling network (CCIS).

12. A method according to claim 11 wherein said CCIS includes an advanced intelligent network (AIN).

13. A method according to claim 12 wherein said first database is associated with a service control point (SCP).

14. A method according to claim 2 wherein said second database comprises a database of operating entities including data regarding said first operating entity.

15. A method according to claim 2 wherein said communication comprises a voice communication.

16. A method according to claim 2 wherein the establishment of said communication includes the step of connecting to said called terminal through a terminating circuit switched network.

17. A method according to claim 16 wherein said communication comprises a voice communication originating at a telephone terminal connected to an originating circuit switched telephone network.

18. A method according to claim 17 wherein said called terminal comprises a telephone terminal connected to a second circuit switched telephone network.

19. A method according to claim 18 wherein said packet network comprises the Internet.

20. A method for communicating between calling telephone terminal connected to a circuit switched network interfaced to a packet network and a called terminal interfaced to said packet network via operations of plural operating entities, comprising the steps of:
   a) transmitting from said telephone terminal to said circuit switched network signaling for initiating establishment of said communication;
   b) responsive to said signaling identifying a first database containing data of a first of said operating entities;
   c) accessing said first database and determining whether said first operating entity will authorize said communication;
   d) requesting a second of said operating entities to establish said communication;
   e) responsive to said request identifying a second database containing data of a second of said operating entities;
   f) accessing said second database and determining if said second operating entity will authorize said communication;
   g) establishing said communication;
   h) determining charges for said communication and allocation thereof between said first and second entities; and
   i) rendering a bill for said communication to said initiating terminal.

21. A method for communicating between calling and called terminals through a hybrid system of switched circuit and packet networks via operations of plural operating entities, comprising the steps of:
   a) a calling terminal linked to a circuit switched network transmitting to said circuit switched network signaling for initiating establishment of said communication;
   b) responsive to said signaling identifying a first database of containing data of a first of said operating entities;
   c) accessing said first database and determining whether said first operating entity will authorize said communication;
   d) requesting a second of said operating entities to establish said communication;
   e) responsive to said request identifying a second database containing data of a second of said operating entities;
   f) accessing said second database and determining whether said second operating entity will authorize said communication;
   g) establishing said communication; and
   h) recording usage of services of said operating entities in said communication.

22. A method according to claim 21 including the step of billing said calling terminal.

23. A method according to claim 22 wherein said billing is allocated between said operating entities.

24. A method according to claim 21 wherein each of said operating entities records usage.

25. A method for communicating between calling telephone terminal connected to a circuit switched network interfaced to a packet network and a called terminal interfaced to said packet network via operations of plural operating entities, comprising the steps of:
   a) transmitting from said telephone terminal to said circuit switched network signaling for initiating establishment of said communication;
   b) responsive to said signaling identifying a first database containing data of a first of said operating entities;
   c) accessing said first database and determining whether said first operating entity will authorize said communication;
   d) requesting a second of said operating entities to establish said communication;
   e) responsive to said request identifying a second database containing data of a second of said operating entities;
   f) accessing said second database and determining whether said second operating entity will authorize said communication; and
   g) establishing said communication.

26. A method according to claim 25 including the step of recording usage of services of said operating entities in said communication.

27. A method according to claim 26 wherein said charges are allocated between said operating entities.

28. A method according to claim 26, wherein said step of recording usage comprises monitoring a first interface between said packet network and said circuit switched network and monitoring a second interface between said packet network and said called terminal.

29. A method according to claim 28 wherein said first operating entity monitors the interface between said circuit switched network and said packet network and said second operating entity monitors said interface between said packet network and said called terminal.

30. A method according to claim 29 wherein said called terminal is connected to said second interface with said packet network via a circuit switched network.

31. A method according to claim 30 wherein said circuit switched networks comprise public switched telephone networks.

32. A method according to claim 31 wherein said packet network comprises the Internet.

33. A method according to claim 25 including the step of billing said calling terminal for charges incurred in said communication.

34. A method according to claim 25 wherein each of said operating entities records usage.

35. A method according to claim 25 wherein said usage is determined by said operating entities monitoring usage of said interfaces.

36. A communication system for providing selective telephony communication across combined circuit switched and packet switched networks to a calling telephone terminal connected to said circuit switched network and a called terminal, comprising:

a plurality of interface objects for providing selectable controlled connectivity between said circuit switched and packet switched networks;

a plurality of database objects interfaced with said packet switched network and with a plurality of said interface objects;

wherein an interface object, in response to a communication request signal from said calling telephone terminal, accesses a first of said database objects to obtain therefrom authorization to process said request and thereafter access a second of said database objects to obtain an address of a terminating interface object, said terminating interface object thereafter accessing a third of said database objects to obtain authorization for communication through said terminating interface object to a designated terminal and establishing a communication path to said designated terminal.

37. A communication system according to claim 36 wherein said third of said database objects records usage of said communication path through said destination interface object.

38. A communication system according to claim 37 wherein said first of said database objects records usage of said communication path through said originating interface object.

39. A communication system according to claim 38 wherein said first and said third of said database objects are controlled by a first and a second service provider, respectively.

40. A system according to claim 39 wherein said first and third database objects record charges for said communication and allocation thereof between said first and second entities.

41. A method for communicating between a calling telephone terminal connected to a circuit switched network interfaced to a packet network and a called terminal interfaced to said packet network via operations of plural operating entities, comprising the steps of:

a) transmitting from said telephone terminal to said circuit switched network signaling for initiating establishment of said communication;

b) responsive to said signaling identifying a first database containing data of a first of said operating entities;

c) accessing said first database and determining whether said first operating entity will authorize said communication;

d) requesting a second of said operating entities to establish said communication;

e) accessing a second database and determining whether said second operating entity will authorize said communication; and f) establishing said communication.

42. A method according to claim 41 including the step of recording usage of services of said operating entities in said communication.

43. A method according to claim 42 including the step of billing said calling terminal for charges incurred in said communication.

44. A method according to claim 43 wherein said charges are allocated between said operating entities.

45. A method according to claim 41 wherein each of said operating entities records usage.

46. A method according to claim 45 wherein said usage is determined by monitoring of said interfaces with said packet network.

* * * * *